US008612439B2

(12) United States Patent
Prahlad et al.

(10) Patent No.: US 8,612,439 B2
(45) Date of Patent: Dec. 17, 2013

(54) PERFORMING DATA STORAGE OPERATIONS IN A CLOUD STORAGE ENVIRONMENT, INCLUDING SEARCHING, ENCRYPTION AND INDEXING

(75) Inventors: Anand Prahlad, Bangalore (IN); Rajiv Kottomtharayil, Marlboro, NJ (US); Srinivas Kavuri, Hyderabad (IN); Parag Gokhale, Ocean, NJ (US); Manoj Vijayan, Marlboro, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 420 days.

(21) Appl. No.: 12/751,713

(22) Filed: Mar. 31, 2010

(65) Prior Publication Data
US 2010/0332479 A1 Dec. 30, 2010

Related U.S. Application Data

(60) Provisional application No. 61/299,313, filed on Jan. 28, 2010, provisional application No. 61/221,993, filed on Jun. 30, 2009, provisional application No. 61/223,695, filed on Jul. 7, 2009.

(51) Int. Cl.
G06F 7/00 (2006.01)
G06F 17/30 (2006.01)
G06F 17/00 (2006.01)

(52) U.S. Cl.
USPC ............ 707/736; 707/758; 707/640; 707/661

(58) Field of Classification Search
USPC .................... 707/614, 626, 620, 623
See application file for complete search history.

(56) References Cited

U.S. PATENT DOCUMENTS 4,686,620 A 8/1987 Ng
4,995,035 A 2/1991 Cole et al.
(Continued)

FOREIGN PATENT DOCUMENTS

EP 0259912 A1 3/1988
EP 0405926 A2 1/1991
(Continued)

OTHER PUBLICATIONS

SharePoint User Guide (Seth Bates and Tony Smith, "SharePoint 2007 User's Guide" 2007, Springer-Verlag New York, Inc. pp. 1-88).*

(Continued)

*Primary Examiner* — Kimberly Wilson
*Assistant Examiner* — Hexing Liu
(74) *Attorney, Agent, or Firm* — Perkins Coie LLP

(57) ABSTRACT

Systems and methods are disclosed for performing data storage operations, including content-indexing, containerized deduplication, and policy-driven storage, within a cloud environment. The systems support a variety of clients and cloud storage sites that may connect to the system in a cloud environment that requires data transfer over wide area networks, such as the Internet, which may have appreciable latency and/or packet loss, using various network protocols, including HTTP and FTP. Methods are disclosed for content indexing data stored within a cloud environment to facilitate later searching, including collaborative searching. Methods are also disclosed for performing containerized deduplication to reduce the strain on a system namespace, effectuate cost savings, etc. Methods are disclosed for identifying suitable storage locations, including suitable cloud storage sites, for data files subject to a storage policy. Further, systems and methods for providing a cloud gateway and a scalable data object store within a cloud environment are disclosed, along with other features.

19 Claims, 33 Drawing Sheets

(56) References Cited

U.S. PATENT DOCUMENTS

| | | |
|---|---|---|
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,664,204 A | 9/1997 | Wang |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,327,590 B1* | 12/2001 | Chidlovskii et al. .......... 707/734 |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,421,711 B1 | 7/2002 | Blumenau et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,658,526 B2 | 12/2003 | Nguyen et al. |
| 6,941,429 B1 | 9/2005 | Kamvysselis et al. |
| 7,035,880 B1 | 4/2006 | Crescenti et al. |
| 7,107,298 B2 | 9/2006 | Prahlad et al. |
| 7,246,207 B2 | 7/2007 | Kottomtharayil et al. |
| 7,343,356 B2 | 3/2008 | Prahlad et al. |
| 7,343,453 B2 | 3/2008 | Prahlad et al. |
| 7,346,751 B2 | 3/2008 | Prahlad et al. |
| 7,386,744 B2 | 6/2008 | Barr et al. |
| 7,395,282 B1 | 7/2008 | Crescenti et al. |
| 7,502,820 B2 | 3/2009 | Manders et al. |
| 7,587,570 B2 | 9/2009 | Sarkar et al. |
| 7,617,191 B2 | 11/2009 | Wilbrink et al. |
| 7,627,827 B2 | 12/2009 | Taylor et al. |
| 7,631,351 B2 | 12/2009 | Erofeev |
| 7,651,593 B2 | 1/2010 | Prahlad et al. |
| 7,668,884 B2 | 2/2010 | Prahlad et al. |
| 7,694,070 B2 | 4/2010 | Mogi et al. |
| 7,761,736 B2 | 7/2010 | Nguyen et al. |
| 7,765,167 B2 | 7/2010 | Prahlad et al. |
| 7,778,984 B2 | 8/2010 | Zhang et al. |
| 7,797,453 B2 | 9/2010 | Meijer et al. |
| 7,822,967 B2 | 10/2010 | Fung |
| 7,899,788 B2 | 3/2011 | Chandhok et al. |
| 8,001,277 B2 | 8/2011 | Mega et al. |
| 8,065,166 B2 | 11/2011 | Maresh et al. |
| 8,352,608 B1 | 1/2013 | Keagy et al. |
| 8,364,802 B1 | 1/2013 | Keagy et al. |
| 2002/0083079 A1* | 6/2002 | Meier et al. ................. 707/104.1 |
| 2002/0095609 A1 | 7/2002 | Tokunaga |
| 2002/0129106 A1* | 9/2002 | Gutfreund ..................... 709/205 |
| 2002/0194511 A1 | 12/2002 | Swoboda |
| 2003/0200222 A1 | 10/2003 | Feinberg et al. |
| 2004/0088578 A1 | 5/2004 | Chao et al. |
| 2004/0210724 A1 | 10/2004 | Koning et al. |
| 2006/0058994 A1 | 3/2006 | Ravi et al. |
| 2006/0155633 A1 | 7/2006 | Fellenstein et al. |
| 2006/0206507 A1 | 9/2006 | Dahbour |
| 2006/0224846 A1 | 10/2006 | Amarendran et al. |
| 2006/0282784 A1* | 12/2006 | Taylor et al. .................. 715/751 |
| 2007/0043721 A1* | 2/2007 | Ghemawat et al. ............... 707/7 |
| 2007/0174237 A1* | 7/2007 | Wilbrink et al. .................. 707/3 |
| 2007/0198802 A1 | 8/2007 | Kavuri |
| 2008/0005168 A1 | 1/2008 | Huff et al. |
| 2008/0059704 A1 | 3/2008 | Kavuri |
| 2008/0082601 A1 | 4/2008 | Meijer et al. |
| 2008/0091655 A1* | 4/2008 | Gokhale et al. .................... 707/3 |
| 2008/0222108 A1 | 9/2008 | Prahlad et al. |
| 2008/0228771 A1 | 9/2008 | Prahlad et al. |
| 2008/0229037 A1 | 9/2008 | Bunte et al. |
| 2008/0243855 A1 | 10/2008 | Prahlad et al. |
| 2008/0243879 A1 | 10/2008 | Gokhale et al. |
| 2008/0243958 A1 | 10/2008 | Prahlad et al. |
| 2008/0320319 A1 | 12/2008 | Muller et al. |
| 2009/0254572 A1* | 10/2009 | Redlich et al. .................. 707/10 |
| 2009/0268903 A1 | 10/2009 | Bojinov et al. |
| 2009/0287665 A1 | 11/2009 | Prahlad et al. |
| 2009/0319534 A1 | 12/2009 | Gokhale |
| 2009/0319585 A1 | 12/2009 | Gokhale |
| 2009/0320029 A1 | 12/2009 | Kottomtharayil |
| 2010/0070448 A1* | 3/2010 | Omoigui ........................ 706/47 |
| 2010/0070466 A1 | 3/2010 | Prahlad et al. |
| 2010/0070474 A1 | 3/2010 | Lad |
| 2010/0070725 A1 | 3/2010 | Prahlad et al. |
| 2010/0082672 A1 | 4/2010 | Kottomtharayil et al. |
| 2010/0082713 A1 | 4/2010 | Frid-Nielsen et al. |
| 2010/0136943 A1 | 6/2010 | Hirvela et al. |
| 2010/0162002 A1 | 6/2010 | Dodgson et al. |
| 2010/0191774 A1 | 7/2010 | Mason, Jr. et al. |
| 2010/0269164 A1 | 10/2010 | Sosnosky et al. |
| 2010/0318812 A1 | 12/2010 | Auradkar et al. |
| 2010/0332452 A1 | 12/2010 | Hsu et al. |
| 2011/0093471 A1* | 4/2011 | Brockway et al. ............. 707/747 |
| 2011/0191544 A1 | 8/2011 | Naga et al. |
| 2011/0239013 A1 | 9/2011 | Muller |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |

(56) References Cited

FOREIGN PATENT DOCUMENTS

| | | |
|---|---|---|
| EP | 0817040 A2 | 1/1998 |
| EP | 0899662 A1 | 3/1999 |
| EP | 0981090 A1 | 2/2000 |
| WO | WO-9513580 A1 | 5/1995 |
| WO | WO-9912098 A1 | 3/1999 |

OTHER PUBLICATIONS

Brandon, J., "Virtualization Shakes Up Backup Strategy," <http://www.computerworld.com>, internet accessed on Mar. 6, 2008, 3 pages.

Chiappetta, Marco, "ESA Enthusiast System Architecture," <http://hothardware.com/Articles/NVIDIA_ESA_Enthusiast_System_Architecture/>, Nov. 5, 2007, 2 pages.

CommVault Systems, Inc., "A CommVault White Paper: VMware Consolidated Backup (VCB) Certification Information Kit," 2007, 23 pages.

CommVault Systems, Inc., "CommVault Solutions—VMware," <http://www.commvault.com/solutions/vmware/>, internet accessed Mar. 24, 2008, 2 pages.

CommVault Systems, Inc., "Enhanced Protection and Manageability of Virtual Servers," Partner Solution Brief, 2008, 6 pages.

Davis, D., "3 VMware Consolidated Backup (VCB) Utilities You Should Know," Petri IT Knowlegebase, <http://www.petri.co.il/vmware-consolidated-backup-utilities.htm>, internet accessed on Jul. 14, 2008, Jan. 7, 2008, 7 pages.

Davis, D., "Understanding VMware VMX Configuration Files," Petri IT Knowledgebase, <http://www.petri.co.il/virtual_vmware_vmx_configuration_files.htm>, internet accessed on Jun. 19, 2008, 6 pages.

Davis, D., "VMware Server & Workstation Disk Files Explained," Petri IT Knowledgebase, <http://www.petri.co.il/virtual_vmware_files_explained.htm>, internet accessed on Jun. 19, 2008, 5 pages.

Davis, D., "VMware Versions Compared," Petri IT Knowledgebase, <http://www.petri.co.il/virtual_vmware_versions_compared.htm>, internet accessed on Apr. 28, 2008, 6 pages.

Microsoft Corporation, "How NTFS Works," Windows Server TechCenter, updated Mar. 28, 2003, internet accessed Mar. 26, 2008, 26 pages.

Sanbarrow.com, "Disktype-table," <http://sanbarrow.com/vmdk/disktypes.html>, internet accessed on Jul. 22, 2008, 4 pages.

Sanbarrow.com, "Files Used by a VM," <http://sanbarrow.com/vmx/vmx-files-used-by-a-vm.html>, internet accessed on Jul. 22, 2008, 2 pages.

Sanbarrow.com, "Monolithic Versus Split Disks," <http://sanbarrow.com/vmdk/monolithicversusspllit.html>, internet accessed on Jul. 14, 2008, 2 pages.

VMware, Inc., "Open Virtual Machine Format," <http://www.vmware.com/appliances/learn/ovf.html>, internet accessed on May 6, 2008, 2 pages.

VMware, Inc., "OVF, Open Virtual Machine Format Specification, version 0.9," White Paper, <http://www.vmware.com>, 2007, 50 pages.

VMware, Inc., "The Open Virtual Machine Format Whitepaper for OVF Specification, version 0.9," White Paper, <http://www.vmware.com>, 2007, 16 pages.

VMware, Inc., "Understanding VMware Consolidated Backup," White Paper, <http://www.vmware.com>, 2007, 11 pages.

VMware, Inc., "Using VMware Infrastructure for Backup and Restore," Best Practices, <http://www.vmware.com>, 2006, 20 pages.

VMware, Inc., "Virtual Disk API Programming Guide," <http://www.vmware.com>, Revision 20080411, 2008, 44 pages.

VMware, Inc., "Virtual Disk Format 1.1," VMware Technical Note, <http://www.vmware.com>, Revision 20071113, Version 1.1, 2007, 18 pages.

VMware, Inc., "Virtual Machine Backup Guide, ESX Server 3.0.1 and VirtualCenter 2.0.1," <http://www.vmware.com>, updated Nov. 21, 2007, 74 pages.

VMware, Inc., "Virtual Machine Backup Guide, ESX Server 3.5, ESX Server 3i version 3.5, VirtualCenter 2.5," <http://www.vmware.com>, updated Feb. 21, 2008, 78 pages.

VMware, Inc., "Virtualized iSCSI SANS: Flexible, Scalable Enterprise Storage for Virtual Infrastructures," White Paper, <http://www.vmware.com>, Mar. 2008, 13 pages.

VMware, Inc., "VMware Consolidated Backup, Improvements in Version 3.5," Information Guide, <http://www.vmware.com>, 2007, 11 pages.

VMware, Inc., "VMware Consolidated Backup," Product Datasheet, <http://www.vmware.com>, 2007, 2 pages.

VMware, Inc., "VMware ESX 3.5," Product Datasheet, <http://www.vmware.com>, 2008, 4 pages.

VMware, Inc., "VMware GSX Server 3.2, Disk Types: Virtual and Physical," <http://www.vmware.com/support/gsx3/doc/disks_types_gsx.html>, internet accessed on Mar. 25, 2008, 2 pages.

VMware, Inc., "VMware OVF Tool," Technical Note, <http://www.vmware.com>, 2007, 4 pages.

VMware, Inc., "VMware Workstation 5.0, Snapshots in a Linear Process," <http://www.vmware.com/support/ws5/doc/ws_preserve_sshot_linear.html>, internet accessed on Mar. 25, 2008, 1 page.

VMware, Inc., "VMware Workstation 5.0, Snapshots in a Process Tree," <http://www.vmware.com/support/ws5/doc/ws_preserve_sshot_tree.html>, internet accessed on Mar. 25, 2008, 1 page.

VMware, Inc., "VMware Workstation 5.5, What Files Make Up a Virtual Machine?" <http://www.vmware.com/support/ws55/doc/ws_learning_files_in_a_vm.html>, internet accessed on Mar. 25, 2008, 2 pages.

Wikipedia, "Cluster (file system)," <http://en.wikipedia.org/wiki/Cluster_%28file_system%29>, internet accessed Jul. 25, 2008, 1 page.

Wikipedia, "Cylinder-head-sector," <http://en.wikipedia.org/wiki/Cylinder-head-sector>, internet accessed Jul. 22, 2008, 6 pages.

Wikipedia, "File Allocation Table," <http://en.wikipedia.org/wiki/File_Allocation_Table>, internet accessed on Jul. 25, 2008, 19 pages.

Wikipedia, "Logical Disk Manager," <http://en.wikipedia.org/wiki/Logical_Disk_Manager>, internet accessed Mar. 26, 2008, 3 pages.

Wikipedia, "Logical Volume Management," <http://en.wikipedia.org/wiki/Logical_volume_management>, internet accessed on Mar. 26, 2008, 5 pages.

Wikipedia, "Storage Area Network," <http://en.wikipedia.org/wiki/Storage_area_network>, internet accessed on Oct. 24, 2008, 5 pages.

Wikipedia, "Virtualization," <http://en.wikipedia.org/wiki/Virtualization>, internet accessed Mar. 18, 2008, 7 pages.

International Search Report and Written Opinion for International Application No. PCT/US2010/040402, Mail Date Feb. 24, 2011, 11 pages.

U.S. Appl. No. 12/643,653, filed Dec. 21, 2009, Varadharajan et al.
U.S. Appl. No. 12/751,651, filed Mar. 31, 2010, Prahlad et al.
U.S. Appl. No. 12/751,804, filed Mar. 31, 2010, Prahlad et al.
U.S. Appl. No. 12/751,850, filed Mar. 31, 2010, Prahlad et al.
U.S. Appl. No. 12/751,923, filed Mar. 31, 2010, Prahlad et al.
U.S. Appl. No. 12/751,953, filed Mar. 31, 2010, Prahlad et al.

Armstead et al., "Implementation of a Campus-wide Distributed Mass Storage Service: The Dream vs. Reality," *IEEE*, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

(56) References Cited

OTHER PUBLICATIONS

Jason Gait, "The Optical File Cabinet: A Random-Access File System for Write-Once Optical Disks," *IEEE Computer*, vol. 21, No. 6, pp. 11-22 (1988) (see in particular figure 5 in p. 15 and recitation in claim 5).

Reingold, B. et al., "Cloud Computing: The Intersection of Massive Scalability, Data Security and Privacy (Part I)," LegalWorks, a Thomson Business, 2009, 5 pages.

Reingold, B. et al., "Cloud Computing: Industry and Government Developments (Part II)," LegalWorks, 2009, 5 pages.

Reingold, B. et al., "Cloud Computing: Whose Law Governs the Cloud? (Part III)," LegalWorks, 2010, 6 pages.

Rosenblum et al., "The Design and Implementation of a Log-Structured File System," *Operating Systems Review SIGOPS*, vol. 25, No. 5, New York, US, pp. 1-15 (May 1991).

Wikipedia, "Cloud computing," <http://en.wikipedia.org/wiki/Cloud_computing>, internet accessed Jul. 8, 2009, 13 pages.

U.S. Appl. No. 12/751,850, filed Mar. 31, 2010, Data Object Store and Server for a Cloud Storage Environment, Including Data Deduplication and Data Management Across Multiple Cloud Storage Sites.

U.S. Appl. No. 12/751,923, filed Mar. 31, 2010, Cloud Storage and Networking Agents, Including Agents for Utilizing Multiple, Different Cloud Storage Sites.

U.S. Appl. No. 12/751,953, filed Mar. 31, 2010, Cloud Gateway System for Managing Data Storage to Cloud Storage Sites.

U.S. Appl. No. 12/751,804, filed Mar. 31, 2010, Performing Data Storage Operations With a Cloud Environment, Including Containerized Deduplication, Data Pruning, and Data Transfer.

U.S. Appl. No. 12/751,651, filed Mar. 31, 2010, Performing Data Storage Operations With a Cloud Storage Environment, Including Automatically Selecting Among Multiple Cloud Storage Sites.

U.S. Appl. No. 13/615,999, filed Sep. 14, 2012, Data Object Store and Server for a Cloud Storage Environment, Including Data Deduplication and Data Management Across Multiple Cloud Storage Sites.

U.S. Appl. No. 13/615,999, filed Sep. 14, 2012, Prahlad.

Liu et al., "Semantic data de-duplication for archival storage system", IEEE 2008, 9 pages.

Wang et al. "Performance analysis of data deduplication technology for storage", Proc. of SPIE vol. 7517, 2007, 7 pages.

U.S. Appl. No. 13/787,488, filed Mar. 6, 2013, Gokhale et al.

U.S. Appl. No. 13/788,730, filed Mar. 7, 2013, Vijayan et al.

U.S. Appl. No. 13/788,886, filed Mar. 7, 2013, Vibhor et al.

U.S. Appl. No. 13/950,903, filed Mar. 26, 2013, Prahlad et al.

\* cited by examiner

| | Rec. ID | Archive File ID | Ref$_{IN}$ | Deleted Timestamp |
|---|---|---|---|---|
| 772 | 1 | AF$_0$ | AF$_1$,OF$_1$ | T$_1$ |
| 774 | 2 | AF$_1$ | AF$_3$,OF$_3$ | T$_2$ |
| 776 | 3 | AF$_3$ | ___ | T$_2$ |
| | ... | ... | ... | ... |

*FIG. 7C*

| Location | Keywords | User Tags | Application | Available |
|---|---|---|---|---|
| http://portal/budget.xls | Finance, Profit, Loss | Accounting, Confidential | Spreadsheet | Immediate |
| Backup Tape C, Offset 160 | Vacation, France | Personal | Email | 1 hour |
| Offsite Tape X | Project Plan, Schedule | Project X, Cancelled | Presentation | 1 week |
| http://www.cloud.com/companyname/archive/v15 | CEO compensation | Personnel, Confidential | Word Processor | 15 minutes |
| http://www.2ndcloud.com/co_name/archive/v22 | Medical Condition | Personal | Email | 1 hour |
| ... | | | | |

FIG. 11

PERFORMING DATA STORAGE OPERATIONS IN A CLOUD STORAGE ENVIRONMENT, INCLUDING SEARCHING, ENCRYPTION AND INDEXING

CROSS-REFERENCE TO RELATED APPLICATIONS

This application claims the benefit of the assignee's U.S. Patent Application Nos. 61/299,313, filed Jan. 28, 2010, entitled PERFORMING DATA STORAGE OPERATIONS, INCLUDING CONTENT-INDEXING, CONTAINERIZED DEDUPLICATION, AND POLICY-DRIVEN STORAGE WITHIN A CLOUD ENVIRONMENT; 61/221,993, filed Jun. 30, 2009, entitled SYSTEMS AND METHODS FOR PERFORMING DATA STORAGE OPERATIONS, INCLUDING CROSS-CLOUD STORAGE, OVER VARIOUS NETWORK PROTOCOLS; and 61/223,695, filed Jul. 7, 2009, entitled SYSTEMS AND METHODS FOR PERFORMING DATA STORAGE OPERATIONS, INCLUDING CROSS-CLOUD STORAGE, OVER VARIOUS NETWORK PROTOCOLS, all of which are incorporated herein by reference.

BACKGROUND

Current storage management systems employ a number of different methods to perform storage operations on electronic data. For example, data can be stored in primary storage as a primary copy that includes production data, or in secondary storage as various types of secondary copies including, as a backup copy, a snapshot copy, a hierarchical storage management copy ("HSM"), as an archive copy, and as other types of copies.

A primary copy of data is generally a production copy or other "live" version of the data which is used by a software application and is generally in the native format of that application. Primary copy data may be maintained in a local memory or other high-speed storage device that allows for relatively fast data access if necessary. Such primary copy data is typically intended for short term retention (e.g., several hours or days) before some or all of the data is stored as one or more secondary copies, for example to prevent loss of data in the event a problem occurred with the data stored in primary storage.

Secondary copies include point-in-time data and are typically for intended for long-term retention (e.g., weeks, months or years depending on retention criteria, for example as specified in a storage policy as further described herein) before some or all of the data is moved to other storage or discarded. Secondary copies may be indexed so users can browse, search and restore the data at another point in time. After certain primary copy data is backed up, a pointer or other location indicia such as a stub may be placed in the primary copy to indicate the current location of that data. Further details may be found in the assignee's U.S. Pat. No. 7,107,298, filed Sep. 30, 2002, entitled SYSTEM AND METHOD FOR ARCHIVING OBJECTS IN AN INFORMATION STORE.

One type of secondary copy is a backup copy. A backup copy is generally a point-in-time copy of the primary copy data stored in a backup format as opposed to in native application format. For example, a backup copy may be stored in a backup format that is optimized for compression and efficient long-term storage. Backup copies generally have relatively long retention periods and may be stored on media with slower retrieval times than other types of secondary copies and media. In some cases, backup copies may be stored at on offsite location.

Another form of secondary copy is a snapshot copy. From an end-user viewpoint, a snapshot may be thought as an instant image of the primary copy data at a given point in time. A snapshot may capture the directory structure of a primary copy volume at a particular moment in time, and may also preserve file attributes and contents. In some embodiments, a snapshot may exist as a virtual file system, parallel to the actual file system. Users may gain a read-only access to the record of files and directories of the snapshot. By electing to restore primary copy data from a snapshot taken at a given point in time, users may also return the current file system to the prior state of the file system that existed when the snapshot was taken.

A snapshot may be created nearly instantly, using a minimum of file space, but may still function as a conventional file system backup. A snapshot may not actually create another physical copy of all the data, but may simply create pointers that are able to map files and directories to specific disk blocks.

In some embodiments, once a snapshot has been taken, subsequent changes to the file system typically do not overwrite the blocks in use at the time of snapshot. Therefore, the initial snapshot may use only a small amount of disk space to record a mapping or other data structure representing or otherwise tracking the blocks that correspond to the current state of the file system. Additional disk space is usually only required when files and directories are actually modified later. Furthermore, when files are modified, typically only the pointers which map to blocks are copied, not the blocks themselves. In some embodiments, for example in the case of copy-on-write snapshots, when a block changes in primary storage, the block is copied to secondary storage before the block is overwritten in primary storage and the snapshot mapping of file system data is updated to reflect the changed block(s) at that particular point in time.

An HSM copy is generally a copy of the primary copy data, but typically includes only a subset of the primary copy data that meets a certain criteria and is usually stored in a format other than the native application format. For example, an HSM copy might include only that data from the primary copy that is larger than a given size threshold or older than a given age threshold and that is stored in a backup format. Often, HSM data is removed from the primary copy, and a stub is stored in the primary copy to indicate its new location. When a user requests access to the HSM data that has been removed or migrated, systems use the stub to locate the data and often make recovery of the data appear transparent even though the HSM data may be stored at a location different from the remaining primary copy data.

An archive copy is generally similar to an HSM copy, however, the data satisfying criteria for removal from the primary copy is generally completely removed with no stub left in the primary copy to indicate the new location (i.e., where it has been moved to). Archive copies of data are generally stored in a backup format or other non-native application format. In addition, archive copies are generally retained for very long periods of time (e.g., years) and in some cases are never deleted. Such archive copies may be made and kept for extended periods in order to meet compliance regulations or for other permanent storage applications.

In some embodiments of storage management systems, application data over its lifetime moves from more expensive quick access storage to less expensive slower access storage. This process of moving data through these various tiers of storage is sometimes referred to as information lifecycle management ("ILM"). This is the process by which data is "aged" from more forms of secondary storage with faster access/restore times down through less expensive secondary storage with slower access/restore times, for example, as the data becomes less important or mission critical over time.

In some embodiments, storage management systems may perform additional operations upon copies, including deduplication, content indexing, data classification, data mining or searching, electronic discovery (E-discovery) management, collaborative searching, encryption and compression.

One example of a system that performs storage operations on electronic data that produce such copies is the Simpana storage management system by CommVault Systems of Oceanport, N.J. The Simpana system leverages a modular storage management architecture that may include, among other things, storage manager components, client or data agent components, and media agent components as further described in U.S. Pat. No. 7,246,207, filed Apr. 5, 2004, entitled SYSTEM AND METHOD FOR DYNAMICALLY PERFORMING STORAGE OPERATIONS IN A COMPUTER NETWORK. The Simpana system also may be hierarchically configured into backup cells to store and retrieve backup copies of electronic data as further described in U.S. Pat. No. 7,395,282, filed Jul. 15, 1999, entitled HIERARCHICAL BACKUP AND RETRIEVAL SYSTEM.

Components within conventional storage management systems often communicate via one or more proprietary network protocols; this limits the devices that may connect to the system. Conventional systems may utilize propriety or non-proprietary network protocols at any of the seven Open Systems Interconnection Reference Model (OSIRM) layers, and may often utilize proprietary application-layer protocols. For example, if a client has primary data stored on it, and a storage management system is utilized to create a secondary copy of this data on a secondary storage device, the client may communicate with the secondary storage device by utilizing a proprietary application-level network protocol. In order to create a secondary copy on the secondary storage device in such a scenario, both the client and secondary storage device must have proprietary software and/or hardware installed or otherwise be configured to perform the proprietary network protocol. Thus, the ability of a conventional storage management system is generally limited to performing storage operations on those clients and secondary storage devices having pre-installed hardware or software.

Although some conventional data storage systems may permit a client to communicate with the system via a non-proprietary network protocol such as hypertext transfer protocol (HTTP) or file transfer protocol (FTP), generally such systems do not facilitate a wide range of value-added storage operations. For example, cloud storage sites typically provide only storage of and access to data objects as a service provided to end users. Generally, uploading, access and manipulation of data stored on a cloud storage site is conducted via an HTTP, FTP or similar network connection. Cloud storage service providers include Amazon Simple Storage Service, Rackspace, Windows Azure, and Iron Mountain, and Nirvanix Storage Delivery Network. Cloud storage service providers often bill end users on a utility computing basis, e.g., per gigabyte stored, uploaded and/or downloaded per month. Conventional cloud storage sites may not permit the end user to perform value-added storage operations such as ILM, deduplication, content indexing, data classification, data mining or searching, E-discovery management, collaborative searching, encryption or compression.

The need exists for systems and methods that overcome the above problems, as well as systems and methods that provide additional benefits. Overall, the examples herein of some prior or related systems and methods and their associated limitations are intended to be illustrative and not exclusive. Other limitations of existing prior systems and methods will become apparent to those of skill in the art upon reading the following Detailed Description.

BRIEF DESCRIPTION OF THE DRAWINGS

FIGS. 7A-7C illustrate various data structures which aspects of the invention may utilize for pruning object-level deduplicated data or for other processes.

FIG. 11 illustrates suitable data structures for facilitating content indexing.

DETAILED DESCRIPTION

Figure 1:
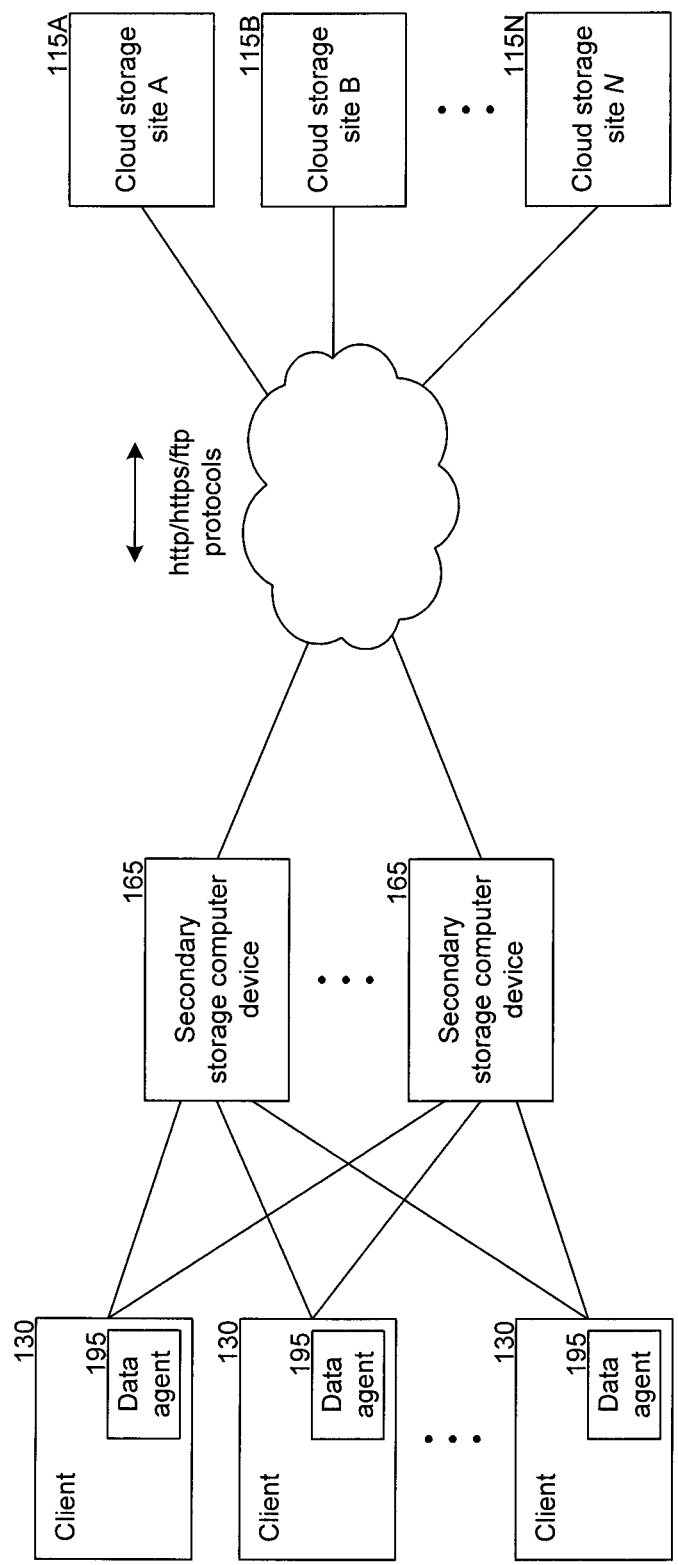
FIG. 1 illustrates an example of one arrangement of resources in a computing network that may employ aspects of the invention.

The headings provided herein are for convenience only and do not necessarily affect the scope or meaning of the claimed invention.

| | |
|---|---|
| Overview | 11 |
| Suitable Environments | 13 |
| Storage Operation Cell | 15 |
| Network Agents | 33 |
| Network Client Agents | 34 |
| Media File System Agent | 34 |
| Cloud Storage Submodules: Vendor-Agnostic File System Calls, Buffering of Storage Requests, and Logging Cloud Storage Performance | 35 |
| Migrating or Copying Data to Secondary Storage, Including Secondary Cloud Storage | 41 |
| Deduplication | 43 |
|    Object-Level Deduplication | 44 |
|    Data Structures for Object-Level Deduplication | 46 |
|    Pruning Object-Level Deduplicated Data | 54 |
|    Sub-Object-Level Deduplication | 58 |
|    Block-Level Deduplication | 60 |
|    Data Structures for Block-Level Deduplication | 63 |
|    Deduplication Databases to Enable Containerized Deduplication to Cloud-Based Storage | 67 |
|    Pruning Block-Level Deduplicated Data | 69 |
|    Containerizing Deduplicated Data for Storage in the Cloud | 73 |
| Indexing of Data | 75 |
| Policy-Driven Storage of Data Across Cloud Storage Sites | 77 |
| Restoring Dehydrated Data Objects from Cloud Storage Sites | 78 |
| Local Searching of Data Stored on Remote Cloud Storage Sites | 81 |
| Collaborative Searching | 82 |
| Cloud Gateway | 87 |
|    Cloud Gateway Architecture | 88 |
|    Cloud Gateway for Cloud Storage Sites and Deduplication and Policy-Driven Data Migration | 91 |
|    Data Recovery in Cloud Storage Sites via Cloud Gateway Device | 98 |
| System Configurations to Provide Data Storage and Management Software as a Service | 100 |
| Object Store | 102 |
| Object Store Methods | 113 |
| Process for Cost-Balancing Cloud Storage | 124 |
| Process for Scheduling Cloud Storage Requests | 130 |
| Process for Encrypting Files within Cloud Storage | 134 |
| Protecting Remote Office and Branch Office (ROBO) Data | 136 |
| Conclusion | 138 |
| CLAIMS | 147 |

Overview

With the massive volume of files being hosted in cloud environments, traditional file system based approaches are failing to scale. As much as 90% of new data created is unstructured and/or file based. As such data makes its way into the cloud, the need for systems that can scale to several million files and possibly petabytes of capacity becomes necessary. Traditional file systems and filers have their strengths, and high-performance file sharing needs still exist within data centers, so existing filers and file systems fulfill that need. Cloud storage, on the other hand, with associated network latencies is not always a good fit for certain use cases. But cloud storage excels with Internet applications where the generation of content can be viral and where it can be virtually impossible to predict capacity or access needs. Cloud storage is also ideal in the case of Web 2.0 applications which promote collaboration between hundreds and thousands of user sharing the same files or objects.

While file systems have been a successful way of allowing people to store their data in an intuitive form that is easy to visualize, they have complexities which get exposed when the number of objects they need to manage reach massive proportions. File systems are typically built on block storage devices and all files are eventually broken down into blocks that need to be placed on the storage system. The file system has to maintain a "table of contents" (e.g. a FAT), which tracks not only what files it is holding, but which blocks on the storage comprise that file. On a system with a massive number of files, each with a large number of blocks, the numbers get large enough that traditional file systems start to slow down or even crash. What's typically done when this happens is that a new file system or filer is added. But the new file system provides a completely different namespace than the original and all users of the file system (humans and applications) need to be aware of this change and know which namespace they need to look in to find their files.

Systems and methods are disclosed herein for performing data storage operations, including content indexing, containerized deduplication, and policy-driven storage, within a cloud environment. The systems support a variety of clients and storage devices that connect to the system in a cloud environment, which permits data transfer over wide area networks, such as the Internet, and which may have appreciable latency and/or packet loss. The system allows available storage devices to include cloud storage sites. Methods are disclosed for content indexing data stored within a cloud environment to facilitate later searching, including collaborative searching. Methods are also disclosed for performing containerized deduplication to reduce the strain on a system namespace and effectuate cost savings. Methods are disclosed for identifying suitable storage locations, including suitable cloud storage sites, for data files subject to a storage policy. Further, systems and methods for providing a cloud gateway and a scalable data object store within a cloud environment are disclosed.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention may include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Unless described otherwise below, aspects of the invention may be practiced with conventional data processing and data storage systems. Thus, the construction and operation of the various blocks shown in the Figures may be of conventional design, and need not be described in further detail herein to make and use aspects of the invention, because such blocks will be understood by those skilled in the relevant art. One skilled in the relevant art can readily make any modifications necessary to the blocks in the Figures based on the detailed description provided herein.

Suitable Environments

The Figures and the discussion herein provide a brief, general description of certain suitable computing environments in which aspects of the invention can be implemented. Although not required, aspects of the invention are described in the general context of computer-executable instructions, such as routines executed by a general-purpose computer, e.g., a server computer, wireless device, or personal computer. Those skilled in the relevant art will appreciate that aspects of the invention can be practiced with other communications, data processing, or computer system configurations, including: Internet appliances, hand-held devices (including personal digital assistants (PDAs), wearable computers, all manner of cellular or mobile phones, multiprocessor systems, microprocessor-based or programmable consumer electronics, set-top boxes, network PCs, minicomputers, mainframe computers, and the like. The terms "computer," "server," "and the like are generally used interchangeably herein, and refer to any of the above devices and systems, as well as any data processor. Aspects of the invention can be practiced in software that controls or operates data storage hardware that is specifically designed for use in data storage networks, e.g., as described in detail herein.

While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), and/or the Internet. In a distributed computing environment, program modules may be located in both local and remote memory storage devices.

Aspects of the invention including computer implemented instructions, data structures, screen displays, and other data may be stored or distributed on tangible computer-readable storage media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed via communication medium, such as over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

FIG. 1 illustrates an example of one arrangement of resources in a computing network that may employ the processes and techniques described herein, although many others are of course possible. Clients 130, as part of their function, may utilize data, which includes files, directories, metadata (e.g., access control list (ACLS) creation/edit dates associated with the data, etc.), and other data objects. The data on the clients 130 is typically a primary copy (e.g., a production copy). During a copy, backup, archive or other storage operation, the clients 130 may send a copy of some data objects (or some components thereof) to a secondary storage computing device 165 by utilizing one or more data agents 195, described below.

The secondary storage computing device 165 may in turn create secondary copies of primary data objects (or some components thereof) in storage devices 115, which may include various cloud storage sites 115A-N. Communications between the secondary storage computing devices 165 and cloud storage sites 115A-N may utilize REST protocols (Representational state transfer interfaces) that satisfy basic C/R/U/D semantics (Create/Read/Update/Delete semantics), or other hypertext transfer protocol ("HTTP")-based or file-transfer protocol ("FTP")-based protocols (e.g. Simple Object Access Protocol).

In conjunction with creating secondary copies in cloud storage sites 115A-N, the secondary storage computing device 165 may also perform local content indexing and/or local object-level, sub-object-level or block-level deduplication when performing storage operations involving various cloud storage sites 115A-N. By providing content indexing and local searching, the system may reduce the time and cost associated with data access or data search requests sent to remote cloud storage sites. By deduplicating locally, the system may reduce the amount of data transfer required over a wide area network between the secondary storage computing devices 165 and the cloud storage sites 115A-N, and may reduce the cost associated with data uploads to and data storage on cloud storage sites. Further details are provided below.

Storage Operation Cell

Figure 2:
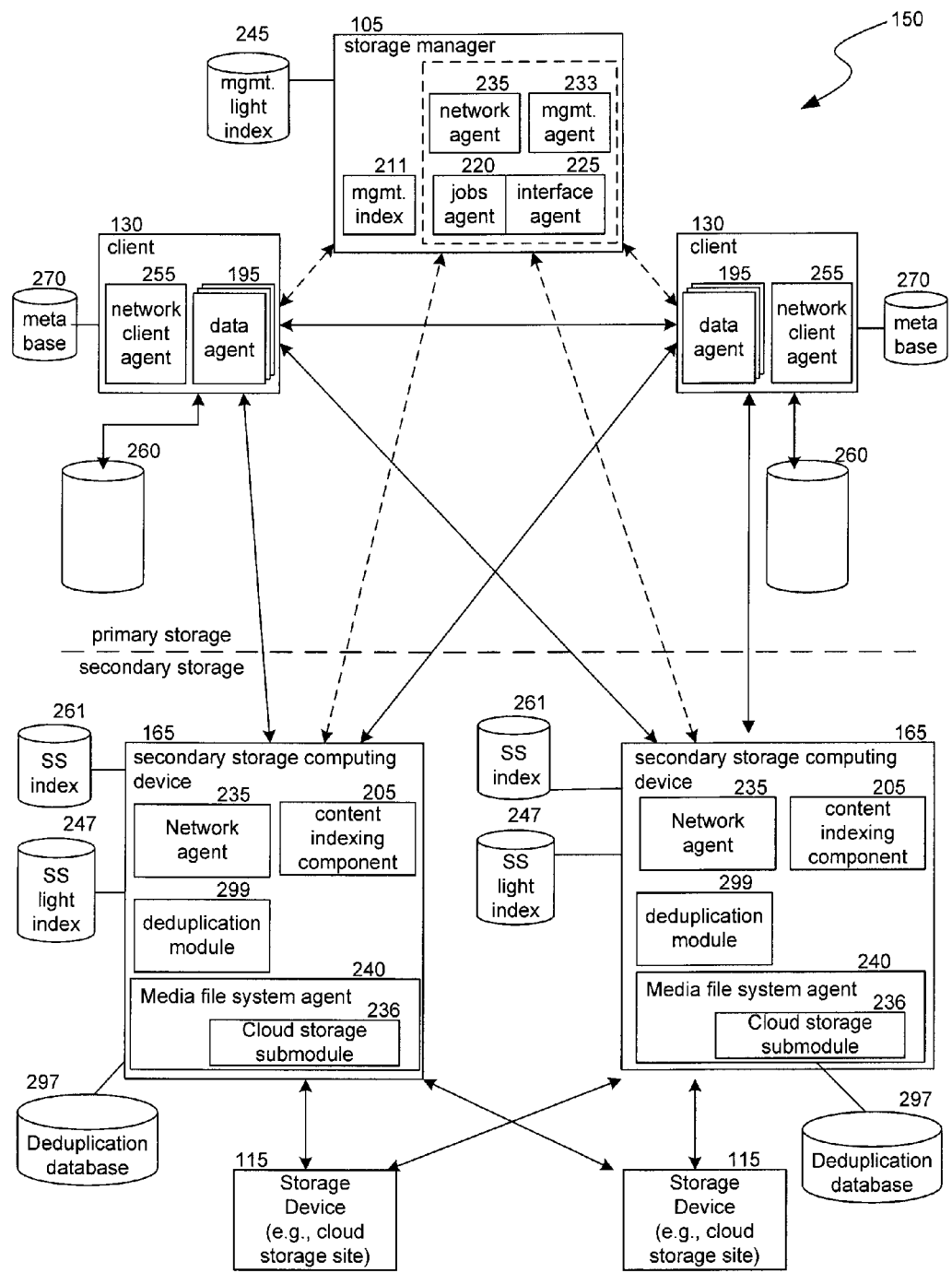
FIG. 2 is a block diagram illustrating an example of a data storage enterprise system that may employ aspects of the invention.

FIG. 2 illustrates an example of one arrangement of a storage operation cell 150 in a computing network that may employ the processes and techniques described herein, although many others are of course possible. FIG. 2 shows a hierarchical arrangement of resources, which includes a storage operation cell 150 having a storage manager 105, one or more data agents 195, one or more network client agents 255, one or more secondary storage computing devices 165, one or more media file system agents 240, one or more storage devices 115, one or more clients 130, and one or more data or information stores 260. The cell 150 also includes a management index 211, a management light index 245, a jobs agent 220, an interface agent 225, a management agent 233, one or more network agents 235, one or more metabases 270, one or more secondary storage indices 261, one or more deduplication modules 299, one or more content indexing components 205, one or more deduplication databases 297, and one or more secondary storage light indices 247. Such system and elements represent a modular storage system such as the CommVault Simpana system, available from CommVault Systems, Inc. of Oceanport, N.J., and further described in the assignee's U.S. Pat. No. 7,035,880, filed Jul. 6, 2000, entitled MODULAR BACKUP AND RETRIEVAL SYSTEM USED IN CONJUNCTION WITH A STORAGE AREA NETWORK. Although not illustrated in FIG. 1, in some implementations, one or more of the secondary storage computing devices 165 (and/or deduplication databases, secondary storage indices, secondary storage light indices, and/or other system components) may reside on one or more cloud storage site 115A-N. For example, in such implementations, a secondary storage computing device may utilize computational resources (e.g., computational processing capacity) provided by a vendor that operates a cloud storage site 115A-N to perform its functionality.

A storage operation cell, such as cell 150, may generally include combinations of hardware and software components associated with performing storage operations on electronic data. (While aspects of the invention are described as employing the hierarchical architecture with cells, those aspects may likewise be employed in other architectures without cells, such as a simple client-server or peer-to-peer configuration.) Storage operation cells 150 may be related to backup cells and provide some or all of the functionality of backup cells as described in the assignee's U.S. Pat. No. 7,395,282 filed Jul. 15, 1999, entitled HIERARCHICAL BACKUP AND RETRIEVAL SYSTEM. However, storage operation cells may also perform additional types of storage operations and other types of storage management functions that are not generally offered by backup cells.

Additional data storage operations performed by storage operation cells 150 may include creating, storing, retrieving, and migrating primary storage data (e.g., data store 260) and secondary storage data (which may include, for example, snapshot copies, backup copies, Hierarchical Storage Management (HSM) copies, archive copies, and other types of copies of electronic data) stored on storage devices 115. In some embodiments, storage operation cells may perform additional storage operations upon copies, including ILM, deduplication, content indexing, data classification, data mining or searching, electronic discovery (E-discovery) management, collaborative searching, encryption and compression. Alternatively or additionally, a storage operation cell may make or retain disaster recovery copies, often as secondary, high-availability disk copies. Such cell may make secondary disk copies to disaster recovery (DR) locations using auxiliary copy or replication technologies. Storage operation cells 150 may also provide one or more integrated management consoles for users or system processes to interface with in order to perform certain storage operations on electronic data. Such integrated management consoles may be displayed at a central control facility or several similar consoles may be distributed throughout multiple network locations to provide global or geographically specific network data storage information.

In one example, storage operations may be performed according to various storage preferences, for example, as expressed by a user preference or a storage policy. A "storage policy" is generally a data structure or other information source that includes a set of preferences and other storage criteria associated with performing a storage operation. The preferences and storage criteria may include, but are not limited to, a storage location (or a class or quality of storage location), deduplication requirements, relationships between system components, network pathways to utilize in a storage operation, retention policies, data characteristics, compression or encryption requirements, preferred system components to utilize in a storage operation, the estimated or historic usage or cost associated with operating system components, frequency or use/access/etc. various time-related factors, single-instancing and/or deduplication information, and other criteria relating to a data storage or management operation. For example, a storage policy may indicate that certain data is to be stored in the storage device 115, retained for a specified period of time before being aged to another tier of secondary storage, copied to the storage device 115 using a specified number of data streams, etc. As one example, a storage policy may specify that certain data should be stored in one or more target cloud storage sites 115A-N, as described herein.

As another example, a storage policy may specify that a first type of files should be retained for one year in a first target cloud storage site 115A, that a second type of files should be retained for seven years in a second cloud storage site 115B, and that a third type of files should be retained indefinitely in a third cloud storage site 115N. As yet another example, a storage policy may specify that a first type of files (e.g., secondary disk copies needed for rapid disaster recovery) be stored only in storage sites 115, including cloud storage sites 115A-N, that can provide sufficient bandwidth, network capacity or other performance to ensure that the time needed to recover a file from the storage device 115 (e.g., cloud storage site 115A-N) is less a specified recovery time objective.

As another example, a storage policy relating to cloud storage sites 115A-N may specify that a cloud storage site should be chosen, at least in part, based on the geographical (or network) proximity between a data source (e.g., client 130 and/or secondary storage computing device 165) and the cloud storage site in order to improve data transfers.

As another example, a storage policy relating to cloud storage sites 115A-N may specify that a first type of files be stored only on cloud storage sites that have a sufficient level of fault tolerance. For example, a storage policy may specify that a first type of files be stored only on cloud storage sites 115A-N that replicate copies of their data across two or more geographically separate regions or across two or more separate power grids. As yet another example, a storage policy may specify that a first type of files be stored only on cloud storage sites 115A-N that satisfy other consumer criteria. For example, a storage policy may specify that a first type of files be stored only on cloud storage sites 115A-N that are certified as being "environmentally green," that align with particular political or social agendas, that do or do not have operations in certain countries (e.g., sites that do have operations in developing nations and/or do not have operations in embargoed countries), or that satisfy some other consumer criteria.

A storage policy might define different classes of storage that should be utilized for different types of data. For example, a storage policy may define "first-class storage" as rapid access media, such as storage devices having magnetic disk (or faster access) storage media, a high bandwidth network connection to the cloud storage site, and a cloud storage site that satisfies certain performance criteria (e.g., has high bandwidth for faster uploads and/or downloads and/or utilizes RAID or similar methods that improve the fault-tolerance of the site). "Second-class storage" may be defined under a storage policy as a second cloud storage site having magnetic tape (or slower access) data storage, lower bandwidth connections and/or less fault tolerance. As another example, a storage policy may define storage classes based on the actual performance achieved by cloud storage sites or other storage devices 115. For example, a storage policy may define first-class storage as cloud storage sites that actually achieve a threshold average throughput, data recovery rate, and/or specified error rate.

To facilitate the selection of cloud storage sites on the basis of actual performance, a storage manager 105, secondary storage computing devices 165 and/or other system components may track, log and/or analyze the performance achieved by cloud storage sites. Thus, a client computer or organization may contract with a cloud storage provider for a defined level of service, where the level of service relates to a storage policy as defined herein (e.g. aggregated data storage volumes, fault tolerance, data recovery rates, threshold latency and/or bandwidth, etc., defined under a service level agreement (SLA).) The client computer may then periodically perform tests or monitor performance of the cloud storage provider as compared to the defined level of service to ensure the appropriate level of service.

In some implementations, a storage policy may comprise an audit policy. An audit policy is a set of preferences, rules and/or criteria that protect sensitive data in the storage operation cell 150. For example, an audit policy may define "sensitive objects" as files or objects that contain particular keywords (e.g. "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site 115A-N, and that if approval is denied for a particular sensitive object, the sensitive object should be transferred to a local storage device 115 instead. To facilitate this approval, the audit policy may further specify how a secondary storage computing device 165 or other system component should notify a reviewer that a sensitive object is slated for transfer.

In some implementations, a storage policy may comprise a provisioning policy. A provisioning policy is a set of preferences, priorities, rules and/or criteria that specify how various clients 130 (or groups of clients 130, e.g., a group of clients 130 associated with a department) may utilize various system resources, including resources such as available storage on cloud storage sites 115A-N and/or the network bandwidth between the storage operation cell 150 and cloud storage sites 115A-N. A provisioning policy may specify, for example, data quotas for particular clients 130 (e.g. a gigabyte amount of data that can be stored monthly, quarterly or annually). Components of the storage operation cell 150, such as the secondary storage computing devices 165, may enforce the provisioning policy (including quotas) during the transfer of data to secondary storage (e.g., during the process 300, shown in FIG. 3B). If a client (typically associated with a department within an organization) exceeds the policy, then a budget for that client/department may be charged for excess storage or resource allocation.

In some implementations, a storage policy may comprise a cost policy. A cost policy is a set of preferences, priorities, rules and/or criteria that specify how to identify suitable storage locations, including suitable cloud storage locations. For example, a cost policy may describe the method of evaluating a cost function, as described in greater detail herein with respect to FIG. 27. Here again, if a client exceeds the policy, then a budget for that client/department may be charged for excess storage or resource allocation.

A storage policy may be stored in a database of the storage manager 105, such as management index 211, or in other locations or components of the system. As will be described in detail herein, the system may utilize a storage policy when identifying suitable storage locations for various data objects subject to the storage policy.

Additionally or alternatively, a "schedule policy" may specify when and how often to perform storage operations and may also specify performing certain storage operations on sub-clients of data and how to treat those sub-clients. A "sub-client" is a portion of one or more clients 130 and can contain either all of the client's 130 data or a designated subset thereof. For example, an administrator may find it preferable to separate email data from financial data using two different sub-clients having different storage preferences, retention criteria, etc. A schedule policy may be stored in the management index 211 of the storage manager 105 and/or in other locations within the system.

Storage operation cells may contain not only physical devices, but also may represent logical concepts, organizations, and hierarchies. For example, a first storage operation cell 150 may be configured to perform a first type of storage operation such as an HSM operation, which may include backup or other types of data migration, and may include a variety of physical components including a storage manager 105 (or management agent 233), a secondary storage computing device 165, a client 130, and other components as described herein. A second storage operation cell 150 may contain the same or similar physical components; however, it may be configured to perform a second type of storage operation, such as a storage resource management ("SRM") operation, and may include monitoring a primary data copy or performing other known SRM operations.

Thus, as can be seen from the above, although the first and second storage operation cells 150 are logically distinct entities configured to perform different management functions (e.g., HSM and SRM, respectively), each storage operation cell 150 may contain the same or similar physical devices. Alternatively, different storage operation cells 150 may contain some of the same physical devices and not others. For example, a storage operation cell 150 configured to perform SRM tasks may contain a secondary storage computing device 165, client 130, or other network device connected to a primary storage volume, while a storage operation cell 150 configured to perform HSM tasks may instead include a secondary storage computing device 165, client 130, or other network device connected to a secondary storage volume and may not contain the elements or components associated with and including the primary storage volume. (The term "connected" as used herein does not necessarily require a physical connection; rather, it could refer to two devices that are operably coupled to each other, communicably coupled to each other, in communication with each other, or more generally, refer to the capability of two devices to communicate with each other, often with intervening components in between.) These two storage operation cells 150, however, may each include a different storage manager 105 that coordinates storage operations via the same secondary storage computing devices 165 and storage devices 115. This "overlapping" configuration allows storage resources to be accessed by more than one storage manager 105, such that multiple paths exist to each storage device 115 facilitating failover, load balancing, and promoting robust data access via alternative routes.

Alternatively or additionally, the same storage manager 105 may control two or more storage operation cells 150 (whether or not each storage operation cell 150 has its own dedicated storage manager 105). Moreover, in certain embodiments, the extent or type of overlap may be user-defined (through a control console) or may be automatically configured to optimize data storage and/or retrieval.

The clients 130, as part of their function, may utilize data, which includes files, directories, metadata, and other data objects. The data on the clients 130 is typically a primary copy (e.g., a production copy). During a copy, backup, archive or other storage operation, the clients 130 may send a copy of some data objects to a secondary storage computing device 165 by utilizing one or more data agents 195.

The data agent 195 may be a software module or part of a software module that is generally responsible for storage operations, such as copying, archiving, migrating, and recovering data from client 130 stored in data store 260 or other memory location. Each client 130 may have at least one data agent 195, and the system can support multiple clients 130. Data agent 195 may be distributed between client 130 and storage manager 105 (and any other intermediate components), or it may be deployed from a remote location or its functions approximated by a remote process that performs some or all of the functions of data agent 195.

The overall system may employ multiple data agents 195, each of which may back up, migrate, archive, and recover data associated with a different application. For example, different individual data agents 195 may be designed to handle Microsoft Exchange data, Lotus Notes data, Microsoft Windows 2000 file system data, Microsoft Active Directory Objects data and other types of data known in the art. Other embodiments may employ one or more generic data agents 195 that can handle and process multiple data types rather than using the specialized data agents described above.

If a client 130 has two or more types of data, one data agent 195 may be required for each data type to copy, archive, migrate, and restore the data of the client 130. Alternatively, the overall system may use one or more generic data agents 195, each of which may be capable of handling two or more data types. For example, one generic data agent 195 may be used to back up, migrate, and restore Microsoft Exchange 2000 Mailbox data and Microsoft Exchange 2000 Database data while another generic data agent 195 may handle Microsoft Exchange 2000 Public Folder data and Microsoft Windows 2000 File System data, etc.

The data agents 195 may be responsible for arranging or packing data to be copied, transferred, or migrated into a certain format such as an archive file format. Nonetheless, it will be understood that this represents only one example, and any suitable packing or containerization technique or transfer methodology may be used if desired. Such an archive file may include a metadata list of files or data objects copied in metadata, the file, and data objects themselves. Moreover, any data moved by the data agents may be tracked within the system by updating indexes associated with appropriate storage managers 105 or secondary storage computing devices 165. As used herein, a file or a data object refers to any collection or grouping of bytes of data that can be viewed as one or more logical units.

The network client agent 255 may be a software module, part of a software module, and/or may comprise hardware that generally provides the client 130 with the ability to communicate with other components within the system, such as storage manager 105, other clients 130, and secondary storage computing devices 165. Network client agent 255 may permit communication via one or more proprietary and/or non-proprietary network protocols, notably to cloud-based storage, as described herein.

Generally speaking, the storage manager 105 may be a software module or other application that coordinates and controls storage operations performed by storage operation cell 150. Storage manager 105 may communicate with some or all elements of storage operation cell 150 including clients 130, data agents 195, secondary storage computing devices 165, and storage devices 115 to initiate and manage system backups, migrations, data recovery, and other storage operations.

Storage manager 105 may include a jobs agent 220 that monitors the status of some or all storage operations previously performed, currently being performed, or scheduled to be performed by storage operation cell 150, including storage jobs sent to cloud-based storage. Jobs agent 220 may be communicatively coupled to interface agent 225 (e.g., a software module or application). Interface agent 225 may include information processing and display software, such as a graphical user interface ("GUI"), an application programming interface ("API"), or other interactive interface through which users and system processes can retrieve information about the status of storage operations. Through interface agent 225, users may optionally issue instructions to various storage operation cells 150 regarding the performance of the storage operations as described and contemplated herein. For example, a user may modify a schedule concerning the number of pending snapshot copies or other types of copies scheduled as needed to suit particular requirements. As another example, a user may employ the GUI to view the status of pending storage operations in some or all of the storage operation cells 150 in a given network or to monitor the status of certain components in a particular storage operation cell 150 (e.g., the amount of storage capacity left in a particular storage device 115). In some embodiments, users or other system processes may retrieve information or issue commands by employing API commands sent to the interface agent via the network agent 235.

The storage manager 105 may also include a management agent 233 that is typically implemented as a software module or application program. In general, management agent 233 provides an interface that allows various management agents 233 in other storage operation cells 150 to communicate with one another. For example, assume a certain network configuration includes multiple storage operation cells 150 adjacent to one another or otherwise logically related in a WAN or LAN configuration. In this arrangement, each storage operation cell 150 may be connected to the other through a respective interface agent 225. This allows each storage operation cell 150 to send and receive certain pertinent information from other storage operation cells 150, including status information, routing information, information regarding capacity and utilization, etc. These communications paths may also be used to convey information and instructions regarding storage operations. The storage operation cells 150 can be organized hierarchically such that hierarchically superior cells control or pass information to hierarchically subordinate cells or vice versa.

Storage manager 105 may also maintain a management index 211, database, or other data structure. The data stored in management index 211 may be used to indicate logical associations between components of the system, user preferences, management tasks, media containerization and data storage information or other useful data. For example, the storage manager 105 may use data from management index 211 to track the logical associations between secondary storage computing device 165 and storage devices 115 (or the movement of data as containerized from primary to secondary storage). In the case of cloud-based storage, the management index may indicate which cloud-based storage site(s) stores which data set.

Storage manager 105 may also include a network agent 235 that is typically implemented as a software module or part of a software module. In general, network agent 235 provides the storage manager 105 with the ability to communicate with other components within the system, such as clients 130, data agents 195, and secondary storage computing devices 165. As with the network client agents 255, the network agents 235 may permit communication via one or more proprietary and/or non-proprietary network protocols. Network agent 235 may be communicatively coupled to management light index 245, management index 211, jobs agent 220, management agent 233, and interface agent 225.

Generally speaking, the secondary storage computing device 165, which may include or be a media agent, may be implemented as a software module that conveys data, as directed by storage manager 105, between a client 130 and one or more physical storage devices 115, such as a tape library, a magnetic media storage device, an optical media storage device, a cloud storage site, or any other suitable storage device. In one embodiment, secondary storage computing device 165 may be communicatively coupled to and control a storage device 115. A secondary storage computing device 165 may be considered to be associated with a particular storage device 115 if that secondary storage computing device 165 is capable of routing and storing data to that particular storage device 115.

In operation, a secondary storage computing device 165 associated with a particular storage device 115 may instruct the storage device 115 to use a robotic arm or other retrieval means to load or eject a certain storage media. Secondary storage computing device 165 may also instruct the storage device 115 to archive, migrate, restore, or copy data to or from the storage device 115 or its associated storage media. Secondary storage computing device 165 may also instruct the storage device 115 to delete, sparsify, destroy, sanitize, or otherwise remove data from the storage device 115 or its associated storage media. Secondary storage computing device 165 may communicate with a storage device 115 via any suitable communications path, including SCSI, a Fibre Channel communications link, or a wired, wireless, or partially wired/wireless computer network, including the Internet. In some embodiments, the storage device 115 may be communicatively coupled to the storage manager 105 via a storage area network (SAN).

A secondary storage computing device 165 may also include at least one media file system agent 240. Each media file system agent 240 may be a software module or part of a software module that is generally responsible for archiving, migrating, restoring, accessing, reading, writing, moving, deleting, sanitizing, or otherwise performing file system and data storage operations on various storage devices 115 of disparate types. For example, media file system agent 240 may be configured to permit secondary storage computing device 165 to open, read, write, close, and delete data on cloud storage sites or storage devices 115 having optical, magnetic, or tape media.

A secondary storage computing device 165 may also include a network agent 235 similar or identical to that described previously. Generally, network agent 235 provides the secondary storage computing device 165 with the ability to communicate with other components within the system, such as other secondary storage computing devices 165, storage manager 105, clients 130, data agents 195, and storage devices 115. Network agent 235 generally provides communication via one or more proprietary and/or non-proprietary network protocols.

A secondary storage computing device 165 may also include a content indexing component 205 to perform content indexing of data in conjunction with the archival, restoration, migration, or copying of data, or at some other time. Content indexing of data is described in greater detail herein. Each secondary storage computing device 165 may maintain an index, a database, or other data structure (referred to herein as "secondary storage index" or "SS index" 261) that may store index data generated during backup, migration, restoration, and other storage operations for secondary storage ("SS") as described herein, including creating a metabase (MB). For example, performing storage operations on Microsoft Exchange data may generate index data. Such index data provides a secondary storage computing device 165 or other external device with an efficient mechanism for locating data stored or backed up. Thus, an SS index 261 and/or a management index 211 of a storage manager 105 may store data associating a client 130 with a particular secondary storage computing device 165 or storage device 115, for example, as specified in a storage policy, while an SS index 261, metabase, database, or other data structure in secondary storage computing device 165 may indicate where specifically the data of the client 130 is stored in storage device 115, what specific files were stored, and other information associated with storage of the data of the client 130. In some embodiments, such index data may be stored along with the data backed up in a storage device 115, with an additional copy of the index data written to index cache in a secondary storage device 165. Thus the data is readily available for use in storage operations and other activities without having to be first retrieved from the storage device 115.

Generally speaking, information stored in cache is typically information that reflects certain particulars about operations that have recently occurred. After a certain period of time, this information is sent to secondary storage and tracked. This information may need to be retrieved and uploaded back into a cache or other memory in a secondary computing device before data can be retrieved from storage device 115. In some embodiments, the cached information may include information regarding the format or containerization of archives or other files stored on storage device 115.

A secondary storage computing device 165 may also include a deduplication database 297 to perform deduplication of data in conjunction with the archival, restoration, migration, or copying of data, or at some other time. The secondary storage computing devices 165 may also maintain one or more deduplication databases 297. Single instancing is one form of deduplication and generally refers to storing in secondary storage only a single instance of each data object (or each data sub-object or each data block) in a set of data (e.g., primary data). More details as to single instancing may be found in one or more of the following commonly assigned U.S. patent applications: 1) U.S. Pat. Pub. No. 2006-0224846 (entitled SYSTEM AND METHOD TO SUPPORT SINGLE INSTANCE STORAGE OPERATIONS; 2) U.S. Pat. Pub. No. 2009-0319585 (entitled APPLICATION-AWARE AND REMOTE SINGLE INSTANCE DATA MANAGEMENT; 3) U.S. Pat. Pub. No. 2009-0319534 (entitled APPLICATION-AWARE AND REMOTE SINGLE INSTANCE DATA MANAGEMENT, 4) U.S. Pat. Pub. No. 2008-0243879 (entitled SYSTEM AND METHOD FOR STORING REDUNDANT INFORMATION; and 5) U.S. Pub. App. No. 2008-0229037 (entitled SYSTEMS AND METHODS FOR CREATING COPIES OF DATA, SUCH AS ARCHIVE COPIES.

Another form of deduplication is variable instancing, which generally refers to storing in secondary storage one or more instances, but fewer than the total number of instances, of each data block (or data object or data sub-object) in a set of data (e.g., primary data). More details as to variable instancing may be found in the commonly assigned U.S. Pat. App. No. 61/164,803 (entitled STORING A VARIABLE NUMBER OF INSTANCES OF DATA OBJECTS. The deduplication module 299 and deduplication database 297 are described in greater detail herein.

As shown in FIG. 2, clients 130 and secondary storage computing devices 165 may each have associated metabases or indices (270 and 261, respectively). However, in some embodiments, each "tier" of storage, such as primary storage, secondary storage, tertiary storage, etc., may have multiple metabases/indices or a centralized metabase/index, as described herein. For example, rather than a separate metabase or index associated with each client in FIG. 2, the metabases/indices on this storage tier may be centralized. Similarly, second and other tiers of storage may have either centralized or distributed metabases/indices. Moreover, mixed architecture systems may be used if desired, that may include a first tier centralized metabase/index system coupled to a second tier storage system having distributed metabases/indices and vice versa, etc.

Moreover, in operation, a storage manager 105 or other management module may keep track of certain information that allows the storage manager to select, designate, or otherwise identify metabases/indices to be searched in response to certain queries as further described herein. Movement of data between primary and secondary storage may also involve movement of associated metadata and index data and other tracking information as further described herein.

In some embodiments, management index 211 and/or SS index 261 may provide content indexing of data generated during backup, migration, restoration, and other storage operations. In this way, management index 211 and/or SS index 261 may associate secondary storage files with various attributes, characteristics, identifiers, or other tags or data classifications associated with the file content. In such embodiments, a user of storage operation cell 150 may search for content within the storage operation cell via the interface agent 225. Methods of performing content indexing and searching, including collaborative searching, within a storage operation cell 150 are described in the commonly assigned U.S. Patent Publication Nos. 2008-0091655 (entitled METHOD AND SYSTEM FOR OFFLINE INDEXING OF CONTENT AND CLASSIFYING STORED DATA) and 2008-0222108 (entitled METHOD AND SYSTEM FOR COLLABORATIVE SEARCHING).

In some embodiments, storage manager 105 may also include or be operably coupled to a management light index 245 that may store index data, metadata, or other information generated during backup, migration, restoration, or other storage operations. The management light index 245 provides storage manager 105 and other components with an alternate mechanism for locating data stored or backed up, so that they may more rapidly respond to client 130 or other requests received via HTTP or similar protocols that are susceptible to time-outs.

Management light index 245 may store some subset of the information contained in management index 211, SS index 261, client metabase 270 and/or other information. For example, the management light index 245 comprises the following information about each data file in the storage operation cell 150: a file name or other descriptor, a descriptor for the client 130 or sub-client associated with the file (typically the client 130 that created the file), the size of the file, the storage location of the file (including the storage device, associated secondary storage computing devices 165 and/or other index data), file type (e.g., file extension or descriptor to associate an application with the file), etc. In some embodiments, the management light index 245 may comprise additional information, such as limited content information.

Within the management light index 245, each data file may also be associated with a token that uniquely identifies the data file. In some embodiments, however, the token may not be unique for all data files in the management light index 245; instead, the combination of the token with another data field (e.g., the associated client 130) may be unique.

During the operation of the storage operation cell 150, management light index 245 may be populated or changed. For example, whenever a secondary storage operation is performed (due to a client 130 request, a scheduled job, the application of a storage policy, or otherwise), the management light index 245 may be updated by the storage manager 105, secondary storage computing device 165, or other system component responsible for performing some or all of the storage operation. For example, if a client 130 (or its data agent 195) requests the creation of a backup, archival, or other secondary copy, the secondary storage computing device 165 (e.g. cloud-based storage site) creating that secondary copy may create one or more new entries in the management light index 245 reflecting the name, location, size, and client 130 associated with the newly created secondary copy. As another example, if due to an ILM storage policy, a file is migrated from a first storage device 115 to a second storage device 115, a secondary storage computing device 165 may update the management light index 245 to reflect the new location of the file.

In one example, the management light index 245 may only be populated with information regarding data files that originated from clients 130 that connect to the storage operation cell 150 via certain network protocols. For example, the management light index 245 may only be populated with information regarding data files that originated from clients 130 that connect to the storage operation cell 150 via the HTTP protocol.

The secondary storage computing device 165 may include or be operably coupled to a secondary storage light index 247 ("SS light index"). Typically SS light index 247 comprises a subset of the information included in management light index 245. For example, SS light index 247 includes a subset of information pertaining to secondary storage data files stored in storage devices 115 associated with the secondary storage computing device 165. During the operation of the storage operation cell 150, SS light index 247 may be populated or changed in the same or similar manner as management light index 245.

The management light index 245 and SS light index 247 may be implemented in a non-relational database format, such as C-Tree from Faircom, Inc., SimpleDB from Amazon, Inc., or CouchDB from the Apache Software Foundation. In this way, the storage manager 105 may provide a faster response to client 130 or other requests than if it were to query management index 211, metabase 270 and/or SS index 261, and thus prevent time-outs when communicating via certain network protocols such as HTTP. Components of the storage operation cell 150 system, such as storage manager 150, may be configured to facilitate data storage provisioning and/or cost charge backs. In some implementations, the system may evaluate the state of stored data relative to enterprise needs by using weighted parameters that may be user defined, e.g., in order to facilitate the generation of or enforcement of a provisioning policy. In some implementations, the system may calculate data costing information and other information including information associated with the cost of storing data and data availability associated with storage operation cells, e.g., in order to facilitate charge backs. The system may identify network elements, associated characteristics or metrics with the network elements, receive additional data, such as SRM or HSM data, from storage operation cells, and correlate the additional data with the network elements to calculate a cost of data storage or an availability of data. In some implementations, data may be identified according to user, department, project, or other identifier. In other implementations, data availability or data cost is compared to a service level agreement (SLA). In some implementations, a prediction of media usage is generated according to data use, availability, or cost. Further details regarding provisioning and charge backs may be found in the commonly assigned U.S. application Ser. No. 12/015,470, filed Jan. 16, 2008, entitled "SYSTEMS AND METHODS FOR STORAGE MODELING & COSTING," which is hereby incorporated herein in its entirety.

In some implementations, storage manager 150 may comprise a management module configured to predict and plan future storage needs. The management module may receive information related to storage activities associated with one or more storage operation components within the storage operation cell under the direction of the storage manager component. The management module is adapted to predict storage operation resource allocations based on the received information related to the storage activities. Further details relating to the prediction of storage operation resource allocations may be found in the commonly assigned U.S. application Ser. No. 11/639,830, filed Dec. 15, 2006, entitled "System and Method for Allocation of Organizational Resources", and U.S. application Ser. No. 11/825,283, filed Jul. 5, 2007, entitled "System and Method for Allocation of Organizational Resources", which are hereby incorporated herein in their entirety.

In some implementations, components of the storage operation cell 150, may be configured to copy data of one or more virtual machines being hosted by one or more non-virtual machines (e.g., hosted by a cloud storage site 115A-N). Further details relating to copying data of virtual machines may be found in the commonly assigned U.S. application Ser. No. 12/553,294, filed Sep. 3, 2009, entitled "SYSTEMS AND METHODS FOR MANAGEMENT OF VIRTUALIZATION DATA," which is hereby incorporated herein in its entirety.

Network Agents

Network agent 235 may comprise one or more sub-processes or network subagents, which are typically implemented as a software module or part of a software module. Each network subagent may be responsible for managing communications between the network agent 235 and a remote device conducted via a particular network protocol, such as HTTP. Remote devices might include any component of the storage operation cell 150, such as clients 130, secondary storage computing devices 165, storage devices 115, storage managers 105 or other networked devices. Each network subagent may do some or all of the following: accept or initiate connections to remote devices; authenticate remote devices and/or specific users on remote devices; receive requests from remote devices; provide responses to remote devices; log requests and responses; detect or respond to network time-outs; compress or encrypt data; serve data or content to remote devices; redirect remote devices to other system components; call other applications, scripts, or system resources; and implement bandwidth throttling. Each network subagent may include instructions for interpreting routines, data structures, object classes, and/or protocols defined in a particular API or similar interface.

Typically, each subagent manages communications made via a particular network protocol. For example, each subagent manages communications utilizing a particular layer protocol, such as a transport layer protocol like Transport Control Protocol ("TCP") from the TCP/IP (Internet Protocol). However, a subagent may additionally or alternatively manage one or more protocols from a layer other than the transport layer (e.g., application layer), more than one transfer layer protocol.

Typical network subagents, include an HTTP subagent, an FTP subagent, and a proprietary protocol subagent. An HTTP subagent may manage connections that utilize HTTP and/or HTTP over TLS/SSL ("HTTPS"). An FTP subagent may manage connections to the network agent 235 that utilize the FTP and/or secure FTP. A proprietary protocol subagent may manage connections that utilize a particular proprietary application-layer protocol. In some embodiments, the proprietary protocol subagent may be configured to facilitate a virtual private network connection running over an HTTPS protocol, or another type of open/secure pipe wrapped in an HTTPS protocol. Non-exclusive examples of other possible network subagents (not shown) include network subagents to implement the common internet file system (CIFS) protocol and the network file system (NFS) protocol.

Network Client Agents

Network client agents 255 are similar to the network agents 235. Typically, each network client subagent manages communications utilizing a network protocol, and is substantially similar to the network subagents described above. Thus, typical network client subagents include an HTTP client subagent, an FTP client subagent, a proprietary protocol client subagent, and a telecommunications protocol client subagent. An HTTP client subagent may be a web browser application configured to connect both to network client agents 255 as well as other resources such as general Internet or web servers. A telecommunications protocol client subagent may manage remote connections that utilize data transfer protocols supported by certain types of telecommunications networks, e.g., Global System for Mobile (GSM), code/time division multiple access (CDMA/TDMA), and/or 3rd Generation (3G) telecommunications networks. For example, telecommunications protocol client subagent may permit a user to initiate an HTTP connection by using an API associated with a mobile operating system such as Windows Mobile, BlackBerry OS, iPhone OS, Palm OS, Symbian, and Android.

Media File System Agent

Media file system agent 240 may comprise one or more media submodules. Each media submodule may permit the media file system agent 240 to perform basic file system commands (e.g., open, read, write, close, and delete) on a certain type of storage device 115, and/or to otherwise direct a certain type of storage device 115 to perform file system or storage operations. For example, the media file system agent 240 may comprise tape, optical and/or magnetic submodules to open, read, write, close, and delete data files on storage devices utilizing tape, optical and magnetic media, respectively. Media file system agent 240 may also comprise one or more cloud storage submodules 236 that permit the media file system agent 240 to open, read, write, close, and delete data files stored on cloud storage sites and/or otherwise direct cloud storage sites to perform data storage operations.

Cloud Storage Submodules: Vendor-Agnostic File System Calls, Buffering of Storage Requests, and Logging Cloud Storage Performance Each cloud storage vendor associated with a particular cloud storage site 115A-N utilized by the system may provide an API that has vendor-specific implementation of basic file system calls. For example, each vendor API may prescribe a different functional call for opening/creating a new data file on the vendor's cloud storage site. Typically a cloud storage vendor API will utilize REST-based protocols. The system described herein may used a cloud storage submodule to map each generic file system command (e.g., an open command) to the various implementations of the command as defined in each of the APIs provided by the various cloud storage vendors. Using the mapping, a cloud storage submodule may convert a generic file system command received by the media file system agent 240 into the appropriate vendor-specific call for a target cloud storage site 115A-N. In this way, the cloud storage submodule permits the system to ignore implementation details of the various cloud storage sites 115A-N used by the system and simply treat each site in a manner analogous to local data storage media, such as local optical or tape media. In this manner, a cloud storage submodule may obviate the need for complex scripting or the addition of disparate cloud gateway appliances to write data to multiple cloud storage site targets. In this way, a cloud storage submodule 236 also presents clients 130 and other system components with a unified name space, even if the system is storing data on multiple cloud storage sites 115.

For example, the cloud storage submodule 236 includes an interface to translate the REST-based protocols of the Amazon S3 APIs, the Windows Azure APIs and the Rackspace APIs into generic commands for use with a file system such as Windows, Solaris, Unix or Linux. Thus, the cloud storage submodule converts the format and parameters of relevant storage vendor APIs, such as "open file" and "write file", into a normalized or generic format for use with file systems. (The cloud storage submodule may likewise convert, if needed, the generic format into a format for specific file systems such as Windows, Linux, etc.) As shown in FIG. 2, the cloud storage submodule 236 may reside on media file system agent 140 located on the secondary storage computing device 165 to initiate file system and storage operations on cloud storage sites (including data transfers to and from a site). To initiate file system and storage operations, the cloud storage submodule 236 may invoke the network agent 235, via an HTTP subagent, an FTP subagent, or another type of network subagent, to open a suitable network connection to a target cloud storage site so that the cloud storage submodule may make various file system requests upon the target cloud storage site for storage operations via this network connection.

Some cloud storage site APIs may provide advanced functionality to manipulate files stored on a cloud storage site that extend beyond basic file system calls such as open, read, write. For example, cloud storage site APIs may provide commands for the encryption, compression and/or other advanced file operations. Cloud storage submodules may map generic advanced file operations (e.g., a generic encryption command) to the various implementations of the command as defined in each of the APIs provided by the various cloud storage vendors. As one example, a cloud storage site API may provide a command to encrypt a file located on the cloud storage site using an encryption method that does not result in the cloud storage site receiving a key (or does not result in the cloud storage site receiving or retaining other information sufficient to decrypt an encrypted file). For example, a cloud storage site API may permit storing encrypted data belonging to a client on a cloud storage site, together with an encrypted version of the encryption key that was used to encrypt the encrypted data. A password would be required from the client in order to decrypt the encrypted version of the encryption key stored on the storage system belonging to the application service provider. This is advantageous for the client, because it would prevent the application service provider from decrypting the data belonging to the customer, without the customer's permission.

Additionally, using the mapping, a cloud storage submodule 236 may permit other system components to direct one cloud storage site 115 to transfer some or all files to another cloud storage site 115, without first transferring the files back to the storage cell 150. In this way, the system may efficiently and effectively "fire" underperforming or expensive cloud storage sites 115 or otherwise adjust how it uses multiple cloud storage sites 115A-N. For example, if the system determines that a cloud storage site is underperforming, it may transfer files from the underperforming site to a different site that is meeting performance metrics specified in a storage policy.

When a cloud storage submodule 236 initiates file system and storage operations on a cloud storage site, it may determine or test and record (or report, e.g., to a storage manager 105) the performance achieved by the cloud storage site, such as the throughput of the site, the number of failures that occurred, the number of timeouts, speed of restores, speed of responses to queries, or other metrics. By determining the actual performance of cloud storage sites 115A-N, the storage operation cell 150 may adjust its classifications of various cloud storage sites 115 (e.g., as first-class storage, as second-class storage, etc.) dynamically or periodically. Additionally, on a periodic basis, the system may determine which cloud storage sites are underperforming so that it may transfer files from the underperforming site to a different site that is meeting performance metrics specified in a storage policy or take other suitable action (e.g., requesting a reduced storage price).

A cloud storage submodule 236 may also store and/or manage credentials or other authorization and connection information (e.g., site configuration settings, login information, certificates, etc.) that permit the cloud storage submodule to perform storage operations on a cloud storage site 115. To add a new cloud storage site 115 to the storage operation cell 150, the system may populate each cloud storage submodule with the appropriate configuration settings or credentials for the new site.

The cloud storage submodule 236, during a period of its operation, may receive a series of similar requests for the submodule to transfer data to a target cloud storage site (e.g., cloud storage site 115A); each individual request in the series may only involve a small amount of data (e.g., a few data blocks or a small data object such as an email). For example, since the system may utilize cloud storage submodule to transfer data to cloud storage sites 115A-N during containerized deduplication, it may receive a series of similar file requests (e.g., to write several small email data objects to the same target container file on the same target cloud storage site). To facilitate more efficient data transmission, which may occur over a lossy and/or latent WAN (such as the Internet), the cloud storage submodule may utilize two or more local buffers (e.g., buffers stored in local memory, such as local RAM) to manage the series of transfer requests. The buffers need not be large, and could be set in one embodiment to 128 k each, although larger buffers may of course be used, and the size of the various buffers used by the cloud storage submodule may be configurable by the user.

As an example, the cloud storage submodule 236 may maintain a first buffer that reflects the data transmitted in the last storage request from the cloud storage submodule to the target cloud storage site 115A. By maintaining the first buffer, the cloud storage submodule can easily and more quickly restart data transmission if the last request fails (e.g., due to packet loss/latency). In this example, the cloud storage submodule may maintain a second buffer that aggregates the data associated with various storage requests received by the cloud storage submodule from other system components (e.g., the deduplication module 299) since the cloud storage submodule began transmitting the last storage request to the target cloud storage site 115A. In this example, the contents of the second buffer may be sent as a second request to the cloud storage site 115A once the cloud storage submodule successfully transmits the last request and/or receives confirmation that the cloud storage site 115A successfully received the last request.

In this example, the size of the buffers may be adjusted to reflect relative network latency and network bandwidth. For example, a larger buffer size may be chosen if the network latency is high, so that more data may be added to the second buffer while the cloud storage submodule transmits the last request and/or awaits a response from the target cloud storage site 115-A regarding the last storage request. As another example, a smaller buffer size may be chosen if the network bandwidth is low, since the maximum transmission size imposed by TCP/IP protocols may be lower. Buffering a series of requests in this manner may improve transmission efficiency, since it may result in the transmission of less non-data (e.g., less transmission of padding zeros added to the transmission as a result of TCP/IP protocols).

Figure 3A:
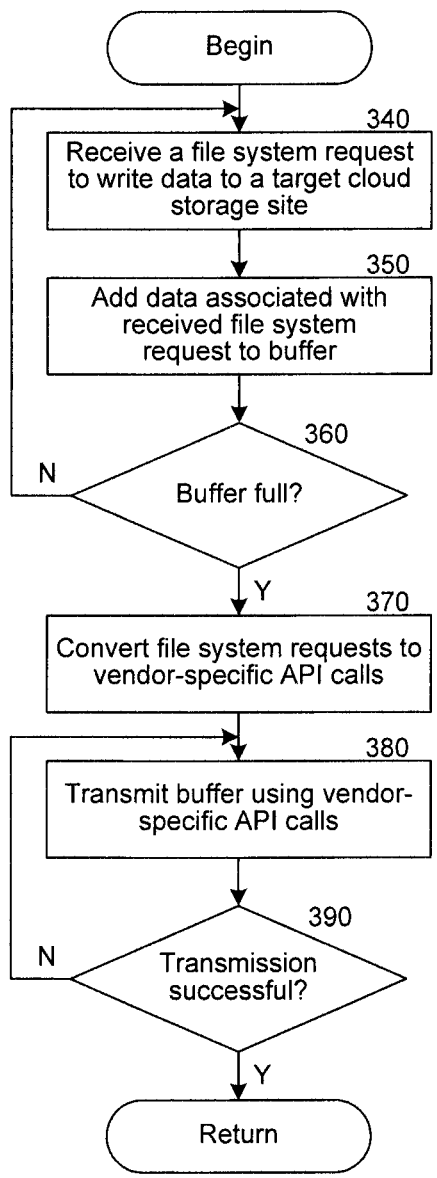
FIG. 3A is a flow diagram illustrating a routine for writing data to cloud storage sites.

FIG. 3A is a flow diagram illustrating a method 300 for writing data to cloud storage sites. A cloud storage submodule 236 or another system component may perform method 300 to provide other system components with vendor-agnostic file system calls and/or efficient data transmission to cloud storage sites 115A-N. At step 340, cloud storage submodule 236 receives a file system request to write data to a target cloud storage site 115A-N. For example, cloud storage submodule 236 may receive a request to write N blocks to a first container file located on a first cloud storage site. At step 350, cloud storage submodule 236 adds the received data (e.g., N blocks of data) to a buffer.

Although not shown, prior to step 350, cloud storage submodule 236 may first determine if the received request has sufficiently similar characteristics to other prior requests that are reflected in the buffer. For example, cloud storage submodule 236 may determine if the instant file system request has the same target file on the same target cloud storage site 115A-115N as other file system requests whose data is already stored in the buffer. If the request is not sufficiently similar, cloud storage submodule 236 may proceed to step 370 instead. Cloud storage submodule 236 may also allocate a new buffer and initiate a new parallel process 300 to handle the latest request using the new buffer. Additionally, although not shown, prior to step 350, cloud storage submodule 236 may determine if the file system request relates to a set of data exceeding the buffer size (or another threshold size). If the related set of data is larger than the threshold size, the cloud storage submodule 236 may simply convert the received file system request to one or more vendor-specific API calls and transmit the set of data separately from the other buffered requests before proceeding to step 340. For example, a received 2 MB file may bypass the buffering and simply proceed on in the process.

At decision step 360, cloud storage submodule 236 determines if the buffer is full. If it is not full, steps 340-360 are repeated. For example, cloud storage submodule 236 may receive a request to store M additional blocks to the same file and add these M blocks of data to the buffer. If the buffer is full at decision step 360, cloud storage submodule 236 proceeds to step 370. At step 370, cloud storage submodule converts the received file system requests to one or more vendor-specific API calls. For example, using the mapping described herein, cloud storage submodule may identify the calls from the target cloud storage site API that cause the target cloud storage site to (1) open a target file on the target cloud storage site for writing, and (2) write the received and buffered data to the target file. At step 380, cloud storage submodule transmits the buffer using the vendor-specific API calls. To transmit the buffer, cloud storage submodule may utilize a network agent 235 to establish an HTTP, HTTPS, and/or other suitable network connection to the target cloud storage site. At step 390, generally after waiting a sufficient time for a response from the target cloud storage site, cloud storage submodule determines if the transmission was successful. If it was successful, process 300 returns. Otherwise, steps 380 and 390 are repeated and the data is re-transmitted.

Although not shown in FIG. 3A, while cloud storage submodule 236 is performing steps 380-390, it may also allocate a new buffer to manage new file system requests and may initiate a parallel process 300 to manage these new file system requests using the new buffer.

Cloud storage submodule 236 may be configured to permit a direct interface to cloud storage sites 115A-N by presenting cloud storage sites to a user or system in the same manner as a local storage volume. For example, a cloud storage submodule 236 operating on a computing device may permit the operating system of that computing device to "mount" a cloud storage site as a storage volume or otherwise provide an interface to have the cloud storage site display to the operating system of the computer as a locally attached drive (similar to network attached storage (NAS)). Cloud storage submodule 236 may further permit the operating system to make various file system requests upon the mounted cloud storage site in a manner analogous to local disk storage. In such implementations, cloud storage submodule 236 may be installed on clients 130 to facilitate easier utilization of remote cloud storage sites.

Figure 3B:
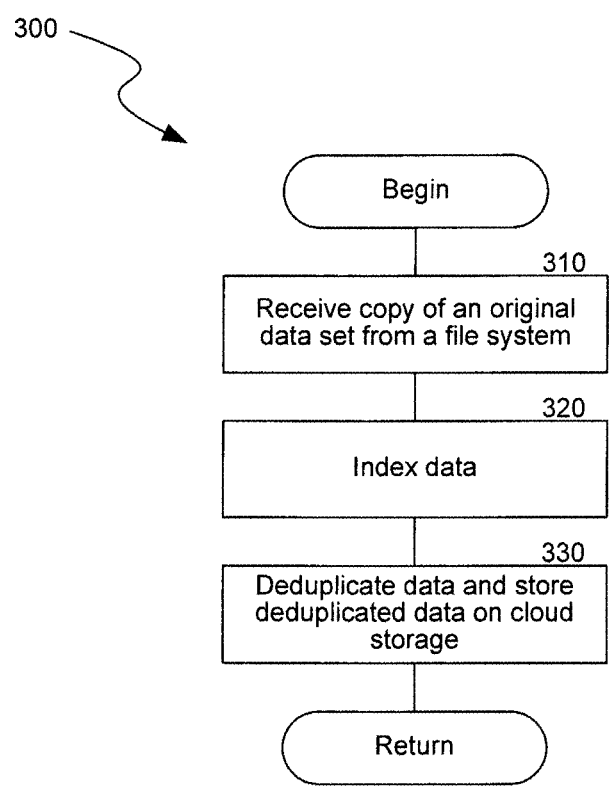
FIG. 3B, is a flow diagram illustrating a routine for migrating or copying data into an archive format in secondary storage, including secondary cloud storage.

Migrating or Copying Data to Secondary Storage, Including Secondary Cloud Storage FIG. 3B shows a flow diagram illustrating a suitable routine 300 for migrating or copying data into an archive format in secondary storage, including secondary cloud storage. In step 310, the system receives a copy of an original data set from a file system. Alternatively, the system may access the copy or otherwise communicate with data storage components in a data storage system to gain access to the data to be copied.

At step 310 (or at any other suitable point in routine 300), the system may check the original data set against any audit policies applicable to the data set to determine if the data set comprises one or more sensitive objects and whether the migration or copying of sensitive objects to secondary storage requires approval by a reviewer or other action. If approval or other action is required, the system may take appropriate steps in accordance with the applicable audit policy, such as notifying a reviewer of the sensitive object and pausing the routine 300 until the system receives an indication that the reviewer approves of the migration/copying. As another example, the system may continue to perform routine 300, but only for the non-sensitive data objects in the data set. If the system receives an indication that the reviewer does not approve of the migration/copying of a sensitive object, the system may take other steps in accordance with the applicable audit policy. For example, the system may break the set into two or more data subsets (one containing no sensitive objects) and store the data subsets that have sensitive objects in an archive format at a suitable alternative secondary storage location (e.g., a local storage device 115).

In step 320, the system may index the data in the copy. For example, the system may index the content of the data as described herein. In step 330, the system may perform deduplication upon the data, by removing duplicate instances of files, data objects, blocks, sub-objects, and other information, and storing deduplicated data (or "dehydrated data") in secondary cloud storage, typically in an archive file format. Although not shown explicitly, in some embodiments, the indexing of the data at block 320 may occur after deduplication of the data at block 330, in order to reduce the volume of data that the system must index. Indexing, deduplication, and storing deduplicated data for cloud storage are described in greater detail herein, beginning with deduplication and followed by indexing.

Although not shown, the system may encrypt the data before or after a secondary copy or archival copy is created. For example, the system may employ many different techniques for encrypting the archive copy, including encryption techniques that satisfy Federal Information Processing Standards (FIPS). Further details about encryption and encrypting archive copies of data may be found in commonly assigned U.S. Patent Publication No. US2008-0320319A1, filed on Mar. 31, 2008, entitled SYSTEM AND METHOD FOR ENCRYPTING SECONDARY COPIES OF DATA. Additionally, although not shown, the system may compress the data before or after a secondary copy or archival copy is shown. For example, the system may employ many different well-known techniques or applications for compressing data, including Lempel-Ziv (LZ) techniques, DEFLATE techniques, and LZ-Renau (LZR) techniques.

In some implementations, the techniques described herein may be utilized to make secondary disk copies to disaster recovery (DR) locations using auxiliary copy or replication technologies as noted above.

In some examples, the techniques described herein may be used on copies of data created by replication operations such as CDR (Continuous Data Replication) and DDR (Discrete Data Replication). For example, for data protected by a replication operation, multiple Consistent Recovery Points (CRPs) are established, and the replicated data can analyzed at such CRPs. To create a CRP, the system suspends writes to the data, and makes a copy of the data. The system then transfers that copy to another location, such as to one of the cloud storage sites. Further details on CDR may be found in the assignee's U.S. Pat. No. 7,651,593, entitled "SYSTEMS AND METHODS FOR PERFORMING DATA REPLICATION".

Deduplication

Figure 4:
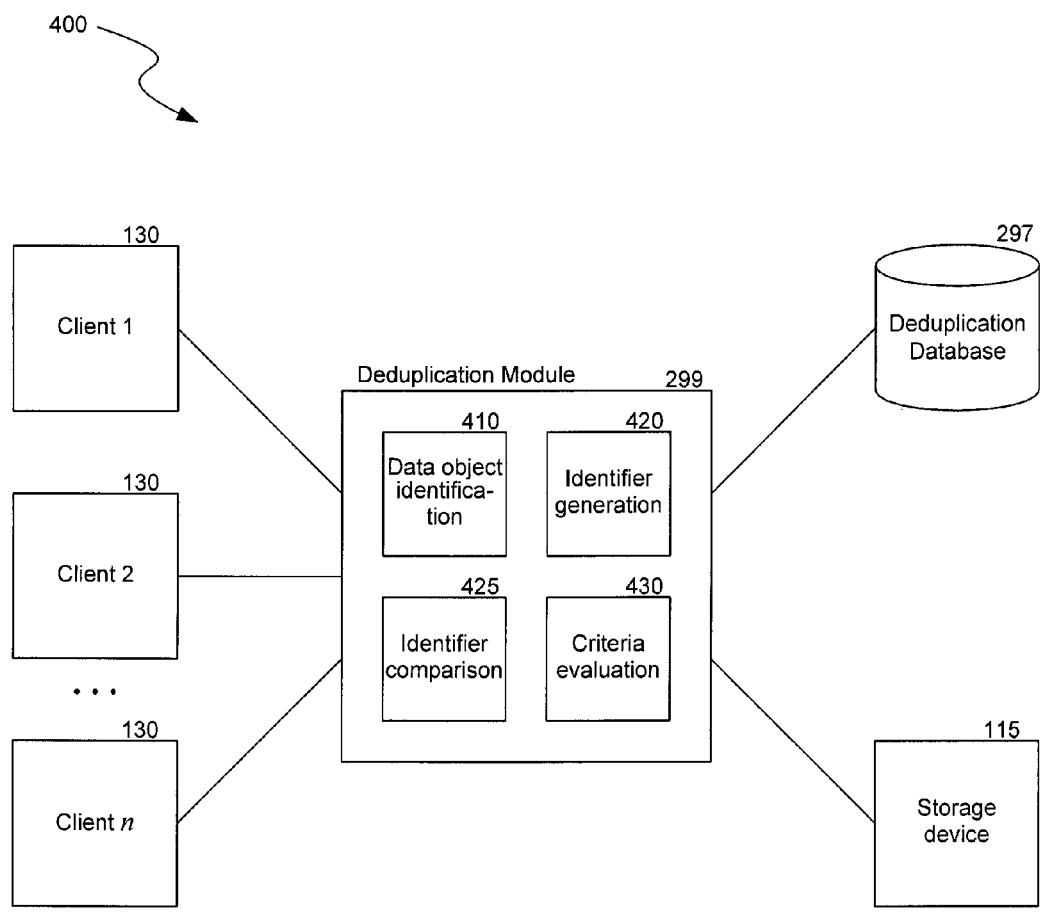
FIG. 4 is a block diagram illustrating an example of a deduplication module.

Referring to FIG. 4, the deduplication module 299 includes various components that perform various functions associated with deduplication, some of which are described below. More details may be found in the assignee's U.S. Pat. Pub. No. 2008-0243958, entitled SYSTEM AND METHOD FOR STORING REDUNDANT INFORMATION, the entirety of which is incorporated by reference herein. These components include a data object identification component 410, an identifier generation component 420, an identifier comparison component 425, and a criteria evaluation component 430. The data object identification component 410 identifies files, data objects, sub-objects, or blocks, such as in response to a storage operation. The identifier generation component 420 generates an identifier for the file, data object, sub-object, or block (identifiers are discussed in more detail below) The identifier comparison component 425 performs comparisons of identifiers of various files, data objects, sub-objects, or blocks to determine if the files, data objects, sub-objects, or blocks contain similar data (for example, the identifier comparison component 425 can compare identifiers of two or more files, data objects, sub-objects, or blocks to determine if the files or data objects contain the same data, metadata such as access control lists (ACLs), descriptive metadata that describes the files, data objects, sub-objects, or blocks (e.g., file name, file size, file author, etc.) of the two or more files, data objects, sub-objects, or blocks). The criteria evaluation component 430 evaluates aspects of files, data objects, sub-objects, or blocks against a set of criteria. The deduplication module 299 may also contain other components that perform other functions.

Examples of identifiers include a hash value, message digest, checksum, digital fingerprint, digital signature, or other sequence of bytes that substantially uniquely identifies the file or data object in the data storage system. For example, identifiers could be generated using Message Digest Algorithm 5 (MD5) or Secure Hash Algorithm SHA 512. In some instances, the phrase "substantially unique" is used to modify the term "identifier" because algorithms used to produce hash values may result in collisions, where two different data objects, when hashed, result in the same hash value. However, depending upon the algorithm or cryptographic hash function used, collisions should be suitably rare and thus the identifier generated for a file or data object should be unique throughout the system. The term "probabilistically unique identifier" may also be used. In this case, the phrase "probabilistically unique" is used to indicate that collisions should be low-probability occurrences, and, therefore, the identifier should be unique throughout the system. In some examples, data object metadata (e.g., file name, file size) is also used to generate the identifier for the data object.

The hash values may also be used to verify data transferred to a cloud storage site. For example, a file may first be locally hashed at a client to create a first hash value. The file may then be transferred to the cloud storage site. The cloud storage site in turn similarly creates a hash value and sends this second hash value back. The client may then compare the two hash values to verify that the cloud storage site properly received the file for storage. As explained herein, various system components, from the client, to storage cell components, to cloud gateways, to cloud storage sites themselves may perform such hashing and generation of hash values for verification.

Object-Level Deduplication

The deduplication module 299 may conduct object-level deduplication as follows before transferring data to cloud storage sites 115. (Further details may be found in the assignee's U.S. Pat. Pub. No. 2009-0319585, entitled APPLICATION-AWARE AND REMOTE SINGLE INSTANCE DATA MANAGEMENT.) First, the deduplication module 299 generates an identifier for a data object. After generating the identifier for a data object, the deduplication module 299 determines whether it should be stored to the cloud storage site 115 as a secondary copy (e.g., a backup copy) of the data of the clients 130. To determine this, the deduplication module 299 accesses the deduplication database 297 to check if a copy or sufficient number of copies or instances of the data object have already been appropriately stored on a cloud storage site 115. The deduplication database 297 utilizes one or more tables or other data structures to store the identifiers of the data objects that have already been stored on a cloud storage site 115. In one implementation, the system may store multiple copies of a data object, but only one copy of the data object with each of multiple, different cloud storage sites, and the data structure described herein facilitates that process.

If an insufficient number of copies or instances of the data object have already been appropriately stored on a cloud storage site 115, the deduplication module 299 sends the data object to one of the cloud storage site 115 for storage and adds its identifier to the deduplication database 297 (or if an instance already existed, the deduplication module 299 may add a reference, e.g., to an index in the deduplication database 297, such as by incrementing a reference count in the index). The deduplication module may also store in the deduplication module 297 a URL, link, path or identifier of the location or identity of the particular cloud storage site if multiple sites are being used.

If a sufficient number of instances have been appropriately stored, the deduplication module 299 can avoid sending another copy to the cloud storage site 115. In this case, the deduplication module 299 may add a reference (e.g., to an index in the deduplication database 297, such as by incrementing a reference count in the index) to the already stored instance of the data object, and may only store a pointer to the data object on the cloud storage site 115. The link or pointer may comprise a URL to a data object or file within a cloud storage site 115A-N. As explained below, adding a reference to the already stored instance of the data object enables the storage of only a single instance of the data object (or fewer instances of the data object) while still keeping track of other instances of the data object that do not need to be stored.

In some examples, instead of the clients 130 sending the data objects to the deduplication module 299 and the deduplication module 299 generating the identifiers, the clients 130 can themselves generate an identifier for each data object and transmit the identifiers to the deduplication module 299 for lookup in the deduplication database 297. This example may be useful if the clients were to send data directly to the cloud storage site 115, and thus deduplicating data before sending it can conserve time and bandwidth, and storage resources at the cloud storage site (which may charge based on amount of data stored.) If the deduplication module 299 determines that a sufficient number of instances of a data object have not already been appropriately stored on a cloud storage site 115, the deduplication module 299 can instruct the client 130 to send it a copy of the data object, which it then stores on the cloud storage site. In this example, the deduplication module may reside on a server to which the client is connected (e.g. over a LAN or secure WAN). Alternatively, the client 130 itself can send the copy of the data object to the cloud storage site 115, in which case the client may have the deduplication module 299 residing on the client. In some examples, the deduplication module 299 generates the identifier on data already stored on the cloud storage site 115 or on other cloud storage sites (e.g., secondarily stored data is deduplicated).

The deduplication module 299 can support encrypted data objects. For example, one client 130 could generate an identifier for a data object, and then encrypt it using one encryption algorithm. Another client 130 could generate an identifier for another data object, and then encrypt it using another encryption algorithm. If the two data objects are identical (meaning the two objects have the same data, while their metadata, such as ACLs or descriptors, could be different), they will both have the same identifier. The deduplication module 299 can then store both encrypted instances of the data object or only a single encrypted instance (or a reduced number of encrypted instances). In some examples, the deduplication module 299 stores a key or other mechanism to be used to encrypt and/or decrypt data. The deduplication module 299 can also support compressed data objects. In general, the same compression algorithm may be used to compress data objects. Therefore, the deduplication module 299 can generate an identifier for a data object before or after it has been compressed.

Data Structures for Object-Level Deduplication

Figure 5A:
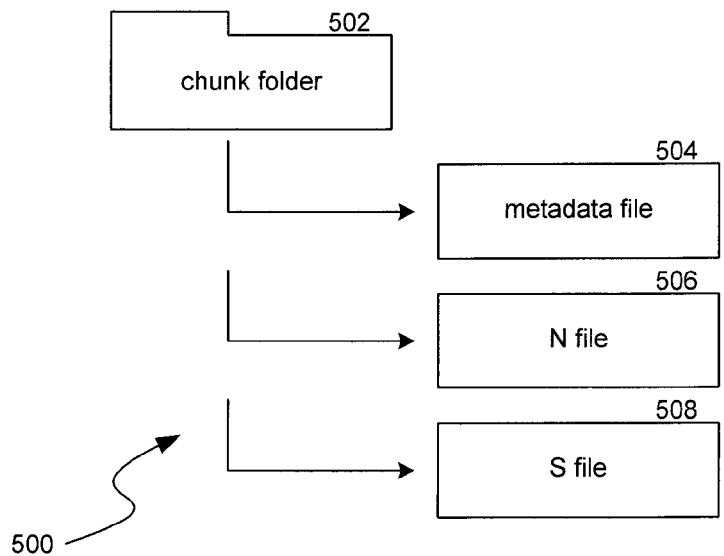
FIGS. 5A-5D illustrate various data structures for deduplicating and storing copies or instances of data objects on a storage device or for other processes.
Figure 5B:
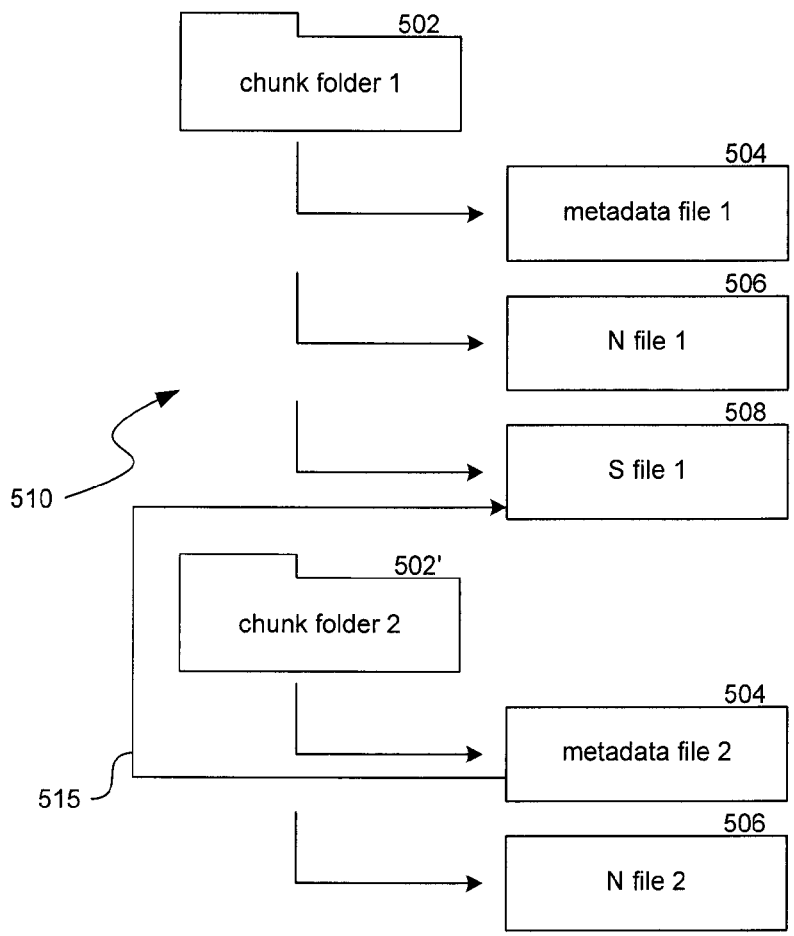

Some details will now be provided of suitable object, sub-object level and block level deduplication that the system may employ. Further details may be found in the assignee's U.S. patent application Ser. No. 12/565,576, filed Sep. 23, 2009, entitled "Systems and Methods for Managing Single Instancing Data" and the assignee's U.S. patent application Ser. No. 12/553,199, filed Sep. 3, 2009, entitled "TRANSFERRING OR MIGRATING PORTIONS OF DATA OBJECTS, SUCH AS BLOCK-LEVEL DATA MIGRATION OR CHUNK-BASED DATA MIGRATION". FIGS. 5A and 5B are block diagrams illustrating various data structures which aspects of the invention may utilize for deduplicating and storing copies or instances of data objects on the cloud storage site 115. FIG. 5A illustrates a data structure 500 used in a storage operation. For the storage operation, a chunk folder 502 is created on the cloud storage site 115. Contained within the chunk folder are three files: 1) a metadata file 504; 2) an "N" file 506; and 3) a single instance, or "S" file 508. The three files are each logical containers of data. The "S" file stores deduplicated data (e.g., deduplicated files). The "N" file stores' data that is not deduplicated (e.g., metadata, such as descriptive metadata associated with deduplicated files). The metadata file stores references to the location(s) of data objects in the "S" file and the "N" file. Note that although three container files are shown (S, N, and index), in some embodiments a chunk folder may comprise more than one "S" file (e.g., S1, S2 . . . Sy, where y is an integer) to store deduplicated data and/or more than one "N" file (e.g., N1, N2 . . . Nz, where z is an integer). While described as being stored on the cloud storage site 115, the "N" and metadata files may alternatively or additionally be stored elsewhere, such as on the secondary storage computer device 165 and/or storage manager 105.

The chunk folder 502 and the files 504-508 may be equivalent to a directory and files (or folder and files) on a file system. For example, the chunk folder 502 may be a directory and the files 504-508 may be files located within the directory. As another example, the chunk folder 502 may be a file and the files 504-508 may be portions of the file. As another example, the files 504-508 may be collections of blocks or bytes grouped together. Those of skill in the art will understand that the chunk folder 502 and the files 504-508 may be comprised in various data structures and are not limited to a directory and files within the directory.

The deduplication module 299 places data objects in the "S" file 508 that meet certain criteria for deduplication. These criteria may include the following: 1) that the data object has been determined to be data or of type data (as opposed to metadata or of type metadata); and 2) that the data object is larger than a pre-configured size, such as 64 Kb. Type data is generally the payload portion of a file or data object (e.g., a file's contents) and type metadata is generally the metadata portion of the file or data object (e.g., metadata such as file name, file author, etc.). This pre-configured size may be configurable by an administrator or other user with the appropriate permissions. For example, if the administrator wants all data objects of type data to be deduplicated, the administrator can set the pre-configured size to 0 Kb. As another example, if the administrator wants only data objects of type data greater than 128 Kb to be deduplicated, the administrator can set the pre-configured size to 128 Kb.

The deduplication module 299 determines if a data object meets these criteria by evaluating aspects of the data object (e.g., its type, its size) against the criteria. If so, the deduplication module determines if a sufficient number of instances of the data object have already been appropriately stored on the cloud storage site 115 (or elsewhere), which the deduplication module determines by generating or retrieving an identifier for the data object and looking up the identifier in the deduplication database 297. During this lookup, to determine whether other instances were appropriately stored, the deduplication database 297 may restrict the lookup to only those instances of the object stored on certain cloud storage sites 115 and/or certain classes of cloud storage sites 115. For example, the deduplication database 297 may restrict the lookup to those cloud storage sites 115 that would satisfy applicable storage policy parameters, such as class of storage used for the object. Additionally, during this lookup, the deduplication database 297 may restrict the lookup to only those instances of the object stored within a certain time frame. For example, the deduplication database 297 may restrict lookup only to those instances stored within secondary storage in the last seven years.

If a sufficient number of instances of the data object have already been appropriately stored on a cloud storage site 115, the deduplication module 299 places the data object in the "S" file 508. The deduplication module 299 may also apply other criteria that the data object must meet for deduplication (e.g., criteria based upon characterizing or classifying the data object using techniques such as those described in commonly assigned U.S. Pat. Pub. No. 2007-0185925 (entitled SYSTEMS AND METHODS FOR CLASSIFYING AND TRANSFERRING INFORMATION IN A STORAGE NETWORK, the entirety of which is incorporated by reference herein).

For each data object that is placed in the "S" file 508, the deduplication module 299 adds a reference to the data object in the metadata file 504, called an internal reference. For example, the internal reference may be a pointer or link to the location of the data object in the "S" file 508. As further described herein, the deduplication module 299 maintains a primary table that contains all the deduplication records of all data objects for which an identifier was created. The deduplication module 299 may add as the internal reference a record of the already stored instance of the data object from the primary table.

The deduplication module 299 places data objects in the "N" file 506 that do not meet the above criteria for deduplication. For example, a data object may be metadata (e.g., ACLs for a file that is placed in the "S" file, file descriptor information, etc.). In this case, the data object will be placed in the "N" file. As another example, a data object may be smaller than the pre-configured size, e.g., the data object is smaller than 64 Kb. In this case, the deduplication module 299 may incur too much overhead to generate its identifier and perform a lookup of the identifier in the deduplication database 297. Therefore, the data object is placed in the "N" file. As another example, a prior instance of an object may have been stored on tape and reflected in the deduplication database 297, but the storage policy applicable to the current data object requires disk storage. Therefore, the data object is placed in the "N" file 506. For each data object that is placed in the "N" file 506, the deduplication module 299 may also add a reference to the data object in the metadata file 504, called an internal reference. For example, the internal reference may be a pointer or link to the location(s) of the data object in the "N" file. A new "N" file may be created during each storage operation job.

FIG. 5B illustrates a data structure 510 that may be created as a result of one or more storage operations. The data structure 510 is similar to the data structure 500 illustrated in FIG. 5A, but now includes a second chunk folder 502'. For example, the deduplication module 299 may create the second chunk folder 502' as a result of a second storage operation. Consider the situation where a single data object is subjected to two successive storage operations. The first storage operation would result in the creation of the first chunk folder 502 illustrated in FIG. 5A, with the single data object in a first "S" file 508, its metadata (e.g., ACLs) in a first "N" file 506, and any references to the single data object and its metadata in a first metadata file 504.

The second storage operation would result in the creation of the second chunk folder 502' illustrated in FIG. 5B. As illustrated in FIG. 5B, the second chunk folder 502' would have a second "N" file 506 containing the metadata (e.g., the ACLs of the single data object, regardless of whether they have changed) and a second metadata file 504. Instead of having a second "S" file 508, the second metadata file 504 would have a pointer 515 to the single data object contained in the first "S" file 508. Because an instance of the single data object is already contained within the first "S" file 508, there is no need for another instance of it to be contained within the second "S" file 508. However, there is a need to keep a record of the fact that the second storage operation involved an instance of the single data object. This is accomplished by the pointer 515 within the second metadata file 504.

In some cases, instead of always placing in the "N" file 508 data objects that do not meet the above criteria for deduplication, the deduplication module 299 generates an identifier for the data object, looks up the identifier in the deduplication database 297 to see if the data object has already been stored, and if not, places it in the "S" file 508. If the data object has already been stored, the deduplication module would then add a pointer to the location of the instance of the previously stored data object in the metadata file 504. For example, this variation on the process could be used to deduplicate metadata instead of always storing it in the "N" file 506.

Figure 5C:
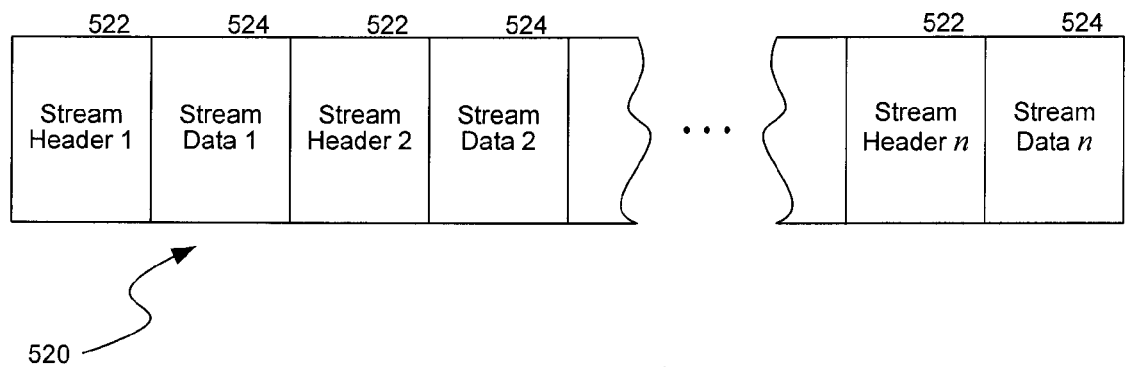

FIG. 5C illustrates a data structure 520 for the metadata file 504. The data structure 520 consists of one or more stream headers 522 and stream data 524. The stream header 522 describes a data object contained in an "N" file 506 or an "S" file 508 (e.g., its location, its size, an offset within the file, etc.). The stream data 524 contains the pointer to the data object contained in the "N" file 506 or the "S" file 508. For example, the pointer may give its location within the "N" file 506 or the "S" file 508. The location of the data object may be given by offsets within the "N" file 506 or the "S" file 508. For example, its location may be given by a starting offset, and its length or size. As another example, its location may be given by a starting offset and an ending offset. As previously mentioned, the data object may be in an "S" file 508 in another chunk folder, and the stream data 524 would point to this "S" file in the other chunk folder (e.g., give its location in the "S" file in the other chunk folder). Each time the deduplication module 299 places a data object in the "S" file 508, the deduplication module 299 adds a stream header 522 and corresponding stream data 524 to the metadata file 504.

One advantage of the data structures 500, 510, 520 illustrated in FIGS. 5A through 5C and the techniques described herein is that they reduce the number of files stored on the file system of the cloud storage site 115. Thus, there are as little as three files created for each storage operation—the metadata file 504, the "N" file 506, and the "S" file 508. Therefore, a maximum number of files on the file system of the cloud storage site 115 may be as low as the number of storage operations performed by the deduplication module 299 multiplied by three. File systems of certain operating systems may have practical limits to the numbers of files that they can store that are well below their theoretical limits. For example, a file system may not, in practice, be able to store a number of files above a certain threshold without experiencing significant system degradation (which can be defined in numerous ways, such as an increase in seek time of randomly accessed media that is ten percent longer than normal, a delay in reads or writes on randomly accessed media, or in other ways).

By storing multiple data objects in a small number of container files (as few as two), the storing of each data object as a separate file on the file systems of the cloud storage site can be avoided. This reduces the number of files that would be stored on the file systems of the cloud storage site, thereby ensuring that the cloud storage site can adequately store the data of computing devices in the data storage network. Therefore, the file system of the cloud storage site may not necessarily have to contend with storing excessively large numbers of files, such as millions of files or more. Accordingly, these techniques enable very large numbers of data objects to be stored without regard to the limitations of the file system of the cloud storage site.

Further, separate files may be established for separate customers using the cloud storage site. So, the could storage site 115A may establish separate folders for each new customer who contracts to store data at the site, and thus that customer's data is logically segregated from data of other customers.

Even if the deduplication module 299 performs numerous storage operations using these data structures 500, 510, this will result in far fewer files on the cloud storage site 115 than storage operations where each involved data object is stored as a separate file. Another advantage is that the metadata files 504 could be used to replicate the data stored in the deduplication database 297 or reconstruct the deduplication database 297 if its data is ever lost or corrupted. This is because the metadata files 504 may store essentially the same information as what is stored in the deduplication database 297.

However, the storage of data objects in containers such as the "N" file 506 and the "S" file 508 may create additional complexities when it comes time to prune or delete data objects involved in previous storage operations. This is because the data objects are not stored as files on the file system and thus cannot be directly referenced by the file system. For example, consider a first storage operation, involving a first file and a second file, and a second storage operation, involving the first file and a third file, both occurring on the same day. Further consider that the first storage operation's files are eligible to be pruned after 15 days and the second storage operation's files are eligible to be pruned after 30 days. Using the techniques described herein, the first storage operation would store the first and second files in an "S" file 508 and the second storage operation would store a pointer to the first file in an "N" file 506 and the third file in another "S" file 508.

After 15 days have elapsed, the first and second files are eligible to be pruned. The first file is referenced by the "N" file 506 of the second storage operation and cannot yet be pruned. However, the second file, because it is not referenced by any "N" files 506 in any other storage operations, can be pruned. Using the metadata file 504 corresponding to the "S" file 508, the deduplication module 299 locates the second file within the "S" file 508. The deduplication module 299 can then instruct the operating system (e.g., a Windows operating system, a Unix operating system, a Linux operating system, etc.) of the cloud storage site 115 to convert the "S" file 508 into a sparse file. A sparse file is a well-known type of file having data within but not filling the file's logical space (e.g., at the beginning of the file and at the end of the file, and a hole or empty space in between). In converting the "S" file 508 into a sparse file, the portions corresponding to the second file may be zeroed out. These portions are then available for storage of other files or data objects by the operating system on cloud storage sites (e.g., on magnetic disks, but sparse files may be used on other types of cloud storage sites, such as tape or optical disks). Additionally or alternatively, the "S" file may be designated as a sparse file upon its creation.

After 30 days have elapsed, the first and third files are eligible to be pruned. Assuming that there are no intervening storage operations involving files that reference either of these files, both the first and third files can be pruned. The chunk folders 502 corresponding to the first and second storage operations can be deleted, thereby deleting the metadata files 204, the "N" files 506 and the "S" files 508 and recovering the space previously allocated for their storage. (The process for pruning data objects is discussed in greater detail with reference to, e.g., FIGS. 4 and 14.) Therefore, the data structures 500, 510, 520 illustrated in FIGS. 5A through 5C and the techniques described herein also allow for pruning data objects to recover space previously allocated to them on the cloud storage site 115.

Accordingly, the data structures 500, 510, 520 illustrated in FIGS. 5A through 5C and the techniques described herein enable the performance of storage operations cumulatively involving very large numbers of data objects, while still allowing for recovery of space allocated to these data objects when their storage is no longer required. For example, an administrator can back up numerous files across numerous clients and avoid storing redundant copies or instances of the files. The administrator can also easily recover space on the cloud storage site 115 when it is no longer required to store the files, for example, as according to a retention policy that indicates for how long files are to be stored on the cloud storage site 115. Accordingly, the data structures and techniques described herein enable the optimization of storage operations involving very large numbers of data objects.

After having been stored on the cloud storage site 115, files contained in chunk folders may be moved to secondary storage, such as to disk drives, cloud storage sites, or to tapes in tape drives. More details as to these operations may be found in the previously referenced U.S. Pat. Pub. No. 2008-0243958, entitled SYSTEM AND METHOD FOR STORING REDUNDANT INFORMATION. In moving chunk files to secondary storage, they may be converted into an archive file format. In some examples, the techniques described herein may be used to deduplicate data already stored on secondary storage.

Figure 5D:
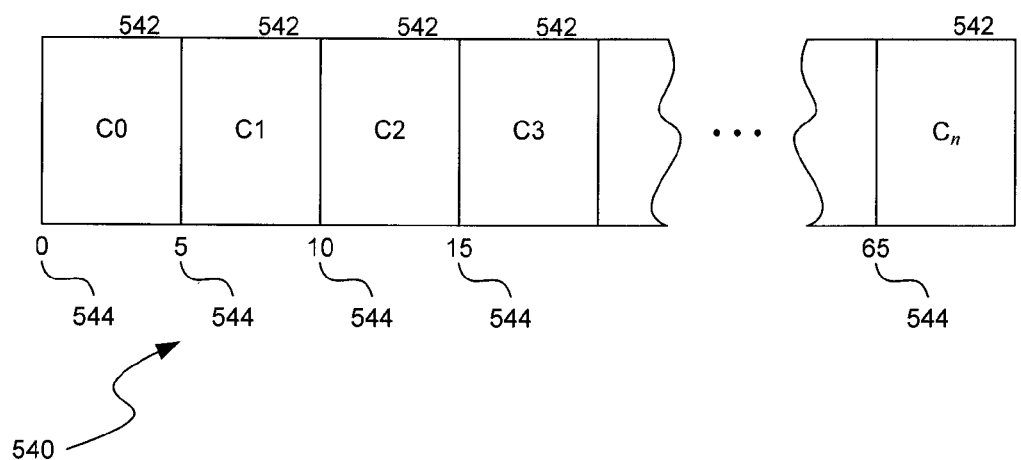

FIG. 5D is an illustration of a data structure 540 for storing chunk folders and their container files in an archive file format. The archive file may be stored on various cloud storage sites, such as on disk drives, magnetic tapes, or cloud storage sites. The archive file includes a chunk 0 542 located at offset 0, a chunk 1 542 located at offset 5, a chunk 2 542 located at offset 10, a chunk 3 542 located at offset 15, and a chunk n located at offset 65. The offsets are in relation to the start of the archive file. More details as to a suitable archive file format may be found in the assignee's U.S. Pat. Pub. No. 2008-0229037, entitled SYSTEMS AND METHODS FOR CREATING COPIES OF DATA, SUCH AS ARCHIVE COPIES, the entirety of which is incorporated by reference herein. An archive file may be considered as a container of data objects.

Pruning Object-Level Deduplicated Data

Consider the example of a client for which a storage operation job was performed on Jan. 1, 2008, resulting in the creation of an archive file. A retention policy provides that the archive file has to be retained for 30 days. On Jan. 31, 2008, the archive file becomes prunable and thus can be deleted. Deleting the archive file may require deleting data stored in one or more chunks on one or more media. However, the archive file may not be able to be deleted if it is referenced by data objects within other archive files. This is to avoid orphaning data objects, e.g., by deleting a data object when it is still referenced in another archive file. The system keeps tracks of references to data objects in order to avoid orphaning data objects.

To assist in pruning, the deduplication database 299 maintains a primary table and a secondary table. The primary table contains all the single instance records of all data objects for which an identifier was created. For each record in the primary table, the secondary table contains a record that may reference the record in the primary table.

Figure 7A:
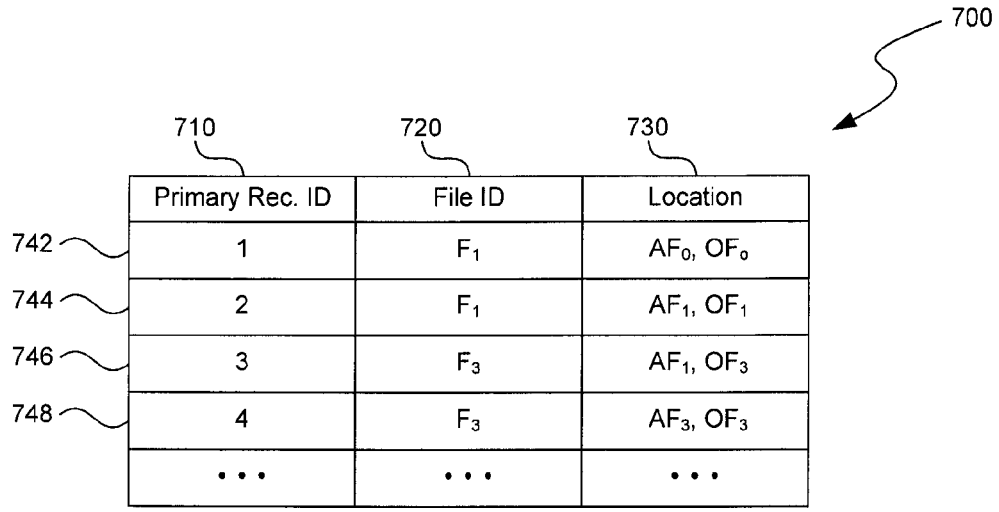
Figure 7B:
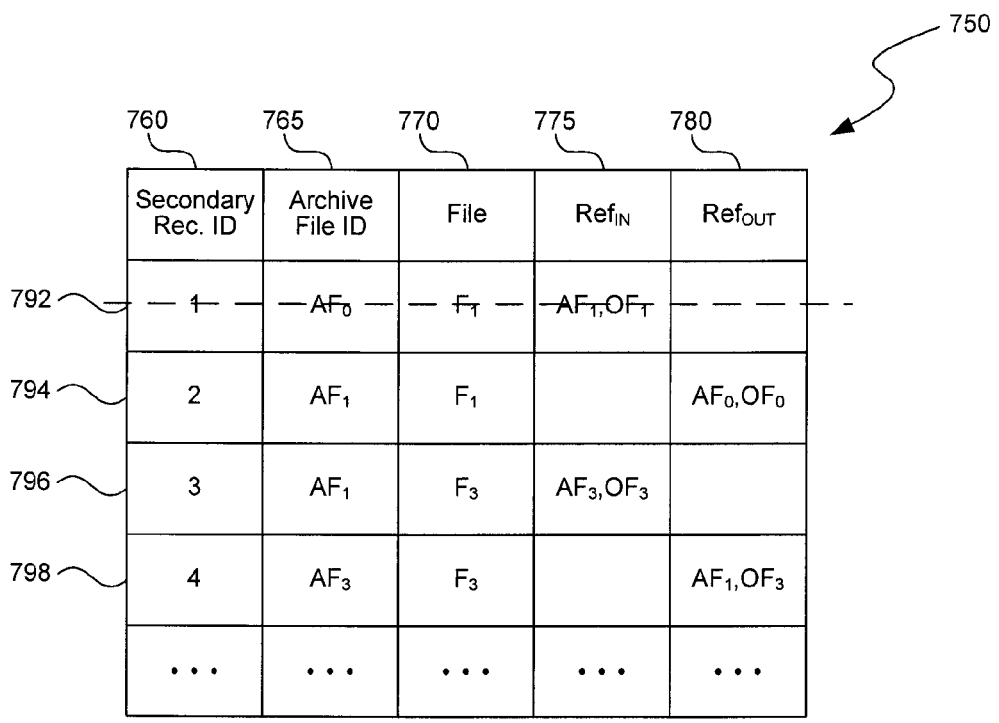

FIGS. 7A and 7B illustrate example primary and secondary tables 700, 750. The primary table 700 has a primary record ID column 710 that may contain primary keys, a file ID column 720 that contains an identifier of a file or data object (e.g., the identifier of the file or data object), and a location column 730 that contains the location of the file or data object (e.g., the archive file ID and its offset within the archive file). The primary table 700 may also contain other columns (not shown).

The secondary table 750 has a secondary record ID column 760 that may contain primary keys, an archive file ID column 765 that contains the archive file ID, a file column 770 that contains the same identifier of the file or data object as in the primary table 700, and a reference$_{IN}$ column 775 that contains an identifier (in the form of an archive file ID and an offset) of a file or data object that references the archive file. The secondary table 750 also has a reference$_{OUT}$ column 780 that contains an identifier (in the form of an archive file ID and an offset) of a referenced file or data object. The secondary table 750 may also contain other columns (not shown).

Figure 6:
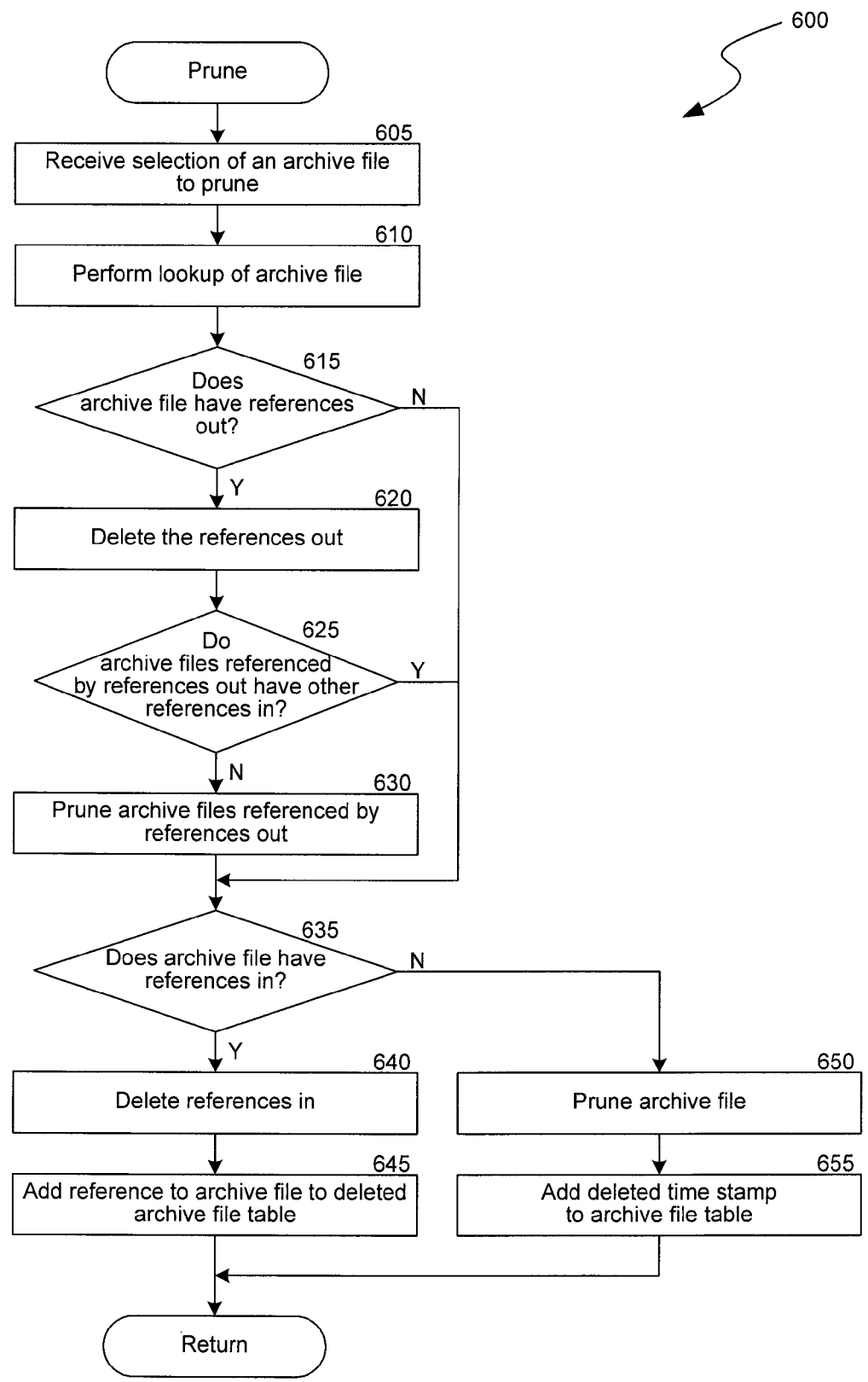
FIG. 6 is a flow diagram illustrating a process for pruning a deduplication database by pruning or deleting data objects stored in archive files, or entire archive files.

FIG. 6 is a flow diagram illustrating a process 600 for pruning a deduplication database 299 by pruning or deleting data objects stored in archive files, or entire archive files. As previously noted, archive files can be thought of as containers of data objects. The process 600 begins at step 605 where a selection of an archive file to be pruned is made. This selection can be made manually, such as by an administrator, or automatically, such as by the archive file aging out of a retention policy. At step 610, the media file system agent 240 performs a lookup of the archive file in the primary 700 and secondary tables 700, 750. At step 615, the media file system agent 240 determines if the archive file has references out (e.g., to other archive files).

If the archive file has references out, the process 600 continues to step 620, where the references out are deleted. At step 625, the media file system agent 240 determines if the archive files referenced by the references out have other references in. If there are no other references in, at step 630, the media file system agent 240 prunes the archive files referenced by the references out.

If the archive file does not have any references out (step 615), or if it does, and if the archive files referenced by the references out have other references in (step 625), the process 600 continues at step 635. At this step, the media file system agent 240 determines if the archive file has references in. If it does have references in, this means the archive file cannot be pruned. The process continues at step 640, where the media file system agent 240 deletes the references in. At step 645 the media file system agent 240 adds a reference to the archive file to a deleted archive file table (discussed below).

If the archive file does not have any references in (step 635), the media file system agent 240 prunes the archive file at step 650. The media file system agent 240 then creates an entry in the deleted archive file table for the pruned archive file (if there wasn't already an entry) and adds a deleted timestamp to the entry. If there is already an entry for the pruned archive file, the media file system agent 240 adds a deleted timestamp to the entry at step 655.

FIG. 7C illustrates an example deleted archive file table 752. The deleted archive file table 752 has a primary record ID column 754 that may contain primary keys, an archive file ID column 756 that contains an identifier of the archive file, a reference$_{IN}$ column 758 that contains an identifier (in the form of an archive file ID and an offset) of a file or data object that references the archive file, and a deleted timestamp column 762 that contains a timestamp indicating when the archive file was deleted. In the case of an archive file that has not yet been deleted, the timestamp deleted column would be empty or null in the archive file's entry.

The process 600 will now be explained using the examples of the records shown in the primary and secondary tables 700, 750. At time $T_1$, the process 600 begins. At step 605, the media file system agent 240 receives a selection of $AF_1$ to prune. At step 610 the media file system agent 240 looks up $AF_1$ in the primary and secondary tables 700, 750. At step 615, the media file system agent 240 determines that $AF_1$ has a reference out, shown by entry 794 in the secondary table 750. (Entry 792 is shown in the secondary table 750 with strikethrough to indicate that it was previously deleted during an operation to prune $AF_0$.) At step 620, the media file system agent 240 deletes this reference out by deleting entry 794 from the secondary table 750. At step 625, the media file system agent 240 determines if $AF_0$ has any other references in. Since the only reference in for $AF_0$ is from $AF_1$ (which is to be pruned), $AF_0$ does not have any other references in. At step 630, the media file system agent 240 then prunes $AF_0$ and adds a timestamp indicating that $AF_0$ was pruned at time $T_1$ at entry 772 of the deleted archive file table 752.

At step 635, the media file system agent 240 determines if $AF_1$ has any references in. $AF_1$ has a reference in from $AF_3$, shown in entry 796 of the secondary table 750. The media file system agent 240 thus cannot prune $AF_1$. At step 640, the media file system agent 240 deletes the references in to $AF_1$ by deleting entry 796 from the secondary table 750. At step 645, the media file system agent 240 adds entry 774 to the deleted archive file table 752, leaving the deleted timestamp blank. The blank timestamp indicates that $AF_1$ should be pruned. The process 600 then concludes.

At time $T_2$, the process 600 begins anew. At step 605, the media file system agent 240 receives a selection of $AF_3$ to prune. At step 610, the media file system agent 240 looks up $AF_3$ in the primary and secondary tables 700, 750. At step 615, the media file system agent 240 determines that $AF_3$ has a reference out, shown by entry 798 in the secondary table 750, which references $AF_1$. At step 620, the media file system agent 240 deletes entry 798 from the secondary table 750. At step 625, the media file system agent 240 determines if $AF_1$ has any other references in. Since the only reference in for $AF_1$ is from $AF_3$ (which is to be pruned), $AF_1$ does not have any other references in and can now be pruned. At step 630, the media file system agent 240 then prunes $AF_1$ and adds a timestamp indicating that $AF_1$ was pruned at time $T_2$ at entry 774 of the deleted archive file table 752. This entry now indicates that $AF_1$ has been pruned at time $T_2$.

At step 635, the media file system agent 240 determines if $AF_3$ has any references in. $AF_3$ has no references in listed in the secondary table 750. The media file system agent thus can prune $AF_3$. At step 650, the media file system agent 240 prunes $AF_3$. At step 655, the media file system agent 240 adds the entry 776 to the deleted archive file table 752 with a deleted timestamp as $T_2$. The process 600 then concludes.

The pruning process 600 thus enables the system to maximize available storage space for storing archive files by storing them efficiently and then deleting or pruning them when it is no longer necessary to store them. The pruning process 600 may have additional or fewer steps than the ones described, or the order may vary other than what is described. For example, instead of the media file system agent 240 adding a timestamp to an entry in the deleted archive file table 752 to indicate when the archive file was pruned, the media file system agent may simply delete the entry from the deleted archive file table 752. As another example, entries in the primary table 700 may also be deleted when the corresponding archive files are deleted. Those of skill in the art will understand that other variations are of course possible.

Sub-Object-Level Deduplication

Instead of deduplication of data objects, deduplication can be performed on a sub-object level in a substantially similar fashion to that described previously with respect to object-level deduplication. A sub-object is a set of blocks that forms a proper subset of all of the blocks within a file or data object. That is, for a file consisting of n blocks, the largest sub-object of the file comprises at most n−1 blocks. An object may thus comprise two or more sub-objects, and be a logical division of the data object. For example, a .pst file may include two or more sub-objects: a first sub-object that stores emails from a user's mailbox, and one or more sub-objects that stores attachments or other data objects associated with the user's mailbox (e.g. subfolders, shared folders, etc.) The deduplication module 299 may include an object division component (not shown) that divides data objects, such as files, into sub-objects. The object division component may receive files or objects, divide the files into two or more sub-objects, and then deduplicate the two or more sub-objects as described previously with respect to object-level deduplication.

The object division component may perform different processes when determining how to divide a data object. For example, the object division component may include indexing, header, and other identifying information or metadata in a first sub-object and the payload in other sub-objects. The object division component may follow a rules-based process when dividing a data object. The rules may define a minimum or maximum data size for a sub-object, a time of creation for data within a sub-object, a type of data within a sub-object, and so on.

For example, the object division component may divide a user mailbox (such as a .pst file) into a number of sub-objects, based on various rules that assign emails within the mailbox to sub-objects based on the metadata associated with the emails. The object division component may place an index of the mailbox (and its various subfolders) in a first sub-object and all emails for that mailbox in other sub-objects. The object division component may then divide the other sub-objects based on dates of creation, deletion or reception of the emails, size of the emails, sender of the emails, type of emails, and so on. Thus, as an example, the object division component may divide a mailbox as follows:

| | |
|---|---|
| User1/Sub-object1 | Index |
| User1/Sub-object2 | Sent emails |
| User1/Sub-object3 | Received emails |
| User1/Sub-object4 | Deleted emails |
| User1/Sub-object5 | All Attachments. |

Of course, other divisions are possible. Sub-objects may not necessarily fall within logical divisions. For example, the object division component may divide a data object based on information or instructions not associated with the data object, such as information about data storage resources, information about a target cloud storage site, historical information about previous divisions, and so on.

Once the division component has divided an object into sub-objects, deduplication of the sub-objects proceeds in substantially the same fashion as described previously with respect to object-level deduplication. To do this, the deduplication module determines, by analyzing data structures in the deduplication database in view of the sub-object's identifier, whether the sub-object of data is already stored on a cloud storage site. If it is, then the secondary storage computing device 1) stores a link to the already stored sub-object of data in a metadata file and 2) discards the sub-object of data from the memory buffer. If it is not already stored, then the secondary storage computing device 165 stores the sub-object of data in a container file. A link or pointer may comprise a URL to a data object or file within a cloud storage site 115A-N.

Block-Level Deduplication

Instead of deduplication of files, data objects or sub-objects, deduplication can be performed on a block level. Files can be broken into blocks and deduplicated by the deduplication module 299. Typically blocks are fixed sizes, such as 64 Kb or 128 Kb. In such embodiments, typically, the clients 130 will generate the identifiers, since distributed identifier generation may free up the deduplication module 299 to perform other operations (e.g., storing data, retrieving data, etc.). The clients 130 typically send the blocks of data and other data (e.g., metadata and/or the data that is not eligible for deduplication) in a data stream to the deduplication module 299. A deduplication module 299 receives blocks of data from the clients 130 and accesses a deduplication database 297 to determine whether a sufficient number of instances of each block have been appropriately stored. To do this, the system determines, by analyzing data structures in the deduplication database 297 in view of the block's identifier, the number of instances of each block of data that is already appropriately stored on a cloud storage site. During this lookup, to determine whether prior instances were appropriately stored, the system may only consider those instances of the object stored on certain cloud storage sites 115 and/or certain classes of cloud storage sites 115. For example, the deduplication module 299 may restrict the lookup to those cloud storage sites 115 that would satisfy storage policy parameters applicable to each block, such as class of storage used for the object (e.g. data security associated with a particular cloud storage site). Additionally, during this lookup, the deduplication database 297 may restrict the lookup to only those instances of a block stored within a certain time frame. For example, the deduplication database 297 may restrict lookup only to those instances stored within secondary storage in the last seven years.

If an appropriate number of instances of a block have already been appropriately stored, then the deduplication module 299 1) stores a link to the already stored block of data in a metadata file and 2) discards the block of data from the memory buffer. If it is not already stored, the deduplication module 299 stores the block of data in a container file. A link or pointer may comprise a URL to a block or file within a cloud storage site 115A-N.

Because the size of a block of data and associated metadata is typically less than the size of a memory buffer, the deduplication module 299 can keep a single block of data in a single memory buffer while it looks up its identifier in the deduplication database 297. This allows the deduplication module to avoid writing the block of data to a disk (an operation that is typically slower than storing the block of data in a RAM buffer) until the deduplication module determines that it needs to store the block of data in a container file on a cloud storage site. The deduplication module 299 stores data that is not eligible for deduplication in metadata files.

Alternatively, the clients 130 may transmit only the identifiers to the deduplication module 299 for lookup in the deduplication database 297. If the deduplication module 299 determines that an instance of a block has not already been stored on the cloud storage site 115, the deduplication module 299 can instruct the client 130 to send a copy of the block to the deduplication module, which it then stores on the cloud storage site 115. Alternatively, the client 130 itself can send the copy of the block to the cloud storage site 115.

By storing multiple blocks of data in a single container file, the deduplication module 299 avoids storing each block of data as a separate file on the file systems of the cloud storage sites. This reduces the number of files that would be stored on the file systems of the cloud storage sites, thereby ensuring that the cloud storage sites can adequately store the data of the clients 130 in the data storage system.

One advantage of these techniques is that they significantly reduce the number of files stored on a file system of a client or cloud storage site. This is at least partly due to the storage of data blocks within the container files. Even if the deduplication module performs numerous storage operations, these techniques will result in storing far fewer files on the file system than storage operations where each data block is stored as a separate file. Therefore, the file system of the client or cloud storage site may not necessarily have to contend with storing excessively large numbers of files, such as millions of files or more. Accordingly, these techniques enable very large numbers of blocks of data to be stored without regard to limitations of the file system of the client or cloud storage site.

However, the storage of blocks of data in container files may create additional complexities when it comes time to prune or delete data. This is because a container file may contain blocks of data that are referenced by links in metadata files and thus cannot be deleted, as these blocks of data typically still need to be stored on the cloud storage sites. Furthermore, because the blocks of data are not stored as files on the file systems of the cloud storage sites, they cannot be directly referenced by the file system.

The systems and methods described herein provide solutions to these problems. The deduplication module creates the container files as sparse files (typically only on operating systems that support sparse files, e.g., Windows operating systems, but also on other operating systems that support sparse files). A sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Second, the deduplication module maintains a separate index that stores an indication of whether blocks of data in container files are referred to by links in metadata files. In some examples, this can be thought of as creating another file system on top of the existing file systems of the cloud storage sites that keeps track of blocks of data in the container files.

When a block of data is not referred to and does not need to be stored, the deduplication module can prune it. To prune data, the deduplication module accesses the separate index to determine the blocks of data that are not referred to by links. On operating systems that support sparse files, the deduplication module can free up space in the container files corresponding to those blocks of data by marking the portions of the physical media corresponding to the unreferenced portions of the container file as available for storage (e.g., by zeroing out the corresponding bytes in the container files). On operating systems that do not support sparse files, the deduplication module can free up space in the container files by truncating the extreme portions of the container files (e.g., the beginnings and/or the ends of the container files), thereby making the corresponding portions of the physical media available to store other data. Freeing up space in container files allows the operating system to utilize the freed-up space in other fashions (e.g., other programs may utilize the freed-up space).

Data Structures for Block-Level Deduplication

Figure 8:
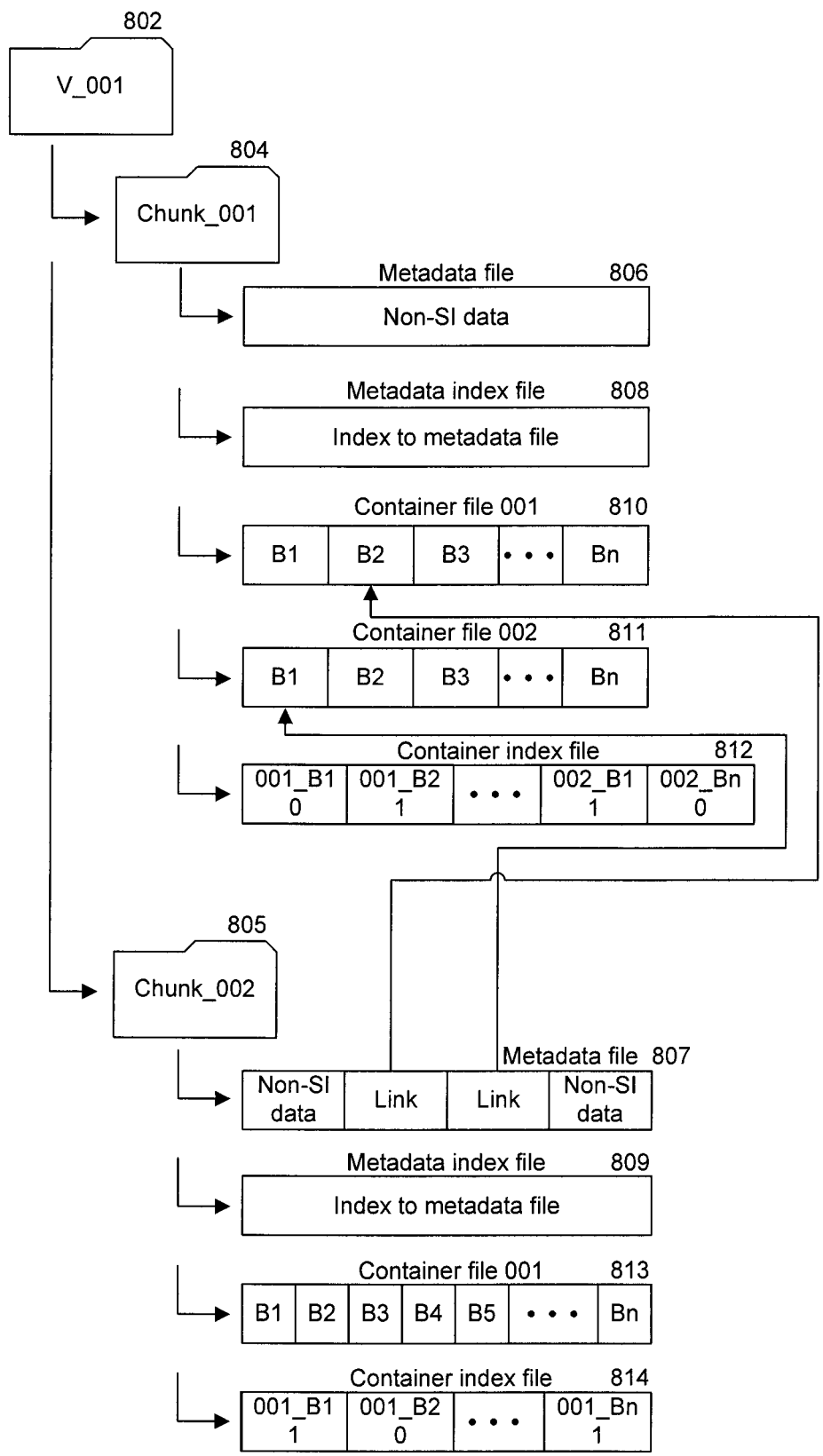
FIG. 8 illustrates various data structures which aspects of the invention may utilize for deduplicating and storing copies or instances of data blocks on a storage device or for other processes.

FIG. 8 is a diagram illustrating data structures that may be used to store blocks of deduplicated data and non-deduplicated data on the cloud storage site 115 in an archive format. The data structures include one or more volume folders 802, one or more chunk folders 804/805 within a volume folder 802, and multiple files within a chunk folder 804. Each chunk folder 804/805 includes a metadata file 806/807, a metadata index file 808/809, one or more container files 810/811/813, and a container index file 812/814. The metadata file 806/807 stores non-deduplicated data blocks as well as links to deduplicated data blocks stored in container files. The metadata index file 808/809 stores an index to the data in the metadata file 806/807. The container files 810/811/813 store deduplicated data blocks. The container index file 812/814 stores an index to the container files 810/811/813. Among other things, the container index file 812/814 stores an indication of whether a corresponding block in a container file 810/811/813 is referred to by a link in a metadata file 806/807. For example, data block B2 in the container file 810 is referred to by a link in the metadata file 807 in the chunk folder 805. Accordingly, the corresponding index entry in the container index file 812 indicates that the data block B2 in the container file 810 is referred to. As another example, data block B1 in the container file 811 is referred to by a link in the metadata file 807, and so the corresponding index entry in the container index file 812 indicates that this data block is referred to.

As an example, the data structures illustrated in FIG. 8 may have been created as a result of two storage operations involving two clients 130. For example, a first storage operation on a first client 130 could result in the creation of the first chunk folder 804, and a second storage operation on a second client 130 could result in the creation of the second chunk folder 805. The container files 810, 811 in the first chunk folder 804 would contain the blocks of deduplicated data of the first client 130. If the two clients 130 have substantially similar data, the second storage operation on the data of the second client 130 would result in the media file system agent 240 storing primarily links to the data blocks of the first client 130 that are already stored in the container files 810, 811. Accordingly, while a first storage operation may result in storing nearly all of the data subject to the storage operation, subsequent storage operations involving storage of similar data on the same cloud storage site 115 (or another appropriate cloud storage site) may result in substantial data storage space savings, because links to already stored data blocks can be stored instead of additional instances of data blocks.

If the cloud storage site 115 (or operating system of the cloud storage site) supports sparse files, then when the media file system agent 240 creates container files 810, 811, 813, it can create them as sparse files. A sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Having the container files 810, 811, 813 be sparse files allows the media file system agent 240 to free up space in the container files 810, 811, 813 when blocks of data in the container files 810, 811, 813 no longer need to be stored on the cloud storage sites 115. In some examples, the media file system agent 240 creates a new container file 810, 811, 813 when a container file either includes 100 blocks of data or when the size of the container file 810 exceeds 50 Mb. In other examples, the media file system agent 240 creates a new container file 810, 811, 813 when a container file satisfies other criteria (e.g., it contains from approximately 100 to approximately 1,000 blocks or when its size exceeds approximately 50 Mb to 1 Gb). Those of skill in the art will understand that the media file system agent 240 can create a new container file 810, 811, 813 when other criteria are met.

One advantage of the data structures illustrated in FIG. 8 and/or of the techniques described herein is that they significantly reduce the number of files transferred and stored on a file system of the cloud storage site 115. This is at least partly due to the storage of data blocks within the container files 810, 811, 813. Even if numerous storage operations using these data structures are performed, there will be far fewer files on the cloud storage site 115 than there would be in storage operations where each data block is stored as a separate file. Therefore, the client computers need not transfer certain blocks or files, and the file system of the cloud storage site 115 may not necessarily have to contend with storing excessively large numbers of files, such as millions of files or more. Accordingly, the systems and methods described herein enable very large numbers of blocks of data to be stored without regard to limitations of the file system of the cloud storage site 115.

Another advantage is that the data storage system enables a reduction in the amount of blocks of data stored on the cloud storage sites 115, while still maintaining at least one instance of each block of data in primary data. In examples where the data storage system stores a variable number of instances of blocks of data, blocks of data can be distributed across two or more cloud storage sites 115, thereby adding a further aspect of redundancy.

Another advantage is that the metadata files 806, 807, the metadata index files 808, 809, the container files 810, 811, 813, and/or the container index files 812, 814 could be used to replicate the data stored in the deduplication database 297, or to reconstruct the deduplication database 297 if the data of the deduplication database 297 is ever lost and/or corrupted.

The storage of data blocks in the container files may create additional complexities when it comes time to prune (delete) data blocks that the data storage system no longer need retain. This is because the data blocks are not stored as files on the file system on the cloud storage site 115 and thus cannot be directly referenced by the file system. As described in detail herein, the media file system agent 240 uses the container index files 812, 814 to keep track of which blocks of data are referenced and thus which blocks are not prunable (deletable).

In some examples, the use of the container index files 812, 814, the metadata index files 808, 809, and/or the primary and secondary tables 700, 750 to track data acts as a driver, agent or an additional file system that is layered on top of the existing file system of the cloud storage site 115. This driver/agent/additional file system allows the data storage system to efficiently keep track of very large numbers of blocks of data, without regard to any limitations of the file systems of the cloud storage sites 115. Accordingly, the data storage system can store very large numbers of blocks of data.

Accordingly, the data structures illustrated in FIG. 8 and the techniques described herein enable the performance of multiple storage operations cumulatively involving very large amounts of data, while still allowing for recovery of space on the cloud storage site 115 when storage of certain data blocks is no longer required. For example, the data of numerous clients 130 can be protected without having to store redundant copies or instances of data blocks. Space on the cloud storage site 115 can also be recovered when it is no longer necessary to store certain data blocks. Accordingly, storage operations involving very large amounts of data are enabled and optimized by the techniques described herein.

Deduplication Databases to Enable Containerized Deduplication to Cloud-Based Storage In some embodiments, the deduplication database 297 may maintain a primary block table and a secondary block table. The primary table may include an identifier column in which a data block identifier is stored, a location column in which a location of the data block in a container file is stored, an offset column indicating the offset within the container file corresponding to the location of the data block, and a reference count column, which contains a reference count of the number of links that refer to the data block. The location column may include URLs that indicate storage locations on cloud storage sites 115A-N. An example primary block table is shown below in Table 1.

TABLE 1

| | Primary Block Table | | |
|---|---|---|---|
| Identifier | Location | Offset | Reference Count |
| 0xA1B3FG | http://www.storecloud.com/companyname/V_3/Chunk_1/Container File 001 | 10 | 2 |
| 0xFG329A | http://www.storecloud.com/companyname/V_1/Chunk_5/Container File 002 | 6 | 0 |
| 0xC13804 | http://www.storecloud.com/companyname/V_2/Chunk_1/Container File 001 | 38 | 1 |
| ... | ... | ... | ... |

For example, row 1 includes information about a data block for which the identifier is "0xA1B3FG." This data block is located in the container file that is indicated in the location column, at an offset of 10 within the container file. As shown, the URL indicates a cloud storage site ("storecloud.com") used to store the container file. As indicated in the reference count column, this data block is referred to twice, meaning that there are two links that refer to the data block. As another example, row 2 includes information about a data block for which the identifier is "0xC13804." The location of this data block is indicated in the location column at an offset of 38 within the container file, and it is referred to one other time, by one link.

A secondary block table includes information about links that refer to data blocks. The secondary block table includes an identifier column, a referring location column, and an offset column. The referring location column may include URLs that indicate storage locations on cloud storage sites 115A-N. An example secondary block table is shown below in Table 2.

TABLE 2

Secondary Block Table

| Identifier | Referring Location | Offset |
|---|---|---|
| 0xA1B3FG | http://www.storecloud.com/companyname/V_3/Chunk_1/MetaDataFile 001 | 5 |
| 0xA1B3FG | http://www.2ndCloud.com/co_name/V_4/Chunk_18/MetaDataFile003 | 15 |
| 0xC13804 | http://www.storecloud.com/companyname/V_3/Chunk_2/MetaDataFile001 | 19 |
| ... | ... | ... |

For example, the first row includes information about a reference to the data block having the identifier of "0xA1B3FG" (the first row in the primary block table). The location of the link (within a first cloud storage site) is indicated in the second column, at an offset of five within the indicated metadata file. As another example, the second row includes information about another reference to the data block having the identifier of "0xA1B3FG." This location of the link (within a second cloud storage site "2ndCloud") is indicated in the second column, at an offset of 15 within the indicated metadata file. As another example, the third row includes information about a reference to the block for which the identifier is "0xC13804" (the second row in the primary block table). The location of the link is indicated in the second column, at an offset of 19 within the indicated metadata file.

The system may maintain similar primary and secondary tables to facilitate object-level and/or sub-object level deduplication processes. For example, a deduplication database 297 may maintain a primary object table and a secondary object table having similar fields to those shown in Tables 1 and 2, respectively. In such an example, each entry in a primary object table corresponds to a stored data object. Each entry in a primary object table corresponds to a reference to a stored data object.

Pruning Block-Level Deduplicated Data

Figure 9:
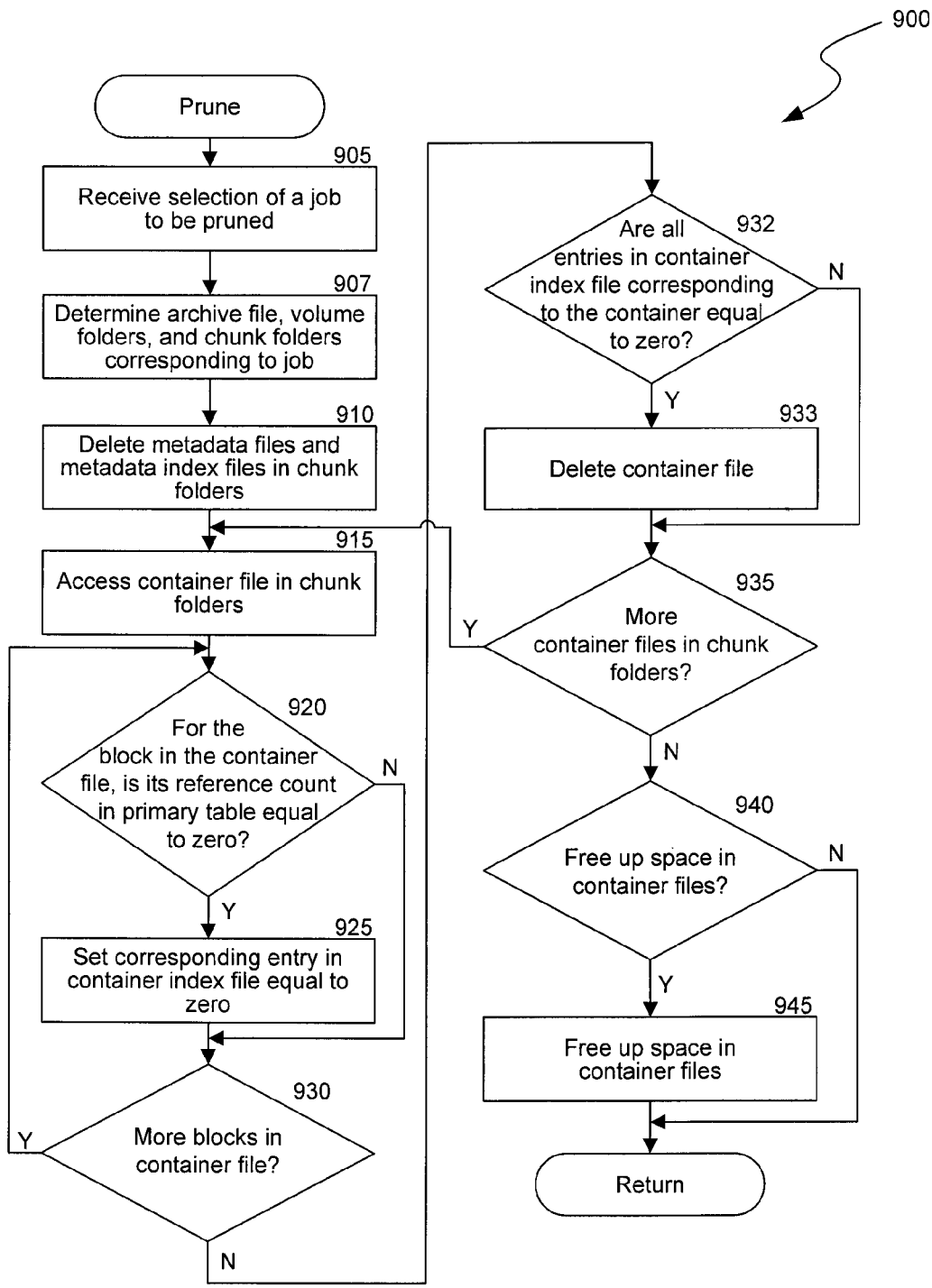
FIG. 9 is a flow diagram illustrating a process for pruning a deduplication database by pruning or deleting data blocks stored in archive files, or entire archive files.

FIG. 9 is a flow diagram of another process 900 for pruning deduplicated data blocks that may be employed in some examples. The process 900 is described as being performed by the media file system agent 240, although those of skill in the art will understand that aspects of the process 900 may be performed by any of the entities described herein. The process 900 begins at step 905 when the media file system agent 240 receives instructions to prune data corresponding to a storage operation (job). Additionally or alternatively, one or more files can be selected to be pruned, and/or one or more data blocks can be selected to be pruned. This selection of a job or other data to be deleted can be made manually, such as by an administrator, or automatically, such as by the job, files, and/or data blocks aging out by a retention policy.

As previously noted, the data structures illustrated in FIG. 8 may have been created as a result of two jobs involving two clients 130. For example, a first job on a first client 130 could result in the creation of the first chunk folder 804, and a second job on a second client 130 could result in the creation of the second chunk folder 805. The process 900 is described using this example. More specifically, the process 900 is described below as pruning the data created as a result of the first job. Of course, a similar process may be used to delete other jobs, or even smaller increments of data or data objects, such as individual files or blocks.

At step 907 the media file system agent 240 determines the file, e.g., archive file, and the volume folders 802 and chunk folder 804 corresponding to the job to be pruned. The media file system agent 240 may do so, for example, by analyzing various data structures to determine this information. At step 910 the media file system agent 240 deletes the metadata file 806 and the metadata index file 808 in the chunk folder 804. The media file system agent 240 can delete the metadata file 806 and the metadata index file 808 in this example because these files include data that is not referenced by any other data.

At step 915 the media file system agent 240 accesses the container file 810 and the container index file 812 in the chunk folder 804. The media file system agent 240 begins iterating through the data blocks in the container files 810. At step 920, beginning with a first block in the container file 810, the media file system agent 240 accesses the primary block table in the deduplication database 297. The media file system agent 240 determines from the primary block table whether the reference count of a data block in the container file 810 is equal to zero. If so, this indicates that there are no references to the data block. The process 900 then continues at step 925, where the media file system agent 240 sets the entry in the container index file 812 corresponding to the data block equal to zero, thus indicating that there are no references to the data block, and it is therefore prunable.

If the reference count of a data block is not equal to zero, then the data block is not prunable, and the process 900 continues at step 930. At this step, the media file system agent 240 determines whether there are more data blocks in the container file 810. If so, the process 900 returns to step 920, where it accesses the next data block. If there are no more data blocks in the container file 810, the process 900 continues at step 932, where the media file system agent 240 determines whether all the entries in the container index file 812 corresponding to the container file 810 are equal to zero. As illustrated in FIG. 8, the second index entry in the container index file 812 is not equal to zero, thus indicating that the corresponding block in container file 810 is referenced (by data in the chunk folder 805, as earlier described). Accordingly, the container file 810 cannot be deleted.

However, if the container file 810 did not contain any referenced data blocks, then at step 933, the media file system agent 240 would delete the container file 810. The process would then continue at step 935, where the media file system agent 240 determines whether there are more container files. According to the example as illustrated in FIG. 8, there is an additional container file 811. The process 900 then returns to step 915, where it performs the same steps 920-933 for container file 811. As a result of performing these steps, the media file system agent 240 would also determine that the container file 811 cannot be deleted, because it contains a data block that is referenced (by data in the chunk folder 805, as earlier described).

After processing container files 810, 811, the process 900 continues at step 940, where the media file system agent 240 determines whether to free up storage space in the container files 810, 811. The media file system agent 240 may do so using various techniques. For example, if the operating system of the media file system agent 240 supports sparse files, then the media file system agent 240 may free up space by zeroing out the bytes in the container files corresponding to the space to be freed up. For a number of contiguous blocks (e.g., a threshold number of contiguous blocks, such as three contiguous blocks) for which the corresponding entries in the container index file 812 indicate that the blocks are not being referred to, then the media file system agent 240 may mark these portions of the container files 810, 811 as available for storage by the operating system or the file system. The media file system agent 240 may do so by calling an API of the operating system to mark the unreferenced portions of the container files 810, 811 as available for storage.

The media file system agent 240 may use certain optimizations to manage the number of times portions of the container file are marked as available for storage, such as only zeroing out bytes in container files when a threshold number of unreferenced contiguous blocks is reached (e.g., three unreferenced contiguous blocks). These optimizations may result in less overhead for the operating system because it reduces the number of contiguous ranges of zero-value bytes in the container files 810, 811 that the operating system must keep track of (e.g., it reduces the amount of metadata about portions of the container files 810, 811 that are available for storage).

If the operating system of the media file system agent 240 does not support sparse files, then the media file system agent 240 may free up space by truncating either the beginning or the end of the container files 810, 811 (removing or deleting data at the beginning or end of the container files 810, 811). The media file system agent 240 may do so by calling an API of the operating system, or by operating directly on the container files 810, 811. For example, if a certain number of the last blocks of the container file are not being referred to, the media file system agent 240 may truncate these portions of the container files 810, 811. Other techniques may be used to free up space in the container files 810, 811 for storage of other data. At step 945 the media file system agent 240 frees up space in the container files 810, 811. The process 900 then concludes.

As a result of the process 900, the chunk folder 804 would contain only the container files 810, 811 and the container index file 812. At a later time, when the chunk folder 805 is pruned (when the job that created this chunk folder is selected to be pruned), then the container files 810, 811 in the chunk folder 804 can be deleted, because they no longer contain data blocks that are referenced by other data. Therefore, pruning data corresponding to a job may also result in pruning data corresponding to an earlier job, because the data corresponding to the earlier job is no longer referenced by the later job.

Although the process 900 is described with reference to the pruning of data corresponding to jobs (one or more storage operations), other data can also be pruned. For example, an administrator may wish to delete deduplicated data but retain non-deduplicated data. In such case, the administrator may instruct the media file system agent 240 to delete the container files 810, 811, 813 but retain the metadata files 806, 807 and metadata index files 808, 809. As another example, an administrator or storage policy may delete one or more specific files. In such case, the media file system agent 240 deletes the data blocks in the container files 810, 811, 813 corresponding to the specific files but retains other data blocks. The process 900 may include fewer or more steps than those described herein to accommodate these other pruning examples. Those of skill in the art will understand that data can be pruned in various fashions and, therefore, that the process 900 is not limited to the steps described herein.

Containerizing Deduplicated Data for Storage in the Cloud

During a storage operation that utilizes deduplication, it may be desirable to determine a suitable container file size, particularly if the storage operation will result in the container files being stored on a target cloud storage site 115A-N. As described previously, a single storage operation that utilizes deduplication may result in as few as three container files being created in a secondary cloud storage site 115, such as three for each company storing data to that cloud storage site. The contents of the few container files may reflect the content of thousands of data objects and/or millions of data blocks in primary storage. By containerizing the objects or blocks, the system reduces the strain on the file system namespace of the secondary cloud storage site 115, since it reduces the number of files stored on the file system of the cloud storage site 115. The fewer container files used per storage operation, the less strain there is on the file system namespace of the secondary cloud storage site 115. Thus, by using larger container files, the system may reduce namespace strain on the secondary cloud storage site 115.

When creating or writing container files to a target cloud storage site 115A-N used as a secondary cloud storage site, the characteristics of the WAN network connection used to transfer the container files from the media file system agent 140 to the cloud storage site 115A-N may impose other restrictions upon the size of container files used. For example, the bandwidth of the network connection may impose an upper limit on the size of container files that may be used (e.g., an upper limit of approximately 1000 blocks). If the network connection has low bandwidth, the upload of large container files to the cloud storage site may prove prohibitively slow. Also, the restoration of a particular data object or block may require the retrieval of the entire container file comprising that data object/block from the cloud storage site; if the container file is too large for a low-bandwidth network, then restoration times may become prohibitively slow. As another example, the latency of the network connection may impose a lower limit on the size of container files that may be used. This is because the total time needed to perform a storage operation may be increased if for each container file created and transferred to the target cloud storage site, the system must slowly transmit the container file and/or await a response from the cloud storage site 115A-N before processing the next container file in the storage operation.

Other factors may also affect the choice of size for container files. For example, some cloud storage sites 115A-N may not support sparse files and thus not support sparsification of container files. In this situation, smaller container files may be desirable, because then it becomes more likely the system will be able to prune entire container files from the cloud storage site 115A-N, even if it cannot prune out individual blocks/objects using sparsification techniques. As another example, a particular cloud storage site 115A-N may have a pricing structure that charges both for the total amount of storage used (e.g., total gigabytes or petabytes used) and the number of files or directories used on the site. If the cloud storage site 115A-N bases its charges on the number of files or directories used on the site, larger container files may be desirable. In some embodiments, the system may also additionally impose an absolute upper or lower limit on the size of container files used. For example, the system may impose an upper limit on the size of container files in order to minimize the amount of time it takes the system to traverse a container file during data restoration. For example, in some embodiments, the system may impose an absolute 100 block size upon container files, even if the network bandwidth would theoretically allow for larger container files. As another example, the system may impose an absolute lower limit on the size of container files used, since there may be overhead costs (e.g., processing time and/or memory used) for each additional container file used in a storage operation.

Thus, the deduplication module 299 or another system component may perform the following process to establish a container size for a storage operation. The deduplication module 299 or system may (1) determine the average latency and bandwidth of the network connection between the target cloud storage site 115A-N and the media file system agent 240 (or similar metrics regarding the network connection, e.g., maximum latency and minimum bandwidth), (2) determine any namespace restrictions imposed by the target cloud storage site 115A, (3) determine whether the target cloud storage site 115A-N supports the sparsification of data files, (4) determine the pricing structure used by the target cloud storage site, (5) determine any caps set by the system upon container file size, and (6) perform an optimization to establish a container size for the storage operation reflecting one or more of these determined factors and/or other factors (e.g., such as user input).

Alternatively, the system may permit a user to select the container size that will be used for one or more storage operations. Still alternatively, the user or the system may establish for all storage operations, the container size that will be used for a particular cloud storage site or all cloud storage sites.

Indexing of Data

Figure 10:
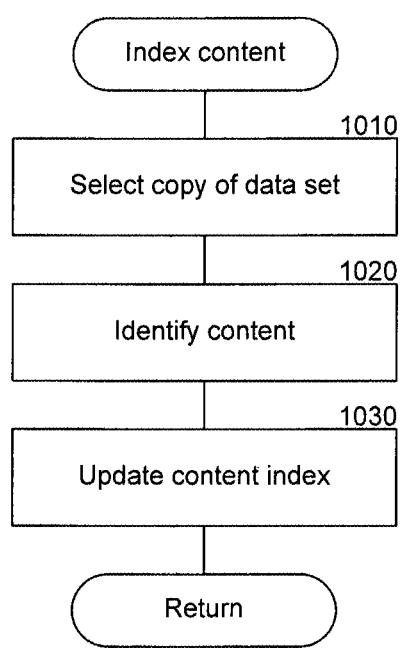
FIG. 10 is a flow diagram that illustrates the processing of a content indexing component.

As noted above for FIG. 3B, the system may index data to be stored at a cloud storage site, such as before the data is sent to the cloud storage site. Some details on suitable content indexing techniques will now be presented. Further details may be found in the assignee's U.S. Patent Publication No. 2009-0287665, filed Jul. 29, 2009, entitled METHOD AND SYSTEM FOR SEARCHING STORED DATA. FIG. 10 is a flow diagram that illustrates the processing of a content indexing component 205 for later searching, according to one embodiment. The component is invoked when new content is available or additional content is ready to be added to the content index. In step 1010, the component selects a copy of the data to be indexed. For example, the copy may be a secondary copy of the data, a data snapshot, or data stored or being stored in an archive copy. In step 1020, the component identifies content within the copy of the data. For example, the component may identify data files such as word processing documents, spreadsheets, and presentation slides within the secondary data store. The system may check the data against previously indexed data, and only index new or additional data. In step 1030, the component updates an index of the content to make the identified content available for searching. The system may parse, process, and store the data. For example, the component may add information such as the location of the content, keywords found within the content, and other supplemental information about the content that may be helpful for locating the content during a search. In one example, the content indexing component updates a content index stored within the SS index 261, SS light index 247 and/or the management light index 245 and/or management index 211. After step 1030, these steps conclude.

FIG. 11 illustrates some of the data structures used by the system to facilitate content indexing. While the term "field" and "record" are used herein when describing certain data structures, the system described herein may employ any type of data structure. For example, relevant data can have preceding headers, or other overhead data preceding (or following) the relevant data. Alternatively, relevant data can avoid the use of any overhead data, such as headers, and simply be recognized by a certain byte or series of bytes within a serial data stream. Any number of data structures and types can be employed herein.

FIG. 11 illustrates a data structure containing entries of a content index. In some embodiments, a copy of the content index shown (or a copy of a subset of the content index shown) may be stored within the SS index 261, SS light index 247 and/or the management light index 245 and/or management index 211. The offline content indexing system uses this and similar data structures to provide more intelligent content indexing. For example, the offline content indexing system may index multiple copies of data and data available from the multiple copies using a secondary copy of data stored on media with a higher availability based on the location or other attributes indicated by the data structure described below. As another example, the offline content indexing system may prefer an unencrypted copy of the data to an encrypted copy to avoid wasting time unnecessarily decrypting the data.

The table 1100 contains a location column 1110, a keywords column 1120, a user tags column 1130, an application column 1140, and an available column 1150. The table 1100 contains five sample entries. The first entry 1160 specifies that the location of a file is on a corporate intranet by using a web universal resource locator ("URL"). The entry 1160 contains keywords "finance," "profit," and "loss" that identify content within the file. The entry 1160 contains tags added by a user that specify that the content comes from the accounting department and is confidential. The entry 1160 indicates that a spreadsheet program typically consumes the content, and that the entry is immediately available.

Another entry 1170 specifies that data is stored on a local tape that is a personal email, and can be available in about an hour. Another entry 1180 specifies an offsite tape holds a presentation related to a cancelled project. The entry 1180 refers to offsite data that is available within one week due to the delay of retrieving the archived data from the offsite location. Another entry 1190 specifies that the location of a word processing document containing data relating to CEO compensation is in a cloud storage site by using a URL that points to a deduplicated archive file that may be implemented by a data structure similar to those shown in FIGS. 5A-D and/or FIG. 8. As shown, the estimated retrieval time from this cloud storage site is 15 minutes. Another entry 1195 specifies that the location of a personal email relating to a medical condition is stored in a second cloud storage site by using another URL that points to a deduplicated archive file that may be implemented by a data structure similar to those shown in FIGS. 5A-D and/or FIG. 8. As shown, the estimated retrieval time from this cloud storage site is 1 hour.

Policy-Driven Storage of Data Across Cloud Storage Sites

Referring again to FIG. 3B, at step 330, the system stores deduplicated data (or "dehydrated data") in secondary cloud storage by utilizing the media file system agent 240 to perform file system operations (such as a "write" operation) on a target cloud storage site 115A. To determine which target cloud storage site the media file system agent 240 should write to, the media file system agent 240 may retrieve an applicable storage policy (described previously with respect to FIG. 2) and act in accordance therewith. For example, the media file system agent 240 may retrieve a storage policy stored in management index 211 that specifies that all email objects (and blocks contained therein) should be stored on cloud storage site 115A, while document objects (and blocks contained therein) should be stored on cloud storage site 115B. As another example, the storage policy stored in management index 211 may specify that all objects related to a particular client 130 or particular user (e.g., a company CEO) should be stored on a more expensive or reliable cloud storage site 115A while all other objects for all other clients 130 and/or users should be stored on a less expensive or less reliable cloud storage site 115B. As yet another example, at block 330, the system may review the historical performance achieved by various target cloud storage sites 115A-N to determine which sites have historically achieved the desired performance metrics mandated by a storage policy. Additionally, the system may select a cloud storage site that has better historical performance than other sites.

As another example, a storage policy may specify that a first type of files should be retained for one year in a first target cloud storage site 115A, that a second type of files should be retained for seven years in a second cloud storage site 115B, and that a third type of files should be retained indefinitely in a third cloud storage site 115N. As yet another example, a storage policy may specify that a first type of files (e.g., secondary disk copies needed for rapid disaster recovery) be stored only in storage sites 115, including cloud storage sites 115A-N, that can provide sufficient bandwidth, network capacity or other performance to ensure that the time needed to recover a file from the storage device 115 (e.g., cloud storage site 115A-N) is less a specified recovery time objective.

Restoring Dehydrated Data Objects from Cloud Storage Sites

Figure 12:
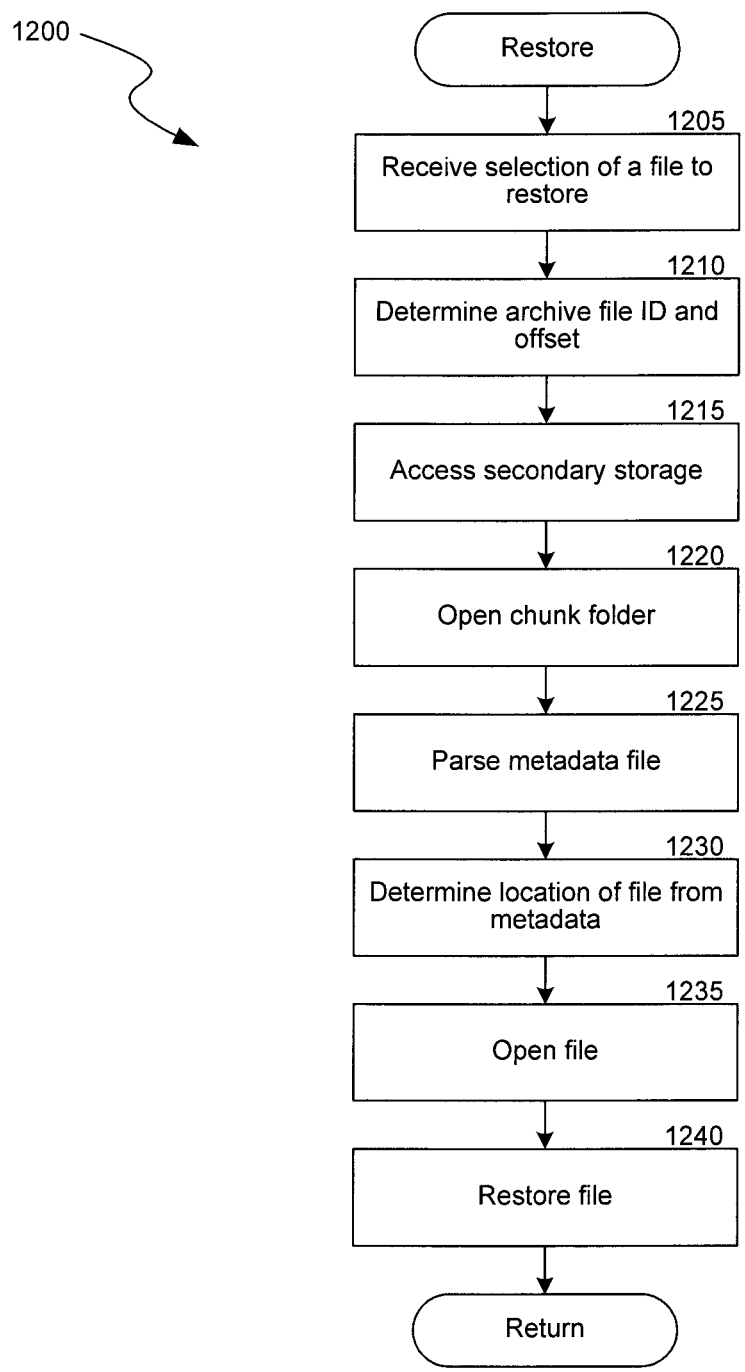
FIG. 12 is a flow diagram illustrating a process for restoring or retrieving data from chunk folders in an archive file format on secondary storage.

After a storage operation has resulted in the storage of dehydrated data on a cloud storage site 115A-N, it may be necessary to later restore some or all of the original data files, objects, sub-objects, or blocks that were archived during the storage operation. For example, a user or customer of a cloud storage site may wish to retrieve a file that was copied to the cloud storage site in dehydrated form if a primary copy of that file is no longer available on the user's client 130. As another example, to comply with an electronic discovery request, it may be necessary to retrieve an archived version of a particular file. Some details on suitable techniques for restoring files and objects from dehydrated data will now be presented. Further details may be found in the assignee's U.S. patent application Ser. No. 12/565,576, filed Sep. 23, 2009, entitled SYSTEMS AND METHODS FOR MANAGING SINGLE INSTANCING DATA FIG. 12 is a flow diagram illustrating a process 1200 for restoring or retrieving data from chunk folders in an archive file format on secondary storage. This process may be utilized to restore data objects stored on cloud storage sites 115A-N. In order to do so, the system identifies the cloud storage site 115, the archive file on that cloud storage site, the chunk file within that archive file, and further the location of the data object within that chunk file. At step 1205 a selection of a data object to restore is received, such as from an administrator via a graphical interface. The process of restoring data that has been deduplicated may be referred to herein as "rehydrating deduplicated data."

Figure 13A:
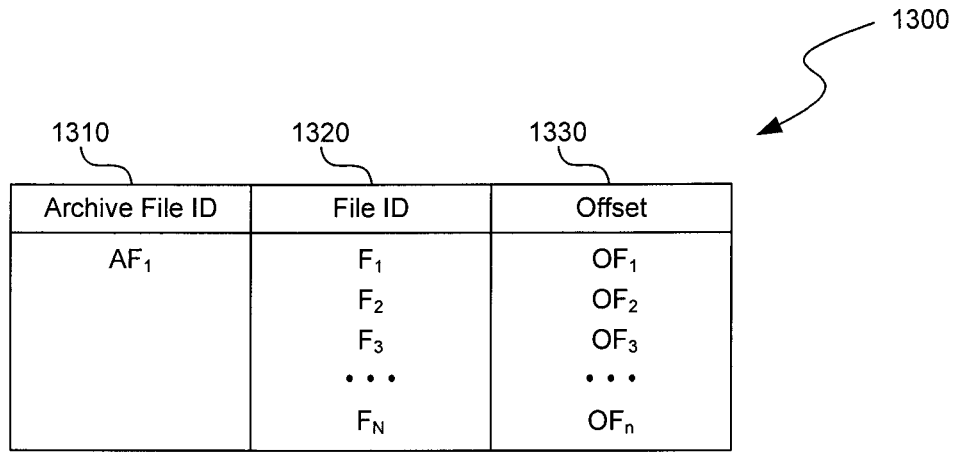
FIGS. 13A and 13B illustrate example data structures that the system may maintain to facilitate the restoration or retrieval of data from chunk folders in an archive file format on secondary storage.

At step 1210 the media file system agent 240 is consulted to determine an archive file ID and an offset of the data object to be restored. The media file system agent 240 can determine this information from a data structure, such as a tree index (for example, a c-tree may be used, which, in some examples, is a type of self-balancing b-tree), that it maintains for each archive file. For example, an archive file may be based on files 1 through n, with file 1 at offset 1, file 2 at offset 2, file n at offset n, and so on. The media file system agent 240 maintains one tree index per full storage operation cycle. (A storage operation cycle consists of a cycle from one full storage operation of a set of data, including any intervening incremental storage operations, until another full storage operation is performed.) FIG. 13A illustrates an example data structure 1300 that the media file system agent 240 maintains. The data structure 1300 includes an archive file ID item 1310 that contains the identifier of archive files, a file or data object item 1320 that contains the identifier of the file or data object, and an offset 1330 containing the offset of the file or data object within the archive file or cloud container.

The media file system agent 240 may also maintain a multiple-part identifier, such as a five-part identifier, that includes an enterprise or domain identifier (e.g., an identifier of a company/customer, a grouping of clients/companies, etc.), a client identifier to identify a particular company, customer or host computer to connect to at the customer, an application type (e.g. if all Microsoft Word documents are stored together), a storage operation set identifier to identify when the storage operation data was obtained, and a sub-client identifier to provide a further level of granularity within an enterprise to identify an origin, location, or the use of the data (e.g., a file system on a client could be a sub-client, or a database on a client could be a sub-client).

Using the data structure maintained for the archive file, the media file system agent 240 determines the archive file ID and offset within the archive file of the data object to be restored. The media file system agent 240 then needs to determine which chunk contains the data object. To do so, the media file system agent 240 consults another server, such as a storage manager 105 (discussed below), that has a data structure that maps the archive file ID and offset to the specific media (as well as the specific chunk file within the specific media, optionally). For example, the storage manager may maintain a database table that maps the archive file ID to specific media, to a URL indicating the cloud storage site location, or to a bar code number for a magnetic tape cartridge storing that archive file.

Figure 13B:
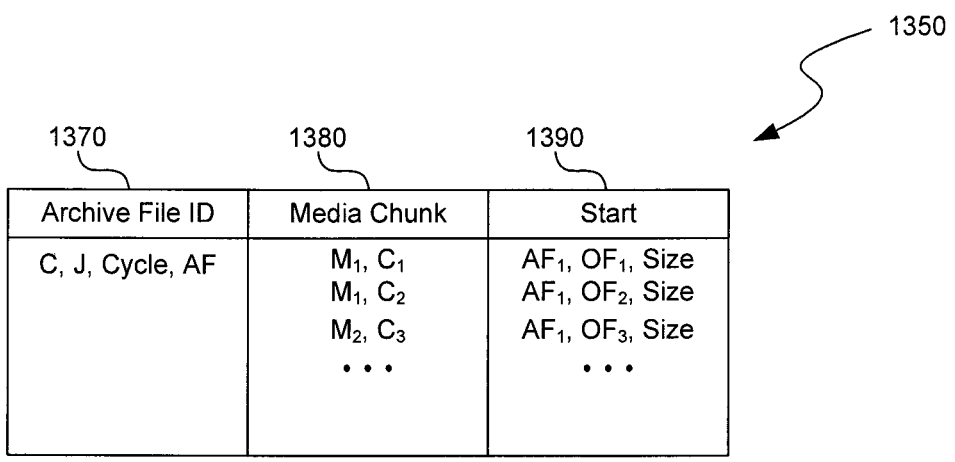

FIG. 13B illustrates an example data structure 1350 that the storage manager 109 maintains. The data structure 1350 includes an archive file ID item 1370 identifying a client, a storage operation job, a cycle, and an archive file ID, a media chunk item 1380 containing an identification of the media containing the archive file and the chunk on the media that contains the archive file, and a start item 1390 that contains the archive file ID, an offset, and a size. When utilizing a cloud storage site, some or all of the entries in the media chunk column 1380 may comprise a URL (e.g., a URL like https://www.cloudstorage.com/companyname/C/J/Y/1/C__1.xml) that reflects the location of the archive file within a specific cloud storage site and/or reflects a website where the system may otherwise access the archive file. The media file system agent 240 then can consult a deduplication database 297 to determine the specific chunk that corresponds to the data object to be restored.

At step 1215, the cloud storage server accesses a particular secondary storage device and the specific media, such as a specific folder within a disk at a cloud storage site (indicated by a URL) or a specific tape cartridge in an automated tape library, is accessed. At step 1220 the cloud storage server opens the specific chunk folder, and the metadata file is accessed. At step 1225, the metadata file is parsed until the stream header corresponding to the data object or block to be restored is accessed. At step 1230, the cloud storage server determines the location of the file from the stream data. The stream data indicates the location of the data object to be restored, which is either in a container file in the chunk folder or within a container file in another chunk folder. At step 1235 the data object is retrieved or opened, and the data object is read and streamed back to restore it for the requesting client/host/customer (block 1240). Each data object may have a piece of data appended to it (e.g., an EOF marker) that indicates to the reader when to stop reading the data object. A similar piece of data may be prepended (e.g., a BOF marker) to the data object. The process 1200 then concludes.

Although the process of FIG. 12 and the data structures of FIG. 13 were described with respect to object-level restoration and retrieval, one having skill in the art will appreciate that a system may employ a similar process and similar data structures to restore and retrieve individual blocks or sub-objects archived within a system.

Local Searching of Data Stored on Remote Cloud Storage Sites

As described previously, during the process of FIG. 3B, the system may generate one or more copies of a content index as shown in FIG. 11 within the SS index 261, SS light index 147, the management light index 245 and/or management index 211. Using this content index information, the system may provide local search capabilities. Some details on suitable searching techniques will now be presented. Further details may be found in the assignee's U.S. Patent Publication No. 2008-0091655, filed Mar. 30, 2007, entitled METHOD AND SYSTEM FOR OFFLINE INDEXING OF CONTENT AND CLASSIFYING STORED DATA. For example, the storage manager 105 may receive and process a request to search the management index 211 for files matching certain search criteria, and then return matching files. By providing local searching of the content index information, the system may provide more cost-effective and/or faster searches of data archived or stored on a remote cloud storage site 115A-N, since local searches of a local content index typically do not require file system calls to a cloud storage site other than to retrieve identified files stored therein.

Figure 14:
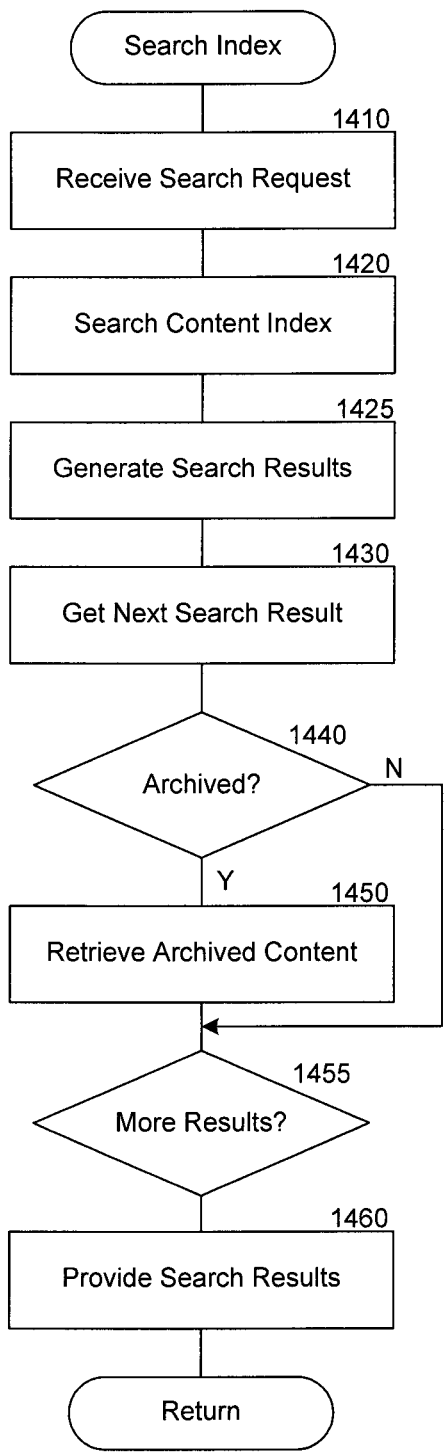
FIG. 14 is a flow diagram illustrating the processing of a search request by the system.

FIG. 14 is a flow diagram that illustrates the processing of a search request by the system, in one embodiment. In step 1410, the system receives a search request specifying criteria for finding matching target content. For example, the search request may specify one or more keywords that will be found in matching documents. The search request may also specify boolean operators, regular expressions, and other common search specifications to identify relationships and precedence between terms within the search query. In step 1420, the system searches the content index to identify matching content items that are added to a set of search results. For example, the system may identify documents containing specified keywords or other criteria and add these to a list of search results. In step 1425, the system generates search results based on the content identified in the content index. In step 1430, the system selects the first search result. In decision step 1440, if the search result indicates that the identified content is archived, then the system continues at step 1450, else the system continues at step 1455. For example, the content may be archived because it is on a remote cloud storage site.

In step 1450, the system retrieves the archived content, which may utilize the data restoration methods discussed herein. Additionally or alternatively, the system may provide an estimate of the time required to retrieve the archived content and add this information to the selected search result. In decision step 1455, if there are more search results, then the system loops to step 1430 to get the next search results, else the system continues at step 1460. In step 1460, the system provides the search results in response to the search query. For example, the user may receive the search results through a web page that lists the search results, or the search results may be provided to another system for additional processing through an API. The system may also perform additional processing of the search results before presenting the search results to the user. For example, the system may order the search results, rank them by retrieval time, and so forth. After step 1460, these steps conclude.

Collaborative Searching

Figure 25:
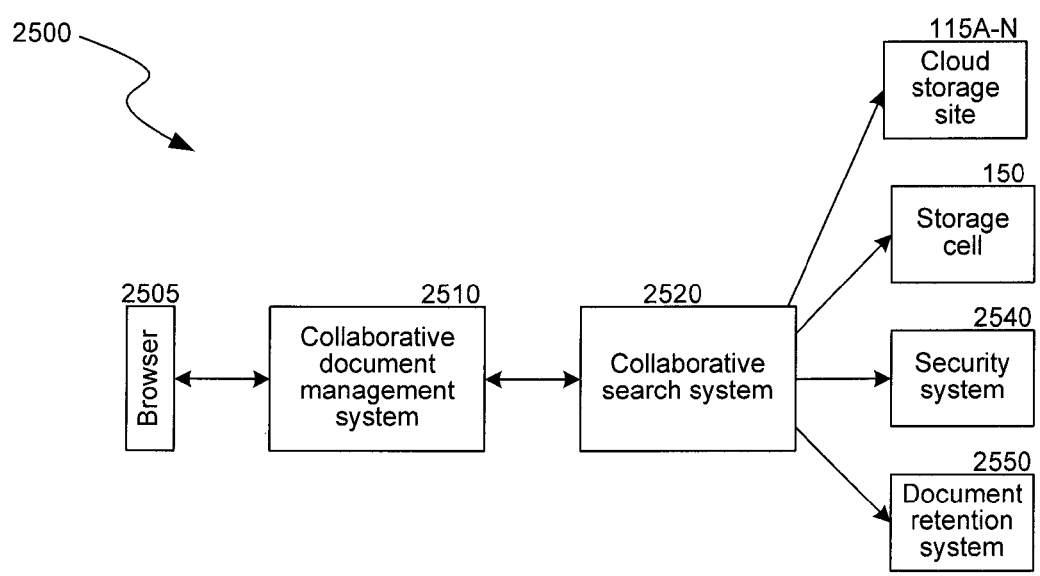
FIG. 25 is a block diagram illustrating an example architecture for integrating a collaborative search system with a collaborative document management system.

In some implementations, a cloud storage site may be integrated with a collaborative search system and collaborative document management system to facilitate collaborative searching, data retrieval, and discovery. Some details on collaborative searching are provided below; further details may be found in the assignee's U.S. Patent Publication No. US-2008-0222108-A1, filed Oct. 17, 2007, entitled METHOD AND SYSTEM FOR COLLABORATIVE SEARCHING. Referring to FIG. 25, a block diagram 2500 illustrating an architecture for integrating a collaborative search system with a collaborative document management system is shown. A browser 2505 is used by collaborative participants as an interface to access the integrated system. A collaborative participant submits queries, receives results, and performs other collaborative tasks through the browser 2505. The browser 2505 is connected to a collaborative document management system 2510, such as the Microsoft SharePoint Server. The collaborative document management system 2510 provides a web-based portal for collaboration between collaborative participants. The collaborative document management system 2510 is connected to a collaborative search system 2520. The collaborative search system 2520 integrates with the collaborative document management system 2510 and adds additional components, such as web components and content parsers, and provides access to cloud storage content. The collaborative search system 2520 is connected to not only one or more cloud storage sites 115, but also to local storage (e.g. a storage operation cell 150), as well as to a security system 2540, and a document retention system 2550.

The storage operation cell 150, as shown in FIG. 2, provides fast access to content from various computer systems within an enterprise. The security system 2540 provides users and groups that are meaningful to a particular enterprise to facilitate searching. The security system 2540 also enforces access rights to collaborative content. The document retention system 2550 places a legal hold on documents related to a document retention request.

In some examples, the collaborative search system receives criteria for a search through a collaborative process. For example, one collaborative participant may create a new query for responding to a discovery request regarding a product made by the company that employs the collaborative participant. The first collaborative participant may add search criteria including the product name and then submit the search criteria to the collaborative document management system 2510 as a collaborative document. Another collaborative participant may open the collaborative document and add additional search criteria, such as instructions to narrow the list of departments from which documents should be searched. For example, the second participant may include the engineering, marketing, and sales teams that worked on the product. The collaborative search system 2520 may also add additional criteria inferred from the criteria added by the collaborative participants. For example, based on the company's indexed data the collaborative search system may determine that two employees, one in a department already within the search criteria and another outside of the current search criteria, frequently send email about projects. Based on this information, the collaborative search system may add the user that is outside of the current search criteria to the search criteria, or it may prompt one of the collaborative participants to consider adding the user to the search criteria.

Alternatively or additionally, the system may provide further features. For example, the system may add additional search criteria inferred from dynamic changes made to the search criteria. The system may use heuristics type information when determining search criteria. The collaborative search system 2520 may defines workflows that define the set of steps that are part of completing a task. The collaborative search system 2520 may create a collaborative document based on a set of search results. The collaborative document provides a mechanism for multiple collaborative participants to contribute to steps within a workflow subsequent to the search process. In the example of a discovery request, the steps of performing various levels of review of found documents can consume the majority of the time spent responding to the discovery request, and a collaborative participant may reviewing each document and flagging the document if it contains privileged content or directly add comments to documents within the search results. The collaborative search system 2520 provides a user interface through which a collaborative participant may select from a set of templates that define common search tasks, such as a Sarbanes-Oxley template that initiates a search for materials required to be disclosed under the Sarbanes-Oxley Act.

The user interface of the collaborative search system 2520 may include custom-developed web components to assist with the integration with the collaborative document management system. For example, Microsoft SharePoint Server provides an object model and API for accessing collaborative features such as workflows and a search front-end that can be invoked from custom web pages using the Active Server Page Framework ("ASPX"). The collaborative search system 2520 provides a user interface that does not require specialized software to be installed on the searching client system. The collaborative search system may also provide a set of parsers for viewing content from many different sources, such as received in a list of search results, as web content. For example, the collaborative search system may provide a parser for converting a word processing document into a Hypertext Markup Language ("HTML") web page. Other parsers may convert spreadsheet content, database tables, instant messaging conversation logs, email, or other structured or unstructured content into a web page format accessible via a collaborative participant's browser. In this way, heterogeneous data from many different applications is available through a unified search user interface.

Figure 26:
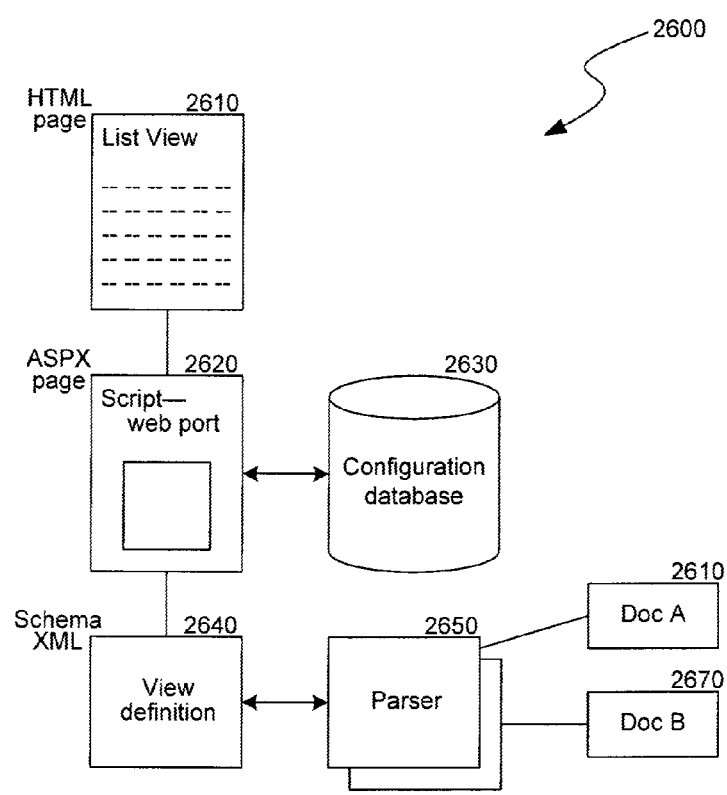
FIG. 26 is a schematic diagram illustrating integration of parsers with a typical collaborative document management system.

FIG. 26 illustrates the integration of parsers with the collaborative document management system. The collaborative document management system 2510 contains a configuration database 2630, a schema file 2640, one or more dynamic web pages 2620, and one or more generated web pages 2610. When a collaborative participant accesses the collaborative document management system 2510, the collaborative document management system 2510 consults the configuration database to determine what to display to the collaborative participant based on factors such as the identity of the user, the particular web address the collaborative participant requested, the access rights of the collaborative participant, the state of previous requests by the collaborative participant to the collaborative document management system, and so on. Based on the determined information to display, the collaborative document management system consults the schema file 2640 to determine the layout of the information for display to the collaborative participant. The schema file 2640 may include instructions based on predetermined layouts, dynamically determined layouts, templates to be included in the layout, and so on. At this point, one or more parsers 2650 may be consulted to migrate data from one or more document types (e.g., 2660 and 2670) to an XML or other common format. The schema data is passed to an ASPX or other dynamic page 2620 that may use scripts and an object model provided by the collaborative document management system to identify, parse data types, and dynamically build a page with the content that will be displayed to the collaborative participant. For example, the system may present one or more templates described above. After the scripts are run, the dynamic page 2620 generates an HTML or other generic formatted page 2610 that is sent to the collaborative participant's browser/GUI that will be displayed to the collaborative participant.

The collaborative search system 2520 may integrate components for searching data from multiple operating systems and multiple data formats from multiple cloud storage sites. For example, file system data on a Microsoft Windows computer system may be stored differently from file system data on a Linux computer system, but the collaborative search system may make both types of file system data available for searching. Data may be gathered from each of these types of disparate data sources and forwarded to a uniform database where the data can be collected, tagged with various classifications, and indexed for searching. The system may then display the data on differently formatted browsers.

Other implementations may integrate a collaborative document management system 2510 and collaborative search system 2520 with another type of storage system that provides content indexing and search capabilities comparable to the storage operation cell 150 shown FIG. 2. For example, an implementation may integrate a collaborative document management system and collaborative search system with a system shown in FIG. 15, FIG. 21 and/or FIG. 22, which are described in greater detail herein.

In some examples, the collaborative search system 2520 integrates information from the security system 2540. For example, the collaborative search system may use Microsoft Windows Active Directory to determine users whose content should be searched as part of a discovery request. Active Directory contains all of the users in an organization and organizes the users into groups. The security system may provide restrictions on access to content retrieved in response to a search. For example, a temporary worker hired to find documents for a sales pitch might not have access to documents associated with executives or documents that contain confidential company information. The collaborative search system can manage a workflow that contains steps performed by collaborative participants with varying levels of access to content. For example, a company officer may be the only collaborative participant allowed to search for a particular set of documents as part of a search request, while other collaborative participants may be allowed to search for less restricted documents.

Cloud Gateway

Figure 15:
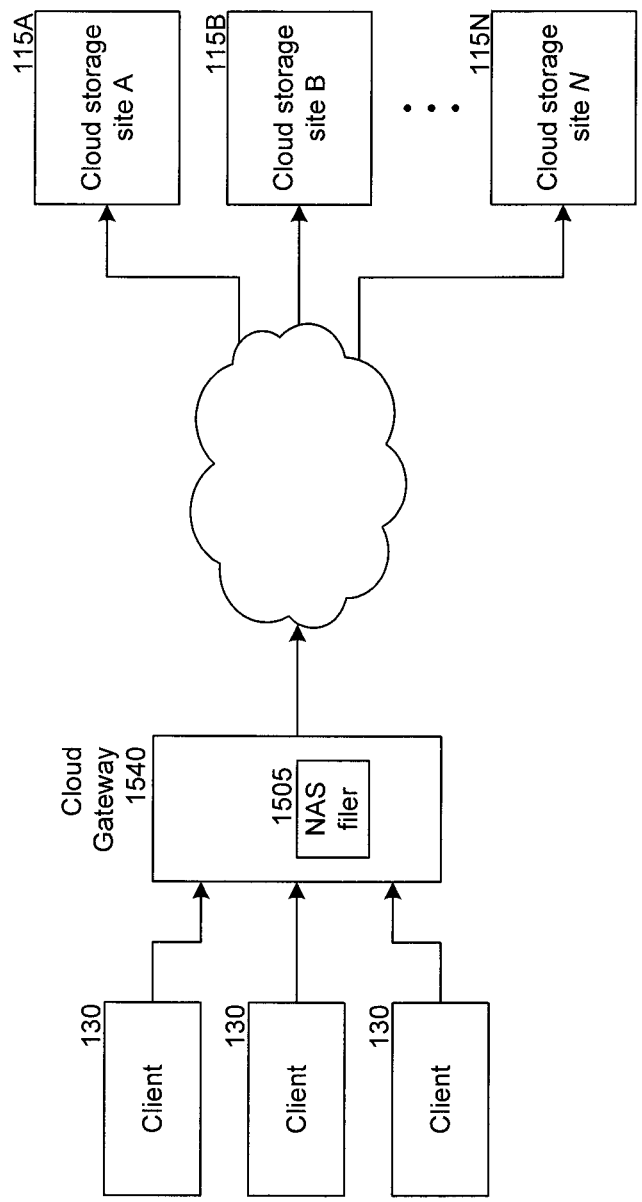
FIG. 15 illustrates another example of an arrangement of resources in a computing network that may employ aspects of the invention.

As shown in FIG. 15, the system can include a "cloud gateway" 1540, which may include a network attached storage ("NAS") filer 1505 or NAS head with a limited amount of local storage, and which advertises CIFS/NFS interfaces out to clients 130 and cloud storage sites 115A-N. The local storage of the NAS filer 1505 of the cloud gateway 1540 provides a way to satisfy incoming data writes from clients 130 quickly, and to buffer or spool data before it is transferred to cloud storage sites 115A-N or other cloud storage sites 115 (not shown). The cloud gateway 1540 may include functionality to de-duplicate locally stored data before being written up to cloud storage sites 115A-N, both of which may be done on a fairly rapid or aggressive schedule.

In addition to providing REST-based methods to input and output data from the system, the cloud gateway 1540 may also provide conventional methods of accessing data via a NAS filer 1505 such as via Web-based Distributed Authoring and Versioning (WebDAV) and CIFS/NFS methods, thus making it easy for users and applications to read and write data to cloud storage sites 115A-N without significant changes to their current mode of working.

Overall, users and applications can specify parameters (e.g., under a storage policy) that dictate to the cloud gateway 1540 the handling of their content—i.e., how long it is retained, should it be encrypted/compressed, should it be deduplicated, should it be indexed and searchable, should it to be replicated and if so, how many copies and to where, etc. The cloud gateway 1540 may facilitate the cloud storage system by allowing for metadata to be specified on a per file/object basis or on a data container or bucket basis. Further, the system permits data to be replicated on demand to selected geographies based on access usage patterns, etc.

Cloud Gateway Architecture

Figure 16:
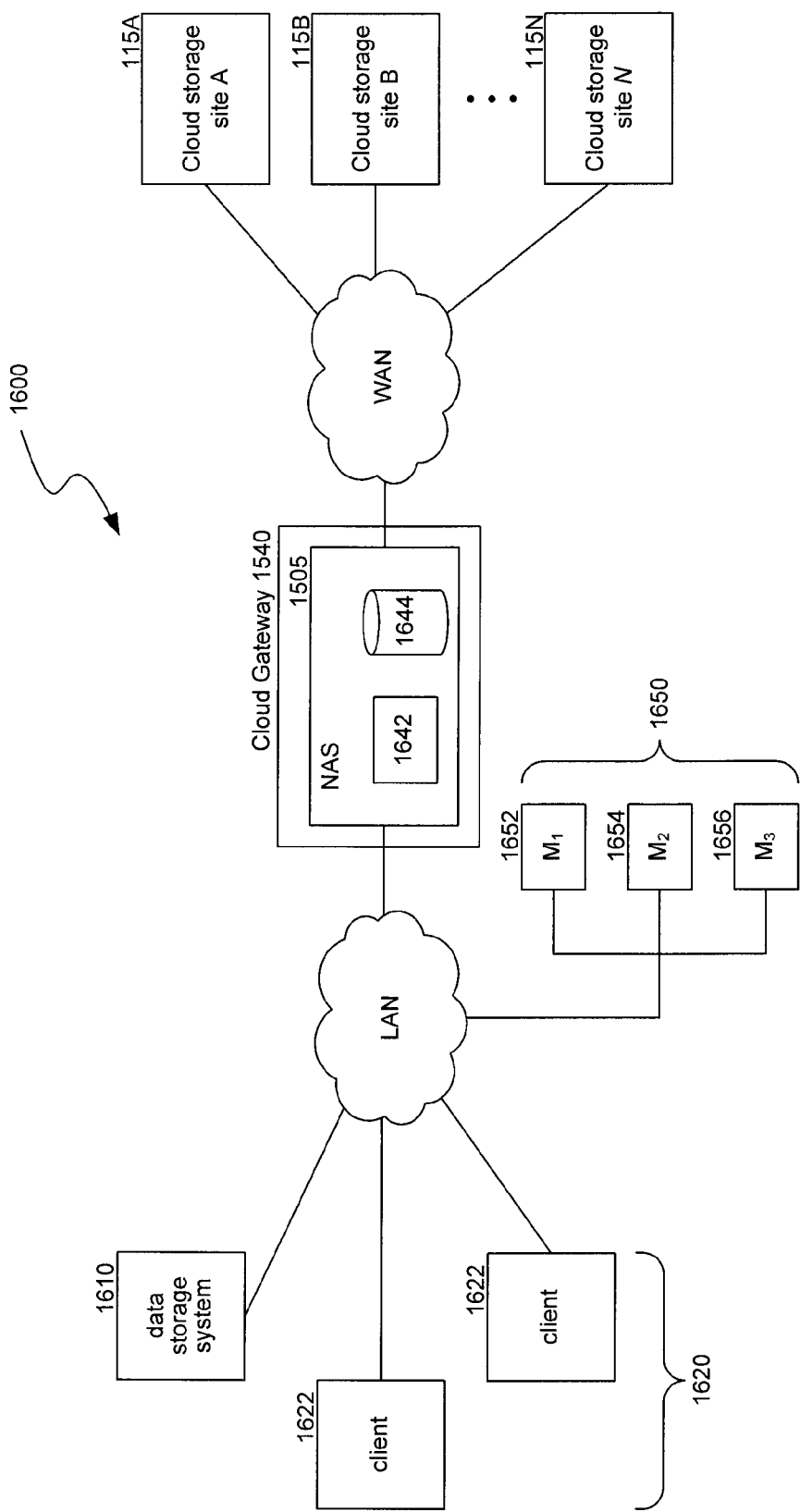
FIG. 16 is a block diagram illustrating a suitable environment for utilizing a networked data storage device.

FIG. 16 shows a block diagram illustrating a suitable environment for the cloud gateway 1540 that can include a filer or NAS filer 1505 configured to perform data migration to cloud storage sites and other secondary storage. Some details on suitable systems and methods for performing data migration using a NAS filer 1505 will now be presented. Further details may be found in the assignee's U.S. patent application Ser. No. 12/558,640, filed Sep. 14, 2009, entitled DATA TRANSFER TECHNIQUES WITHIN DATA STORAGE DEVICES, SUCH AS NETWORK ATTACHED STORAGE PERFORMING DATA MIGRATION.

While the examples below discuss a NAS filer 1505, any architecture or networked data cloud storage site employing the following principles may be used, including a proxy computer coupled to the NAS filer 1505. The computing system 1600 includes a data storage system 1610, such as storage operation cell 150. Client computers 1620, including computers 1622 and 1624, are associated with users or servers that generate data to be stored in secondary storage. The client computers 1622 and 1624 communicate with the data storage system 1610 over a network 1630, such as a private network such as an intranet, a public network such as the Internet, and so on. The networked computing system 1600 includes network-attached storage, such as the cloud gateway 1540.

The cloud gateway 1540 includes NAS-based storage or memory, such as a cache 1644, for storing data received from the network, such as data from client computers 1622 and 1624. (The term "cache" is used generically herein for any type of storage, and thus the cache 1644 can include any type of storage for storing data files within the NAS filer 1505, such as magnetic disk, optical disk, semiconductor memory, or other known types of storage such as magnetic tape or types of storage hereafter developed.) The cache 1644 may include an index or other data structure in order to track where data is eventually stored (e.g., location in the cloud), or the index may be stored elsewhere, such as on the proxy computer. The index may include information associating the data with information identifying a secondary cloud storage site that stored the data, or other information. For example, as described in detail below, the index may include both an indication of which blocks have been written to secondary storage (and where they are stored in secondary storage), and a lookup table that maps blocks to individual files stored within the cloud gateway 1540.

The cloud gateway 1540 also includes a data migration component 1642 that performs data migration on data stored in the cache 1644. While shown in FIG. 16 as being within the NAS filer 1505, the data migration component 1642 may be on a proxy computer coupled to the NAS filer. In some cases, the data migration component 1642 is a device driver or agent that performs block-level, sub-object-level, or object-level data migration of data stored in the cache, or a combination of two or more types of data migration, depending on the needs of the system. During data migration, the NAS filer 1505 not only transfers data from the cache of the device to one or more cloud storage sites 115A-N located on the network 1630, but also to other secondary storage locations 1650, such as magnetic tapes 1652, optical disks 1654, or other secondary storage 1656. Importantly, the cloud gateway 1540 may also retrieve data from these other secondary storage devices and transfer it to the cloud storage sites 115A-N (under ILM or other storage policies). The NAS filer 1505 may include various data storage components that are used when identifying and transferring data from the cache 1644 to the secondary cloud storage sites 1650. These components will now be discussed.

Figure 17:
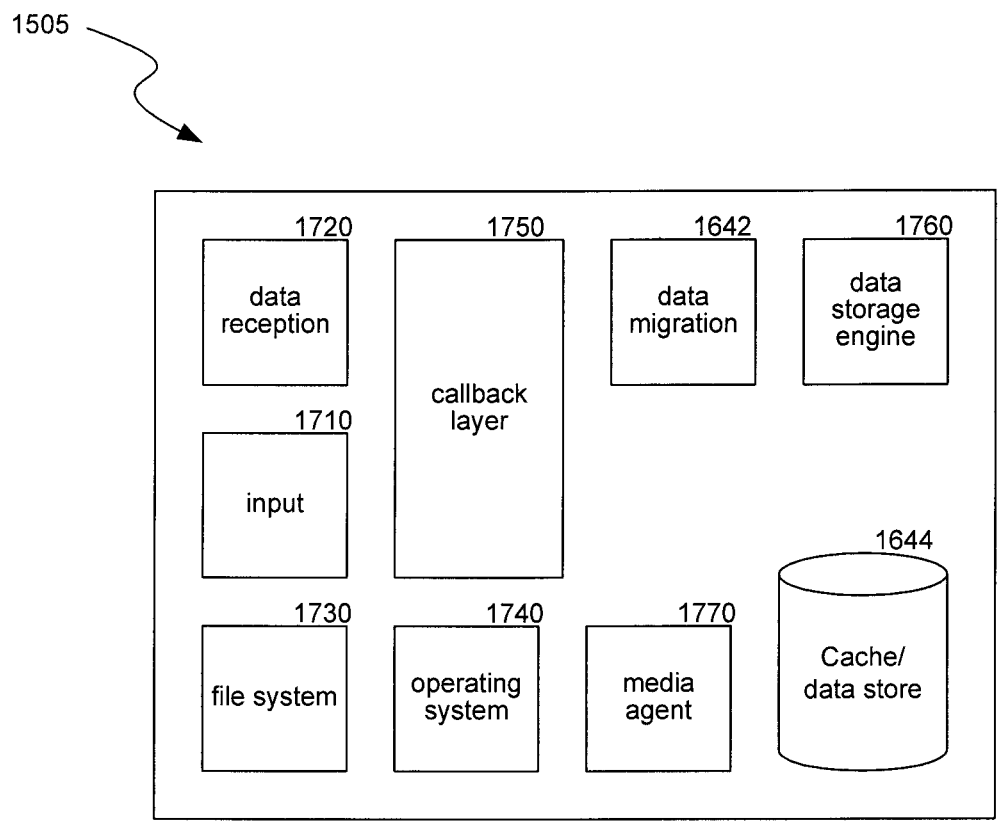
FIG. 17 shows a block diagram illustrating components of the network-attached storage (NAS) filer component of a cloud gateway configured to perform data migration.

Referring to FIG. 17, a block diagram illustrating the components of the NAS filer 1505 component of the cloud gateway 1540, configured to perform data migration, is shown. In addition to the data migration component 1642 and cache or data store 1644, the cloud gateway 1540 may include an input component 1710, a data reception component 1720, a file system 1730, and an operating system 1740. The input component 1710 may receive various inputs, such as via an iSCSI protocol. That is, the cloud gateway may receive commands or control data from a data storage system 1610 over IP channels. For example, the data storage system 1610 may send commands to a cloud gateway's IP address in order to provide instructions to the NAS filer 1505. The data reception component 1720 may receive data to be stored over multiple protocols, such as NFS, CIFS, and so on. For example, a UNIX-based system may send data to be stored on the NAS filer 1505 over an NFS communication channel, while a Windows-based system may send data to be stored on the NAS filer over a CIFS communication channel.

Additionally, the cloud gateway 1540 may include a number of data storage resources, such as a data storage engine 1760 to direct reads from and writes to the data store 1644, and one or more media agents 1770. The media agents 1770 may be similar to the secondary storage computing devices 165 described herein and may similarly be communicatively coupled to one or more SS indices (e.g., SS index 261 and SS light index 204) and deduplication database 297. The media agents 1770 may comprise components similar to those of the secondary storage computing devices 165, such as deduplication module 299, content indexing component 205, network agent 235, media file system agent 240 (including cloud storage submodule 236), as described previously. In some cases, the cloud gateway 1540 may include two or more media agents 1770, such as multiple media agents 1770 externally attached to the cloud gateway. The cloud gateway 1540 may expand its data storage capabilities by adding media agents 1770, as well as other components.

As discussed herein, the cloud gateway 1540 includes a data migration component 1642 capable of transferring some or all of the data stored in the cache 1644. In some examples, the data migration component 1642 requests and/or receives information from a callback layer 1750, or other intermediate component, within the cloud gateway. Briefly, the callback layer 1750 intercepts calls for data between the file system 1730 and the cache 1644 and tracks these calls to provide information to the data migration component 1642 regarding when data is changed, updated, and/or accessed by the file system 1730. Further details regarding the callback layer 1750 and other intermediate components will now discussed.

In some examples, the cloud gateway 1540 monitors the transfer of data from the file system 1730 to the cache 1644 via the callback layer 1750. The callback layer 1750 not only facilitates the migration of data portions from data storage on the cloud gateway to secondary storage, but also facilitates read back or callback of that data from the secondary storage back to the cloud gateway. While described at times herein as a device driver or agent, the callback layer 1750 may be a layer, or additional file system, that resides on top of the file system 1730. The callback layer 1750 may intercept data requests from the file system 1730, in order to identify, track, and/or monitor data requested by the file system 1730, and may store information associated with these requests in a data structure. Thus, the callback layer stores information identifying when a data portion is accessed by tracking calls from the file system 1730 to the cache 1730.

For example, adding the cloud gateway 1540 described herein to an existing networked computing system can provide the computing system with expanded storage capabilities, but can also provide the computing system with other data storage functionality. In some examples, the cloud gateway 1540 not only provides the storage benefits of a NAS filer 1505, but also includes a data storage engine (e.g., a common technology engine, or CTE, provided by Commvault Systems, Inc. of Oceanport, N.J.), or other functionality. For example, the cloud gateway may perform various data storage functions normally provided by a backup server, such as single instancing, data classification, mirroring, content indexing, data backup, encryption, compression, and so on. Thus, in some examples, the cloud gateway described herein acts as a fully functional and independent device that an administrator can attach to a network to perform virtually any data storage function.

Cloud Gateway for Cloud Storage Sites and Deduplication and Policy-Driven Data Migration As described herein, in some examples, the cloud gateway 1540 leverages block-level, sub-object-level, or object-level data migration in order to provide expanded storage capabilities to a networked computing system. After selecting data for migration, but prior to data migration, the cloud gateway may perform block-level, sub-object-level, and/or object-level deduplication using the methods and/or data structures described previously with respect to FIGS. 1-9. To do so, the cloud gateway 1540 may utilize components or modules within the data storage system 1610 (e.g., a deduplication module 299 and/or a deduplication database 297) and/or utilize components within the cloud gateway itself (e.g., data migration components 1652). In this manner, the cloud gateway may avoid creating unnecessary additional instances of the selected data within secondary storage (e.g., additional instances within cloud storage sites). Additionally, the cloud gateway, may access and apply storage policies as described previously with respect to the system of FIG. 1 to determine to which cloud storage site 115A-N or other cloud storage sites the cloud gateway should migrate the data.

For example, in accordance with a storage policy, the cloud gateway 1540 may utilize more expensive cloud storage sites to store critical documents, and less expensive cloud storage site to store personal emails. As another example, the cloud gateway may implement a storage policy that specifies that a first type of files should be retained for one year in a first target cloud storage site 115A, that a second type of files should be retained for seven years in a second cloud storage site 115B, and that a third type of files should be retained indefinitely in a third cloud storage site 115N. As yet another example, the cloud gateway may implement a storage policy that specifies that a first type of files (e.g., secondary disk copies needed for rapid disaster recovery) be stored only in storage sites 115, including cloud storage sites 115A-N, that can provide sufficient bandwidth, network capacity or other performance to ensure that the time needed to recover a file from the storage device 115 (e.g., cloud storage site 115A-N) is less a specified recovery time objective. As another example, certain data may be migrated or copied only to cloud storage sites 115A-N having sufficient fault tolerance; for example, certain data may be migrated or copied to cloud storage sites that replicate data to various geographic locations to prevent data loss in the event of a natural disaster or similar catastrophic event. For brevity, the full details of such deduplication and policy-driven storage methods are not repeated here.

The system can perform file system data migration at a file or block level. Block-level migration, or block-based data migration, involves migrating disk blocks from the data store or cache 1644 to secondary media, such as secondary cloud storage sites 1650. This migration process works particularly well with large files spanning many blocks, and is described in detail below. While not shown, file level migration employs similar processes, but is much simpler. Using block-level migration, the cloud gateway 1540 transfers blocks from the cache 1644 that have not been recently accessed from secondary storage, freeing up space on the cache. By tracking migrated blocks, the system can also restore data at the block level, which may avoid cost and time issues commonly associated with restoring data at the file level.

Alternatively or additionally, a cloud gateway 1540 and associated techniques described herein may make secondary disk copies to disaster recovery (DR) locations using auxiliary copy or replication technologies. Additionally or alternatively, a cloud gateway and associated techniques described herein may be used on copies of data created by replication operations such as CDR (Continuous Data Replication) and DDR (Discrete Data Replication).

Figure 18:
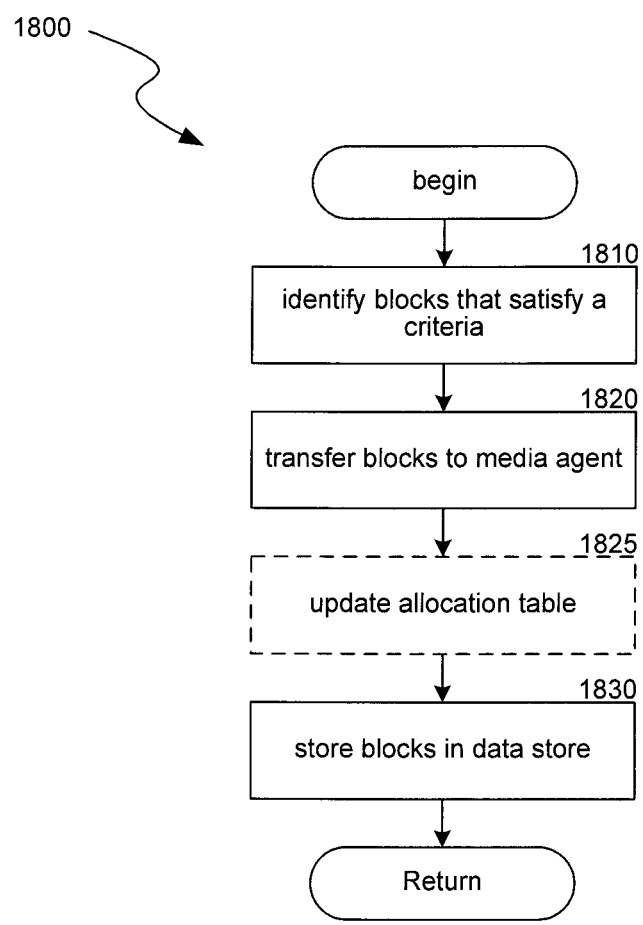
FIG. 18 depicts a flow diagram illustrating a routine for performing block-level data migration in a cloud gateway.

Referring to FIG. 18, a flow diagram illustrating a routine 1800 for performing block-level data migration in a cloud gateway 1540 is shown. In step 1810, the cloud gateway, via the data migration component 1642, identifies data blocks within a cache that satisfy a certain criteria. The data migration component 1642 may compare some or all of the blocks (or, information associated with the blocks) in the cache 1644 with predetermined criteria. The predetermined criteria may be time-based criteria within a storage policy or data retention policy.

In some examples, the data migration component 1642 identifies blocks set to be "aged off" from the cache. That is, the data migration component 1642 identifies blocks created, changed, or last modified before a certain date and time. For example, the system may review a cache for all data blocks that satisfy a criterion or criteria. The data store may be an electronic mailbox or personal folders (.pst) file for a Microsoft Exchange user, and the criterion may define, for example, all blocks or emails last modified or changed 30 days ago or earlier. The data migration component 1642 compares information associated with the blocks, such as metadata associated with the blocks, to the criteria, and identifies all blocks that satisfy the criteria. For example, the data migration component 1642 identifies all blocks in the .pst file not modified within the past 30 days. The identified blocks may include all the blocks for some emails and/or a portion of the blocks for other emails. That is, for a given email (or data object), a first portion of the blocks that include the email may satisfy the criteria, while a second portion of the blocks that include the same email may not satisfy the criteria. In other words, a file or data object can be divided into parts or portions where only some of the parts or portions change.

To determine which blocks have changed, and when, the cloud gateway 1540 can monitor the activity of the file system 1730 via the callback layer 1750. The cloud gateway may store a data structure, such as a bitmap, table, log, and so on within the cache 1644 or other memory in the NAS filer 1505 or elsewhere, and update the data structure whenever the file system calls the cache 1644 to access, update, or change the data blocks within the cache 1644. The callback layer 1750 traps commands to the cache 1644, where that command identifies certain blocks on a disk for access or modifications, and writes to the data structure the changed blocks and the time of the change. The data structure may include information such as the identification of the changed blocks and the date and time that the blocks were changed. The data structure, which may be a table, bitmap, or group of pointers, such as a snapshot, may also include other information, such as information that maps file names to blocks, information that maps sub-objects to blocks and/or file names, and so on, and identify when accesses/changes were made.

In step 1820, the cloud gateway 1540 transfers data within the identified blocks from the cache 1644 to a media agent 1770 to be stored in a different data store. The system may perform some or all of the processes described with respect to the system of FIG. 1 when transferring the data to the media agent. For example, before transferring data, the system may review a storage policy as described herein to select a media agent, such as secondary storage computing device 165, based on instructions within the storage policy. In step 1825, the system optionally updates an allocation table, such as a file allocation table ("FAT") for the file system 1730 associated with the cloud gateway to indicate the data blocks that no longer contain data and are now free to receive and store data from the file system.

In step 1830, via the media agent 1770, the cloud gateway 1540 stores data from the blocks to a different data store. In some cases, the cloud gateway, via the media agent 1770, stores the data from the blocks to a secondary cloud storage site, such as a cloud storage site 115A-N. For example, the cloud gateway may store the data from the blocks in secondary copies of the data store, such as a backup copy, an archive copy, and so on. Although not shown, prior to storing the data from the blocks to a different data store, the cloud gateway, via the media agent 1770, may perform block-level deduplication and/or content indexing, using the methods and data structures described previously with respect to the system of FIG. 1.

Although not shown, prior to storing data from the blocks to a different data store, the cloud gateway 1540 may encrypt and/or compress data as described previously with respect to FIG. 3B. The cloud gateway may create, generate, update, and/or include an allocation table, (such as a table for the data store) that tracks the transferred data and the data that was not transferred. The table may include information identifying the original data blocks for the data, the name of the data object (e.g., file name), the location of any transferred data blocks (including, e.g., offset information), and so on. The location of the transferred data blocks may comprise a URL to a file located on cloud storage site 115A-N. For example, Table 3 provides entry information for an example .pst file:

TABLE 3

| Name of Data Object | Location of data |
|---|---|
| Email1 | C:/users/blocks1-100 |
| Email2.1 (body of email) | C:/users/blocks101-120 |
| Email2.2 (attachment) | http://www.cloudstoragesite.com/companyname/remov1/blocks1-250 |
| Email3 | http://www.cloudstoragesite.com/companyname/remov2/blocks300-500 |

In the above example, the data for "Email2" is stored in two locations, the cache (C:/) and an offsite data store located on a cloud storage site 115A-N (http://www.cloudstoragesite.com/companyname/). The system maintains the body of the email, recently modified or accessed, at a location within a data store associated with a file system, "C:/users/blocks101-120." The system stores the attachment, not recently modified or accessed, in a separate data store, "http://www.cloudstoragesite.com/companyname/remov1/blocksb 1-250." Of course, the table may include other information, fields, or entries not shown. For example, when the system stores data to tape, the table may include tape identification information, tape offset information, and so on.

Sub-object-based file migration, or sub-object-based data migration, involves splitting a data object into two or more portions of the data object, creating an index that tracks the portions, and storing the data object to secondary storage via the two or more portions. The nature of sub-objects was described previously with respect to the description of deduplication module 299. As described above, in some examples the cloud gateway 1540 migrates sub-objects of data (sets of blocks) that comprise a data object from the cache 1644 to another storage location, such as to a cloud storage site. In some cases, the data migration component 1642 may include a division component that divides data objects into sub-objects. The division component may perform in a substantially similar fashion to the object division component described previously with respect to the deduplication module 299. The division component may receive files to be stored in the cache 1644, divide the files into two or more sub-objects, and store the files as two or more sub-objects in the cache. The division component may update more or more indexes that maintains information to associate particular files with their corresponding sub-objects for that file, the data blocks of the sub-objects, and soon.

The division component may perform different processes when determining how to divide a data object. For example, the division component may include indexing, header, and other identifying information or metadata in a first sub-object, and include the payload in other sub-objects. The division component may identify and/or retrieve file format or schema information from an index, FAT, NFS, or other allocation table in the file system to determine where certain sub-objects of a data object reside (such as the first or last sub-object of a large file). The division component may follow a rules-based process when dividing a data object, where the rules may define a minimum or maximum data size for a sub-object, a time of creation for data within a sub-object, a type of data within a sub-object, and so on.

For example, the division component may divide a user mailbox (such as a .pst file) into a number of sub-objects, based on various rules that assign emails within the mailbox to sub-objects based on the metadata associated with the emails. The division component may place an index of the mailbox in a first sub-object and the emails in other sub-objects. The division component may then divide the other sub-objects based on dates of creation, deletion or reception of the emails, size of the emails, sender of the emails, type of emails, and so on. Thus, as an example, the division component may divide a mailbox as follows:

| | |
|---|---|
| User1/Sub-object1 | Index |
| User1/Sub-object2 | Sent emails |
| User1/Sub-object3 | Received emails |
| User1/Sub-object4 | Deleted emails |
| User1/Sub-object5 | All Attachments |

Of course, other divisions are possible. Sub-objects may not necessarily fall within logical divisions. For example, the division component may divide a data object based on information or instructions not associated with the data object, such as information about data storage resources, information about a target secondary cloud storage site, historical information about previous divisions, and so on.

Figure 19:
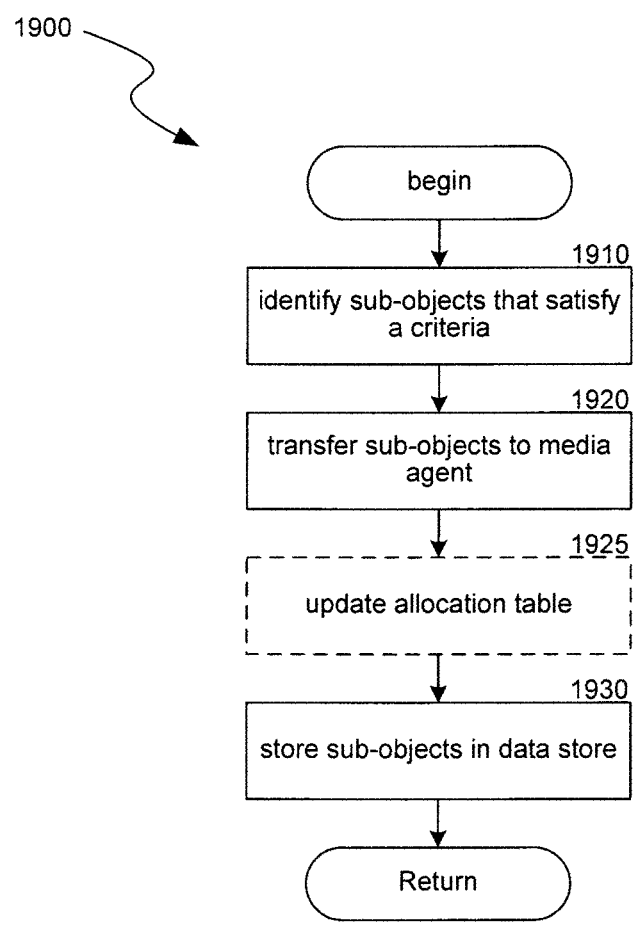
FIG. 19 is a flow diagram illustrating a routine for performing sub-object-level data migration in a cloud gateway.

Referring to FIG. 19, a flow diagram illustrating a routine 1900 for performing sub-object-level data migration in a cloud gateway 1540 is shown. In step 1910, the system identifies sub-objects of data blocks within a data store that satisfy one or more criteria. The data store may store large files (>50 MB), such as databases associated with a file system, SQL databases, Microsoft Exchange mailboxes, virtual machine files, and so on. The system may compare some or all of the sub-objects (or, information associated with the sub-objects) of the data store with predetermined and/or dynamic criteria. The predetermined criteria may be time-based criteria within a storage policy or data retention policy. The system may review an index with the division component 815 when comparing the sub-objects with applicable criteria.

In step 1920, the cloud gateway 1540 transfers data within the identified sub-objects from the data store to a media agent 1770, to be stored in a different data store. The cloud gateway may perform some or all of the processes described with respect to FIG. 1 when transferring the data to the media agent. For example, the cloud gateway may review a storage policy assigned to the data store and select a media agent based on instructions within the storage policy. In step 1925, the system optionally updates an allocation table, such as a FAT for a file system associated with the cloud gateway, to indicate the data blocks that no longer contain data and are now free to receive and store data from the file system.

In step 1930, via one or more media agents 1770, the cloud gateway 1540 transfers or stores the data from the sub-objects to a different data store. In some cases, the system, via the media agent, stores the data to the cloud storage sites 115A-N, and/or to secondary storage 1650, such as magnetic tape 1652 or optical disk 1654. For example, the system may store the data as secondary copies, such as backup copies, archive copies, and so on. Although not shown, prior to storing the data from the sub-objects to a different data store, the cloud gateway, via the media agent 1770, may perform sub-object-level or block-level deduplication and/or content indexing, using the methods and data structures described herein.

Data Recovery in Cloud Storage Sites via Cloud Gateway Device

Figure 20:
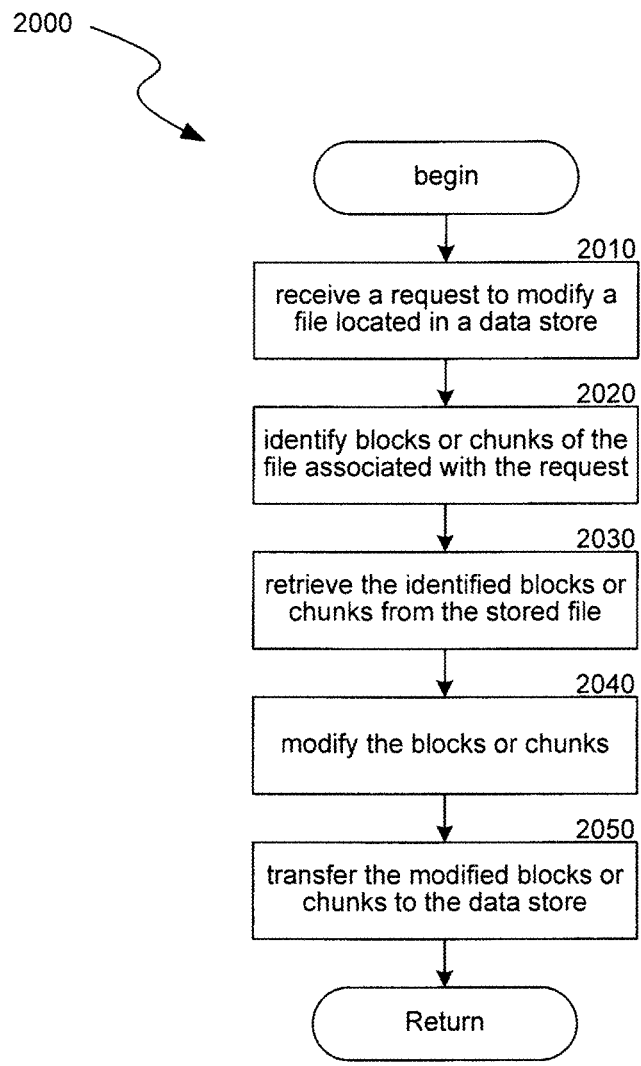
FIG. 20 shows a flow diagram illustrating a routine for block-based or sub-object-based data restoration and modification in a cloud gateway.

A data storage system, using a cloud gateway 1540 leveraging the block-based or sub-object-based data migration processes described herein, is able to restore not only files, but also portions of files, such as individual blocks or sub-objects that comprise portions of the files. Referring to FIG. 20, a flow diagram illustrating a routine 2000 for block-based or sub-object-based data restoration and modification is shown. While not shown, file level data restoration employs similar processes, but is much simpler. In step 2010, the system, via a restore or data recovery component, receives a request to modify a file located in a cache of a NAS filer 1505 or in secondary storage in communication with a cloud gateway. For example, a user submits a request to a file system to provide an old copy of a large PowerPoint presentation so the user can modify a picture located on slide 5 of 200 of the presentation.

In step 2020, the system identifies one or more blocks or one or more sub-objects associated with the request. For example, the callback layer 1750 of the system looks to an index or table similar to Table 3, identifies blocks associated with page 5 of the presentation and blocks associated with a table of contents of the presentation, and contacts the cloud gateway 1540 that stored or migrated the blocks on secondary storage.

In step 2030, the system, via the cloud gateway 1540, retrieves the identified blocks or sub-objects from the secondary storage and presents them to the user. For example, the system only retrieves page 5 and the table of contents of the presentation and presents the pages to the user. If some or all of the identified blocks or sub-objects were previously deduplicated prior to being transferred the secondary storage, in order to retrieve the identified blocks or sub-objects, the cloud gateway may utilize the media agent 1770, to "rehydrate" the deduplicated data using the methods described previously with respect to FIG. 12.

In step 2040, the system receives input from a user to modify the retrieved blocks or sub-objects. For example, the user updates the PowerPoint presentation to include a different picture. In step 2050, the system transfers data associated with the modified blocks or sub-objects back to the cloud gateway 1540, where it remains in a cache or is transferred to secondary storage, and updates the table/index. Thus, the system, leveraging block-based or sub-object-based data migration in a cloud gateway, restores only portions of data objects required by a file system.

For example, a user submits a request to the system to retrieve an old email stored in a secondary copy on removable media via a cloud gateway 1540. The system identifies a portion of a .pst file associated with the user that contains a list of old emails in the cache of the cloud gateway, and retrieves the list. That is, the system has knowledge of the sub-object that includes the list (e.g., a division component may always include the list in a first sub-object of a data object), accesses the sub-object, and retrieves the list. The other portions (e.g., all the emails with the .pst file), were transferred from the cloud gateway 1540 secondary storage. The user selects the desired email from the list. The cloud gateway, via an index in the cache that associates sub-objects with data or files (such as an index similar to Table 3), identifies the sub-object that contains the email, and retrieves the sub-object from the associated secondary storage for presentation to the user. Thus, the cloud gateway is able to restore the email without restoring the entire mailbox (.pst file) associated with the user.

As noted above, the callback layer 1750 maintains a data structure that not only tracks where a block or sub-object resides on secondary storage, but also which file was affected based on the migration of that block or sub-object. Portions of large files may be written to secondary storage to free up space in the cache or data store 1644 of the NAS filer 1505. Thus, to the network, the total data storage of the cloud gateway is much greater than that actually available within the cache or data store 1644. For example, while the cache or data store 1644 may have only a 100-gigabyte capacity, its capacity may actually appear as over 20 terabytes, with storage over 100 gigabytes being migrated to cloud-based storage.

Figure 21:
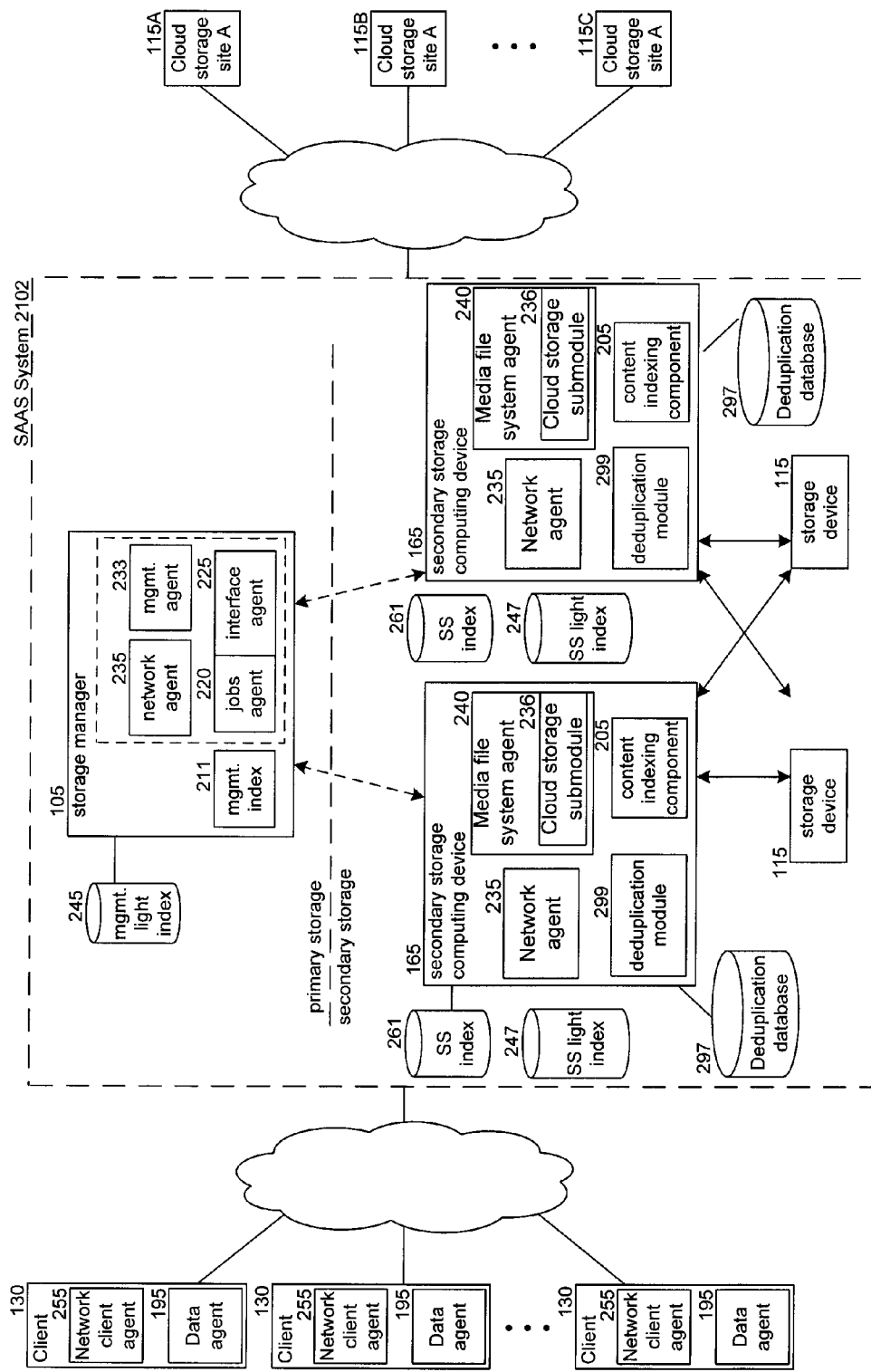
FIG. 21 illustrates another example of an arrangement of resources in a computing network that may employ aspects of the invention to provide data storage software as a service.

System Configurations to Provide Data Storage and Management Software as a Service Alternatively or additionally, the functionality and components of the system described previously may move into the cloud. This solution may be used for software as a service ("SaaS"), for application service providers (ASPs), or for a managed services provider to host and provide data storage and management as an offering, although it can also easily be utilized by a large enterprise to build on top of a private network or cloud. A software as a service (SaaS) model permits a client 130 to utilize a unified and rich set of value-added data management services (e.g. compression, deduplication, content-indexing/search, encryption, etc.) that may be fully independent of which cloud storage providers actually hosting the client's data. It also provides a mechanism for a client 130 to readily transfer data between various cloud storage sites 115 without being tied to a single cloud storage vendor. A software as a service model also permits clients 130 to utilize data management services and cloud storage on a capacity or utilization basis (e.g., per-gigabyte pricing), without fixed capital expenditures (e.g., expenditures for a set of vendor-specific cloud boxes or a software or hardware license). Under a SaaS arrangement, administrative functions move off-site, since there is no local secondary storage or other hardware at a client's site and the software (and any software updates) may be pushed to the client 130 as needed and configured on demand. Furthermore, remote monitoring techniques may be employed to further reduce administrative overhead of operating SaaS systems. FIG. 21 illustrates an example of an arrangement 2102 of resources in a computing network that may provide data storage software as a service. As shown, in this arrangement 2102, the storage manager 105 and secondary storage computing devices 165 are in the cloud (e.g., separated from the clients 130 by a network, such as a public WAN, like the Internet). The on-premises components need only include one or more data agents 195 and network client agents 255, which may reside on clients 130. The arrangement 2102 may permit multiple "tenants" to use a single SAAS system 2102 since the various clients 130 may be associated with different entities (e.g., different companies). Data agents 195 utilize network client agents 255 (including HTTP client subagents) to communicate effectively with the storage manager 105 and secondary storage computing devices 165 via their HTTP subagents located within network agents 235.

As described previously, the transport mechanism provided between the HTTP client subagent and HTTP subagents may be cloud-aware and cloud-capable. The HTTP client subagent and HTTP subagents may further be configured to work via firewalls and/or to configure firewalls appropriately. Details regarding managing firewall connections may be found in the assignee's U.S. patent application Ser. No. 12/643,653, filed Dec. 21, 2009, entitled Managing Connections in a Data Storage System. Alternatively or additionally, data agents 195 may utilize proprietary protocol client subagents configured to facilitate a virtual private network connection running over an HTTPS protocol, or another type of open/secure pipe wrapped in an HTTPS protocol to communicate effectively with storage manager 105 and secondary storage computing devices 165 via their proprietary protocol subagents.

In this arrangement, as described previously, media file system agent 240 may comprise one or more cloud storage submodules 236 that permit the media file system agent 240 to open, read, write, close, and delete data files stored on cloud storage sites and/or otherwise direct cloud storage sites to perform data storage operations.

In this sample arrangement, an on-premises user controlling only the client 130 may benefit from all or some of the system functionalities described previously (e.g., deduplication, content indexing, searching, archiving of data) and yet remain insulated from the details of maintaining and monitoring the data storage architecture on a day to day basis. Those details may move entirely into the domain of the SaaS provider or other network-based or cloud-based service provider, and explained herein.

Object Store

Figure 22:
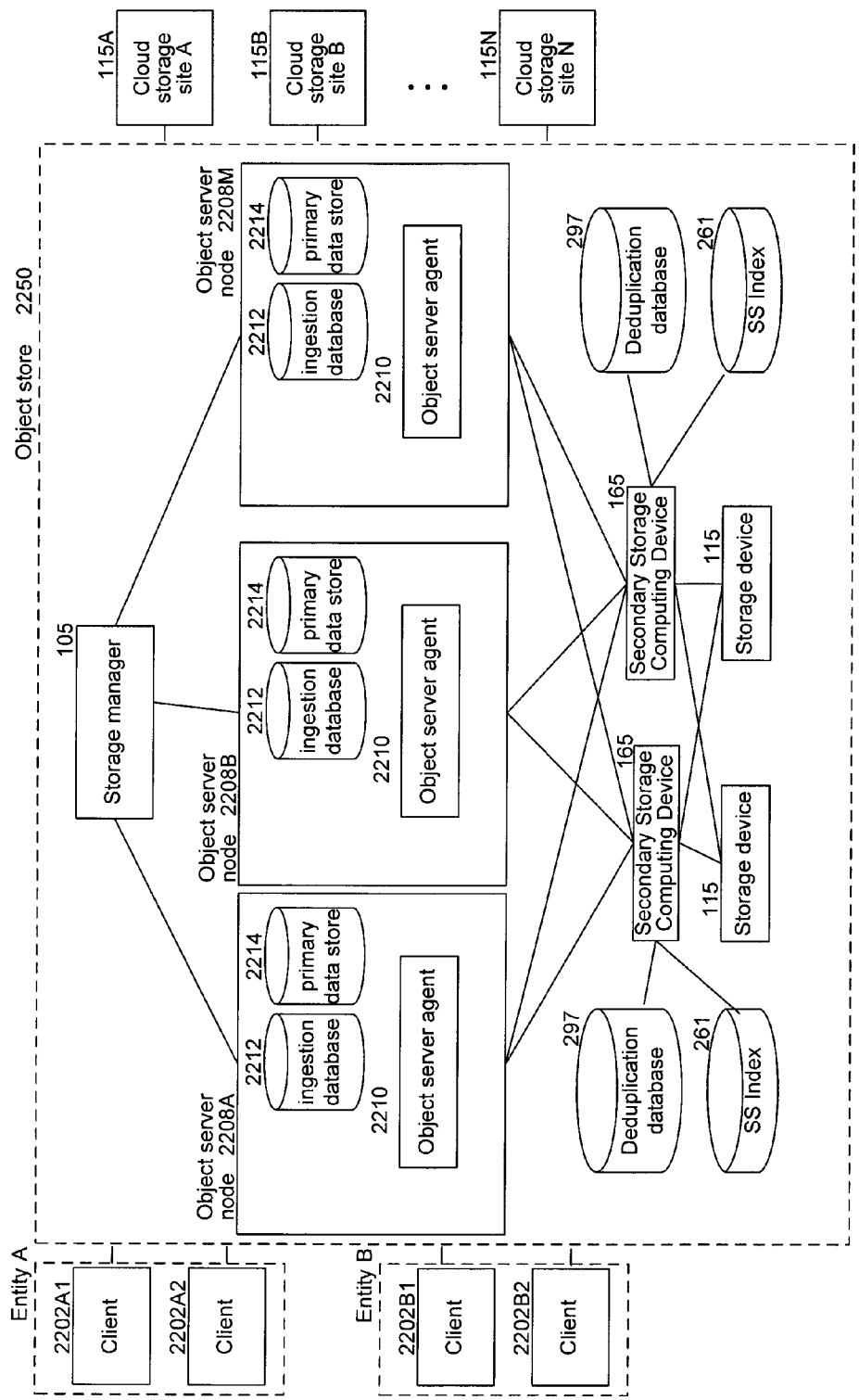
FIG. 22 is a block diagram illustrating components of an object store.

Alternatively or additionally, most or all elements of the system described previously may move into the cloud and be re-configured to allow a cloud storage provider to utilize the system as a data store, such as an object store 2250 shown in FIG. 22. A large enterprise could also use this system to provide cloud storage and data management to clients within the enterprise and/or outside the enterprise. By exposing REST or other web-based interfaces via a web service layer, users can read, write and manipulate data in an object store 2250.

In many respects, the object store 2250 provides similar functionality to the systems described previously and may provide additional features. An object store 2250 system may provide value-added services such as retention, deduplication, compression, encryption, content indexing and search, and collaborative searching. An object store 2250 may also provide tiered storage and information life cycle management services. The object store 2250, like the systems described previously, may also utilize other cloud storage sites as target cloud storage sites 115 that may be used as additional tiers of storage that provide extensible storage capacity.

An operator of the object store 2250 may charge the user of a client 2202 and/or associated entities (e.g., the employer of a user, or another operator or owner of the client 2202) on a subscription basis, volume basis, a mixed subscription/volume basis, or another pricing structure. For example, an operator may charge a monthly subscription fee to a company for unlimited uploads and downloads to an object store performed by its associated users or clients, so long as the total amount of data stored within the data store at any time during a month does not exceed a certain limit.

As another example, an operator may employ a volume pricing scheme and charge an entity when a user or client that is affiliated with the entity performs various actions using the data store 2250. The operator may charge an entity a first rate for each unit of data uploaded to the site, and/or a second rate for each unit of data stored in the site for a unit of time (the rate may vary by the type of data cloud storage site used to store the data) and/or a third rate for conducting a content-based search of data stored therein that retrieves information about various objects (e.g., file name, user name, content tags), a fourth rate for conducting a collaborative search operation upon data stored therein, and/or a fifth rate for each unit of data retrieved and/or restored and served back to a client. As a third example, an operator may charge a flat monthly subscription fee to keep a user's account active and additionally charge one or more volume-based rates when the user performs various actions using data store 2250.

FIG. 22 is a block diagram illustrating components of the object store 2250. As shown in FIG. 22, the object store 2250 may comprise a storage manager 105, one or more object server nodes 2208, one or more secondary storage computing devices 165, one or more deduplication databases 297, and one or more SS indices 261. An object store 2250 may be communicatively coupled to clients 2202 over a network such as a LAN, MAN, WAN or other network. Clients 2202 may differ from the clients 130 shown in FIG. 1 in that they may not run a dedicated data agent 195 and/or network client agent 255 configured to communicate with the object store 2250, but instead communicate using existing client-based software components, such as LAN protocols (e.g. Ethernet, SCSI, etc.), WAN protocols (e.g., FTP/HTTP), etc. An object store is communicatively coupled via its secondary storage computing devices 165 to cloud storage sites 115, including various cloud storage sites 115A-N, either via LAN, WAN, etc.

As shown in FIG. 22, each object server node 2208 may comprise an object server agent 2210, an ingestion database 2212, and a primary data store 2214. An object server agent 2210 may be built on Linux for performance and to make it economical to scale the number of object server nodes 2208 as needed. An object server agent 2210 provides a REST interface or other web-based interface to clients 2202 to write, read, retrieve, and manipulate data ingested by the object server node 2208, and stored therein or in associated secondary cloud storage sites 115.

Each object server agent 2210 exposes one or more sub-clients of an object server node 2208. Sub-clients are containers on which default storage policy parameters may be set to dictate the handling or management of data within that container. Individual object-level parameters that a user specifies and provides along with a file/object could optionally override these defaults parameters. Within each sub-client, a number of storage sites can be created, each of which corresponds to a logical point of data ingestion via the REST interface, and may correspond to a particular cloud storage site (e.g., a URL or web directory dedicated to a cloud storage site serving a particular customer or company). Object store 2250 may maintain a system-level (and/or tiered node-level) file system of all data stored within the object store 2250 and/or associated storage devices (cloud storage sites 115). However, object store 2250 may expose to each particular client (or a particular customer or company) only the subset of the larger file system that corresponds to the client's objects (or a customer's or company's objects). As described herein, object store 2250 may implement these effectively separate file systems in part by utilizing Access Control Lists and/or Access Control Entries.

As an example, a cloud vendor who operates an object store 2250 might assign an entire sub-client to a Web 2.0 customer, who in turn might partition it up into several sites and allocate one to each of its customers. More object server nodes 2208 can be added to the system to scale up the capacity of the object store 2250 and its ability to respond to storage operation requests, while still preserving the ability to address any given site's namespace in the same way. The particular object server node 2208 utilized for the storage of a certain file may be chosen on the basis of the file type and/or other characteristics of the file (e.g. the type of application that created the file). Thus, certain object server nodes may be specific to types of applications (e.g. text-based applications such as word processing applications on one node, image-based applications such as digital image applications on a second node, audio-based applications on a third node, video-based application on fourth node, etc.) As another example, various object server agents 2210 and/or various sub-clients within an object server agent 2210 may each be configured to each handle a different type of object; for example, a first object server agent 2210 may be configured to handle documents, a second object server agent 2210 configured to handle email objects, and a third configured to handle media objects, such as image files and video.

Object server agents 2210 run a web server (such as an Apache or Microsoft IIS web server) and expose a REST interface or other web-based interface to clients 2202. The object server agents 2210 provide data ingestion or upload points to the object store 2250 for each storage site within each sub-client. Data ingested from a client 2202 by an object server agent 2208 may be temporarily stored, cached, or spooled on a primary data store 2214.

An ingestion database 2212 records information about each data object ingested by its associated object server node 2208, such as an associated URI or other token that identifies the particular data object, the sub-client and/or site associated with the object, the client 2202 and/or user associated with the object, the time the object was created within the data store, the location(s) of instance(s) of the data object within a primary data store 2214 and/or cloud storage sites 115, location(s) of deduplication and/or content indexing information pertaining to the object (e.g., deduplication database(s) 297 or SS indices 261 having related information), metadata (including security metadata), default and/or object-level storage policy parameters (such as parameters affecting retention, security, compression, encryption, and content indexing), and an identifier (e.g., a hash). In some examples, the ingestion database may also store content information within the ingestion database 2212 to provide content indexing capability at the object server node. In some examples, the ingestion database 2212 schema comprises tables for sites (e.g. registered sites), security (e.g., document or folder-level security information), objects (or documents), document or object versions, document or object version audit information, deleted document or object versions, storage locations, a document or object cache, and/or archFileReferences. In one example, the ingestion database 2212 is implemented using PostgreSQL, but other examples utilize Oracle, OpenLink Virtuoso, or a similar database management system.

As described previously, data ingested by the object server agent 2210 may be temporarily stored, cached, or spooled on the primary data store 2214. In one implementation, an ingestion process at the object server node 2008 may run on a prescribed schedule (according to a schedule policy described previously) to process data stored in primary data store 2214. Using policy parameters, metadata, and/or other information stored in ingestion database 2212, the object server node 2208 may form logical groups of data objects and request that a secondary cloud storage computing device 165 copy or migrate each logical group of data objects into an archive file or other type of secondary storage format via a secondary storage computing device 165; each data object in the group is stored in association with related metadata (including Access Control List data and/or other security-related data). Logical groups typically comprise objects having similar retention policies (e.g., similar secondary storage media requirements, similar retention times) and/or similar object types (e.g., all objects in the group are emails; all objects were created using the same application). Logical groups may be formed by applying additional and/or different criteria, such as groups reflecting specific ingestion site(s), user(s) associated with the object, or a company or entity associated with the object. Logical groupings may also be based on policy parameters provided by a client or customer of the object store. Thus, a customer of the object store may provide policy parameters that dictate the logical groupings used. For example a customer might specify that they want a new logical grouping for each back-up cycle performed on their data. As another example, a customer of an object store may specify that they do not want their data commingled with the data of other customers (e.g. the system may consolidate all of that customers data for a particular job or back-up cycle/window to be stored in new containers for that job/cycle/window). In some implementations, an object server node 2208 (or secondary storage computing device 165) may divide objects into sub-objects (as described previously), form logical groups of data sub-objects, and copy or migrate logical groups of data sub-objects.

As a first example, an object server node 2208 may query an ingestion database 2212 to identify all recently ingested email objects currently stored in primary data store 2214. Object server node 2209 may then request a secondary storage computing device 165 to process this group of email objects into an archive file stored on a particular cloud storage site 115. As another example, an object server node 2208 may query ingestion database 2212 to identify all recently ingested objects that are to be stored for 7 years on high-quality tape storage. Object server node 2208 may then request a secondary storage computing device 165 to process this group of objects into an archive file stored on a cloud storage site 115 that provides suitable tape storage.

Unless explicitly proscribed by applicable storage policy parameters, an object server node 2208 may form a logical group that includes data objects from various clients 2202, each of whom may utilize a different cloud storage site and/or may be affiliated with different entities. In one illustrative example, clients 2202A1, 2202A2 are affiliated with a Company A and both utilize a first storage site on a first sub-client of a first object server node 2208. Clients 2202B1 and 2202B2 are affiliated with a Company B and both utilize a second storage site also hosted on the first sub-client of the first object server node 2208. Assuming the default storage policy parameters of the first sub-client specify that email messages are to be retained on tape for 1 year, then all email objects ingested from all four of these clients may be commingled in a logical group and then stored in a commingled fashion within a single archival tape file scheduled for a one year retention period. The only email objects from these clients that would not be so stored are individual email objects that are associated with different user-specified storage policy parameters (e.g., if a user specified that emails related to or from the finance department should be stored in cloud storage (not tape) and/or stored for a 7 year retention period (not a 1 year period)).

In some implementations, when a secondary storage computing device 165 receives a request to process a logical group of data objects and the metadata associated with these objects, it may handle the request in accordance with the process of FIG. 3B. That is, the secondary storage computing device 165 may content index each object in the group, perform object-level, sub-object level and/or block-level deduplication on the group, and/or encrypt the data and metadata. As a result of the processing, the secondary storage computing device 165 will also store each of the various objects in logical association with its related metadata (including ACL or other security metadata). During this process, described previously, the secondary storage computing device 165 may build indexing information within a content index or another index (e.g., SS index 261) and/or deduplication information (e.g., within deduplication database 297). By storing objects with similar retention policies in logically grouped archival files, the system may efficiently prune or eliminate data from the object store 2250 and/or more efficiently perform ILM within the Object store 2250, since the various objects within each archival file may have similar dates for deletion or migration.

During the deduplication processing of a logical group, the secondary storage computing device 165 may perform lookups on one, some, or all of the deduplication databases 297 within the object store 2250. In one example, during deduplication, a secondary storage computing device 165 only performs lookups on one deduplication database 297, which may decrease the time required for deduplication (and/or pruning and/or data restoration) but increase the volume of data stored within the data store. In another example, during deduplication, a secondary storage computing device 165 performs lookups on all deduplication databases 297 within an object store 2250, which may increase the time required for deduplication (and/or pruning and/or object restoration) but decrease the volume of data stored within the data store.

Note that deduplication of data objects in a logical group may occur across clients 2202 and/or across various companies. Returning the prior example, if client 2202A1 and client 2202B2 (from two different companies) both receive a particular email message and associated large attachment, secondary cloud storage site 165 may store only one instance of the email data object and attachment (although it stores and associates the instance with two different sets of metadata, one set for client 2202A1 and one set for client 2202B2). Thus, by storing data received from multiple clients, even associated with different and independent companies, the system can realized greater deduplication over what either client would realize individually. Once cross-client or cross-company deduplication occurs, if a particular client or company requests the deletion of a shared object (or shared sub-object or block), the system will not necessarily delete the physical copy of the shared object (or sub-object or block). Instead, the system may simply update one or more indices or databases such as a deduplication database (e.g., by removing a link, URL or other pointer to a physical copy), delete the file name from a file allocation table (FAT) or similar file system data structure, etc. In this way the client or customer who "deleted" the object no longer has access to the object and no longer sees the object as part of the file system that is exposed to them by the object store.

Additionally in this example, under the deduplication processes described previously, even if the two identical email objects were ingested by an object server node 2208 at different times (e.g., a month apart), when a second copy eventually reaches a secondary storage computing device 165, it still might not result in a second instance being created. This result occurs because during the deduplication process, a deduplication module 299 on a secondary storage computing device 165 might detect an instance of the object in a deduplication database 297. However, the system may alternatively determine that the first version, while identical, is too old and could have been stored on storage medium that may be degrading, and thus the system may store the second version it receives years later.

As described previously, when a media file system agent 240 performs the process shown in FIG. 3B it will typically result in the storage of one or more aggregated or containerized archive files. The individual data objects of a logical group are not stored as individual files on a file system of a cloud storage site 115. As described previously, by containerizing data, the object store 2250 may thus reduce the limitations posed by file system scalability by reducing the strain on the namespace of the object store 2250. The generation of these archive files also generates catalogs (e.g., deduplication databases 297, SS indices 261, and/or other information) that makes it easier to access, search for, retrieve, or restore a single object even from the aggregated archive form. Further details on archive files may be found in the assignee's U.S. Patent Publication No. 2008-0229037, filed Dec. 4, 2007, entitled SYSTEMS AND METHODS FOR CREATING COPIES OF DATA, SUCH AS ARCHIVE COPIES.

When a client 2202 or application running on a client 2202 checks in or stores an object into an object store 2250, an object server node 2208 may serve it a unique Universal Resource Identifier ("URI") or token that points to or identifies the object, which the client 2202 or application may store locally on the client side. This token or URI may be globally unique to all objects within the object store 2250. Alternatively, it may be unique with respect to all objects stored by a single client 2202, ingested by a particular object server node 2208, sub-client and/or site, and/or unique with respect to another factor. In this way, the URI in conjunction with other information (e.g., a user's login information) may still uniquely identify a particular data object.

To provide verification to a user of the integrity of files stored in an object store 2250, an object store can optionally generate a unique identifier such as a hash (or probabilistically unique identifier) using a particular identifier-generation algorithm for each data object ingested and return that identifier to a calling application on a client 2202 at the time of ingestion. When an application on the client 2202 later retrieves the same data object, a client-side application can use the same identifier-generated algorithm to compute a hash for the retrieved object. If this newly computed identifier matched the identifier returned during ingestion, it would assure the client that the data object had not been modified since it was originally ingested. In addition, an object store 2250 may run similar periodic data verification processes within the object store 2250 asynchronously to ensure the integrity of the data stored therein. Further details may be found in the assignee's U.S. Patent Publication No. 2009-0319534, filed Jun. 24, 2008, entitled APPLICATION-AWARE AND REMOTE SINGLE INSTANCE DATA MANAGEMENT.

Optionally, data objects may be ingested inline into multiple archive files on separate object server nodes 2208 (for redundancy or other reasons). Also, in one example, geographically separate replication may be configured per cloud storage site, which allows the system to serve up objects from a remote location (which may include continuous data replication technology), for fault tolerance (because separate power grids, long-haul communication links, etc. would be used), etc.

An object store 2250 may also optionally make a copy of data on removable media such as tape to enable secure offline storage. Alternatively or additionally, an object store may make secondary disk copies to disaster recovery (DR) locations using auxiliary copy or replication technologies as noted herein.

Each site within an object store 2250 may be protected via security policies that limit which users or clients 2202 have access to the site (and/or to particular objects stored within the site). As described previously, a system may include mechanisms to permit authentication (e.g., by the use of registered username and password combinations and/or similar known authentication methods). A system may also enable customers to specify and store access privileges, including privileges for object access within the object store 2250. As described previously, user-level security and other metadata may be provided and stored along with the object.

For example, an object may be stored with a provided ACL containing Access Control Entries ("ACE"). An ACL contains a list of users and/or groups that are allowed to access a data object, type of data object, or resource containing a data object. Each ACE may specify a user, group, or other entity that has access to the data object associated with the ACL. In some embodiments, an ACL may contain a list of users or groups that are specifically denied access to a data object. To implement user-level security, when a user, system, or process attempts to access a data object on an object store 2250 (or related information or metadata, such as a file name), the object store 2250 may access and parse an ACL and any associated ACEs or other security data related to the data object to determine whether the user has the appropriate access level to access the object or its related information. Further details on such security and access control may be found in the assignee's U.S. Patent Publication No. 2008-0243855, filed Mar. 28, 2008, entitled SYSTEM AND METHOD FOR STORAGE OPERATION ACCESS SECURITY.

When an application running on a client 2202 requests the retrieval of a data object stored in the object store 2250, the client may present a URI (or other token) back to the object server node 2208. Before the object server 2250 returns the data object (and/or provides other related information or metadata to the user, such as the file name of the data object), the object server (e.g., via the object server agent 2210) may parse the ACL or other security information to confirm that returning the object (or providing other information) is in conformance with the object's security settings and/or previously defined policies stored in the storage manager. If the user of the client 2202 is properly authenticated, and the user has sufficient access rights to the object (as determined by the ACL or other security information stored in conjunction with the object), the user will be able to retrieve the data object. In this manner, the object store 2250 ensures sufficient privacy between various clients 2202A1, despite the fact that their objects may be commingled in the primary data store 2214 and cloud storage sites 115.

A web-based portal may be provided by the object store to readily allow a user to authenticate interactively and browse, view, and restore their data as well. For example, a web-based portal may permit a user to log on to the system, and may then present a user with an interface that presents to them various data objects associated with the user. For example, it may present objects that were ingested from the user's client 2202, and/or objects ingested from some clients from the user's entity, and/or objects associated with a collaborative search in which the user is a participant. The interactive interface will also support search capabilities, end-user tagging of data, and the ability to classify data into folders ("review sets") for future reference.

Data indexing capabilities, described above, may be incorporated into an object store 2250 to permit policy-based searches of content or other information relating to data objects, that have been indexed. Such data indexing and classification permits the object store 2250 to offer "active management" of the data to an administrator of the system. For example, an administrator can define the actions to be performed on data based on criteria pertaining to the data—e.g., tag, check into an ECM system, restore into a review set for a knowledge worker to review later, etc. In one example, indexing capabilities may also permit users to conduct collaborative searching and collaborative document management of objects within the object store 2250 as described previously.

Object Store Methods

Figure 23:
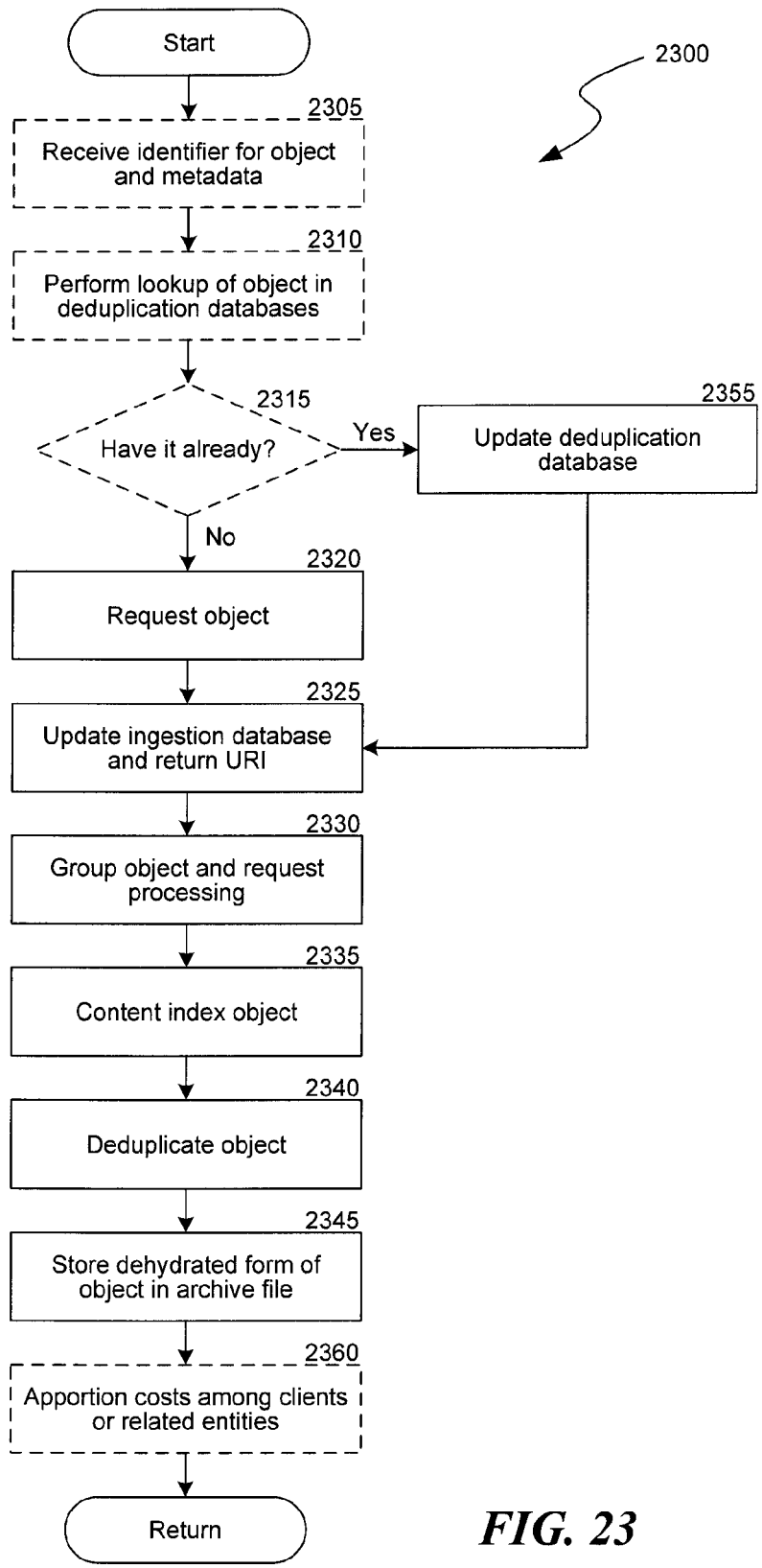
FIG. 23 shows a flow diagram illustrating a first process that may be performed by an object store to process a request to store a data object.

In one implementation, an object store 2250 may avoid the system costs associated with uploading and storing an unnecessarily duplicative copy of an object during a data storage request by a client 2202. FIG. 23 shows a first process 2300 for managing a request to store an object within an object store 2250, including apportioning the storage cost of the object. The process 2300 may result when a calling application on a client 2202 requests that an object server agent 2210 store a particular object.

The process 2300 begins in block 2305 where an object server node 2208 receives an identifier (e.g., a token, URI or hash) for an object and metadata associated with the object (including, e.g., object-level security, content tags, and/or storage policy parameters). For example, a calling application on the client 2202 may generate a hash identifier for an object and send that identifier to object store 2250 along with metadata. At optional block 2310 the object server node 2208 performs a lookup of the received identifier in one or more deduplication database(s) 297 to ascertain whether the object has already been ingested and processed by object store 2250 (or ingested or processed by particular object server node(s) 2208, particular storage site(s), or particular secondary storage computing device(s) 165, such as those secondary storage computing device(s) 165 associated with a particular object server node 2208). Alternatively or additionally, an object server node 2208 performs a lookup of the received identifier in one or more ingestion databases 2212 within data store 2250 to ascertain whether the object has already been ingested by object store 2250 (or ingested by particular object server node(s) 2208, particular sub-client(s), or particular storage site(s)). Alternatively or additionally, the object server node sends the received identifier to one or more cloud storage sites to see if a copy of the object has already been stored therein.

At optional decision block 2315, the system uses the information acquired at block 2310 to determine if the system currently has the object stored in a manner that is consistent with the storage policy parameters applicable to the object. If it does, the process proceeds to block 2355, otherwise it proceeds to block 2320. For example, if the system has only one copy of the object stored in tape storage, but the calling application on the client 2202 has specified that the object should be stored on disk storage, the process may proceed to block 2320.

If object store 2250 already has the object stored in an appropriate manner, at block 2355, the object server node 2208 updates deduplication database 297 to reflect how the new request refers to previously stored blocks. For example, the system may increase reference counts in a primary block table and may add additional entries to a secondary block table within deduplication database 297 to reflect how the new request refers to previously stored blocks. In some implementations, the system may additionally or alternatively update an object-level deduplication database 297 (e.g., by incrementing an object-level reference count in an object-level index within the deduplication database).

At block 2355, the object store 2250 may not request a new copy of the object, saving the time and system cost associated with uploading the object anew, and may instead simply update a deduplication database 297. For example, if a cloud storage site already has a copy of an object stored therein, at step 2355, the object store may add a link or URL to a previously stored copy in the deduplication database 297 and/or elsewhere. The process then proceeds to block 2325.

If optional blocks 2305-2315 are not performed by the system, the process begins instead at block 2320.

At block 2320, object server node 2208 requests the object from client 2202. If object server node 2208 has not already received metadata, it also requests metadata from client 2202 at block 2320. The process then proceeds to block 2325. Alternatively, if at decision block 2315, the object server node 2208 determines that the object store 2250 currently has the object in storage, but it is stored in a manner that is inconsistent with applicable storage policy parameters, object server node 2208 may instead retrieve or request a copy of the object from another system component (e.g., a primary data store 2214 or a cloud storage site 115) and if necessary, request metadata from client 2202.

At block 2325, after receiving the object and/or its metadata, the system stores these in the primary data store 2214. If object store 2250 already has a copy of the object stored in an appropriate manner, at block 2325 the system may store one or more pointers, links, or references to the object and/or its constituent blocks (e.g., a pointer to a dehydrated instance of the object within object store 2250 or cloud storage site 115, or a pointer or reference to an entry in a deduplication database 297) in the primary data store 2214 instead of storing a copy of the object. At block 2325, an object server node 2208 may also generate a URI for the object, update an ingestion database 2212 to reflect information about data object (as described previously), and may return a URI or other token to client 2202. Additionally or alternatively, an object server node 2008 may also generate and return an identifier (e.g., a hash) for the object to provide later validation to the client 2202. Object server node 2208 may also store an identifier for the object in ingestion database 2212 and/or deduplication database 297.

At block 2330, during a scheduled ingestion process described previously, object server node 2208 may associate the object (and its metadata) with a logical group of objects (logical groupings are described further herein). Object server node 2208 may further request a secondary storage computing device 165 to process the logical group by copying or migrating each logical group of data objects into a compressed, deduplicated or "dehydrated" archive file that may employ data structures such as those shown in FIGS. 5 and 8.

At block 2335, a secondary storage computing device 165 performs content indexing of the object in the manner described previously with respect to FIG. 10. At block 2340, a secondary storage computing device 165 performs deduplication of the object using one or more of the deduplication methods and data structures described previously. In one example, deduplication may be file or block-level deduplication. In other examples, the deduplication may be object-level or sub-object level deduplication. During deduplication at block 2340, the system may perform lookups on or otherwise examine one, several, or all deduplication databases 297 within object store 2250 to determine the number of instances of the object that are currently stored and/or the number of instances of each block in the object that are current stored. Thus, the scope of deduplication within an object store 2250 may be quite limited or quite broad. In one example, a deduplication process only utilizes deduplication databases 297 associated with the same object server node 2208 that received or ingested the object. A deduplication database 297 is associated with an object server node 2208 if the deduplication database has any entries reflecting a storage operation initiated by the same object server node 2208.

At block 2345 the system stores a dehydrated form of the object within an archive file, which may also comprise data relating to any or all of the objects in the logical group. As illustrated previously, the precise dehydrated form of an object within an archive file will depend on the type of deduplication performed and whether some or all of the object's content had previously been stored. For example, if block-level deduplication is performed upon the object and a prior instance of the object was already appropriately archived, the dehydrated form of the object may be represented within the archive file by metadata and one or more pointers or similar references. For example, during deduplication, if a cloud storage site already has a copy of an object stored therein, at step 2345, the object store may store in a container file, a link, URL or other pointer to a previously stored copy. If instead, block-level deduplication is performed upon the object but a prior instance of the object was not already appropriately archived, the dehydrated form of the object within the archive file may comprise metadata, pointers/references to some blocks stored previously, and new copies of some other blocks within the object.

At optional block 2360, the system may apportion the cost of storing the object between one or more clients or their related entities. Stated conversely, at block 2360, the system may attempt to apportion any cost savings resulting from the avoidance of unnecessary storage within the data store and/or unnecessary uploads to the object store 2250. For example, if two different clients 2202 from two different companies both request that an object store 2250 provide storage of the same data object, the two companies may receive adjusted pricing for their requests to reflect the cost savings realized by the system during deduplication. As described previously with respect to FIG. 22, in the event that some or all of the blocks of the data object were previously stored appropriately within the storage operation cell 2250, the deduplication at block 2340 may reduce the amount of data needed to process a new request to store the same data object. Thus, block 2340 may reduce the amount of data storage needed to accommodate a storage request. Additionally, if the system performs the optional identifier lookup shown in blocks 2305-2315 and the process proceeds to block 2355, the system avoids the cost of receiving the data object (e.g., ingestion bandwidth of an object server agent 2210 used and/or the system resources needed to transfer the object into and out of a primary data store 2214).

To apportion cost savings, the system may utilize or mine the data stored in deduplication databases 297, SS index 261, management index 211, and/or ingestion databases 2212. As described previously, these databases correlate client 2202 information with data ingested into and stored by the object store 2250, such as the time of creation, deduplication information, deletion dates, and storage locations. Thus, the system may use these databases to determine which storage requests initiated by a particular client 2202 were processed via direct ingestion of an object from the client 2202, in contrast to those storage requests initiated by the client that were able to utilize previously stored instances of an object or some of its blocks. Such a determination permits the system to determine where cost savings have occurred. When apportioning costs, the system may utilize a sliding ratio that is selected using criteria such as the size of a shared data object, the quantity and/or quality of total data stored on the object store by a particular company or client, the terms of a service contract or agreement between a particular company and an operator of an object store, the storage policy for the company, and/or any other suitable criteria.

In one example, a first client 2202A associated with a first company uploads a new object to an object store 2250, and later a second client 2202C associated with a second company sends an identifier (hash) of the same object to the object store and requests storage of that object. In this example, a second upload of the object itself may be avoided (i.e., the process of FIG. 23 proceeds to block 2355) and a second copy of the object within the object store 2250 may be avoided. In this example, the system may initially charge the first company a first non discounted rate for the upload of the object (e.g., a rate based on its size) and a second non discounted rate for the storage of that object (e.g., a rate based on the object's size and the duration and quality of storage used to store it). At a later time, the system may charge the second company a third discounted rate for their requested upload of the object (e.g., a rate based on its size) and a fourth discounted rate for the storage of that object (e.g., a rate based on the object's size and the duration and quality of storage used to store it).

Additionally or alternatively, the first company may receive a credit or rebate to its account to reflect some or all of the cost savings realized from avoiding a second upload; this credit or rebate may be for an amount that is different from (e.g. less than) the second client's third rate. Additionally, after the second client requests storage, so long as both the first and second clients have effective access to the data object (e.g., their "virtual copy" of the object has not been eliminated due to a retention policy and the client has not requested its deletion), one or both companies may receive a discounted or reduced storage rate. For example, the first company may receive a storage rate lower than the second non-discounted rate that was originally charged.

In a second example, a first client 2202A associated with a first company uploads a first object that is new to the object store 2250, and later a second client 2202C associated with a second company sends an identifier (e.g., a hash) of a similar second object and requests storage of the object. A second object is similar to a first object if it shares one or more blocks in common with the first object. In this example, a second upload of the object itself is not avoided (e.g., the process proceeds to block 2320), since the two objects have different identifiers. However, block-level deduplication (e.g., at block 2340) may reduce the amount of new data needed to store the second object. After the second client requests storage, so long as both clients have effective access to the common blocks (e.g., their "virtual copy" of the blocks has not been eliminated due to retention policies and the client has not requested deletion), one or both of the two companies may receive a reduced storage rate for the common blocks.

In a third example, cost apportionment is not tied to a particular storage request, but rather occurs in an aggregated way. For example, the system may periodically (e.g., monthly) determine what percentage of blocks uploaded directly from a first company's clients 2202 are referenced by another company's deduplication database entries. The system might then provide a rebate to the first company's account, offer lower rates to the first company for another future period (e.g., the next month), apportion costs that month between the two companies so that each company's bill is less that what it would have been if each had stored its own copy, etc.

Figure 24A:
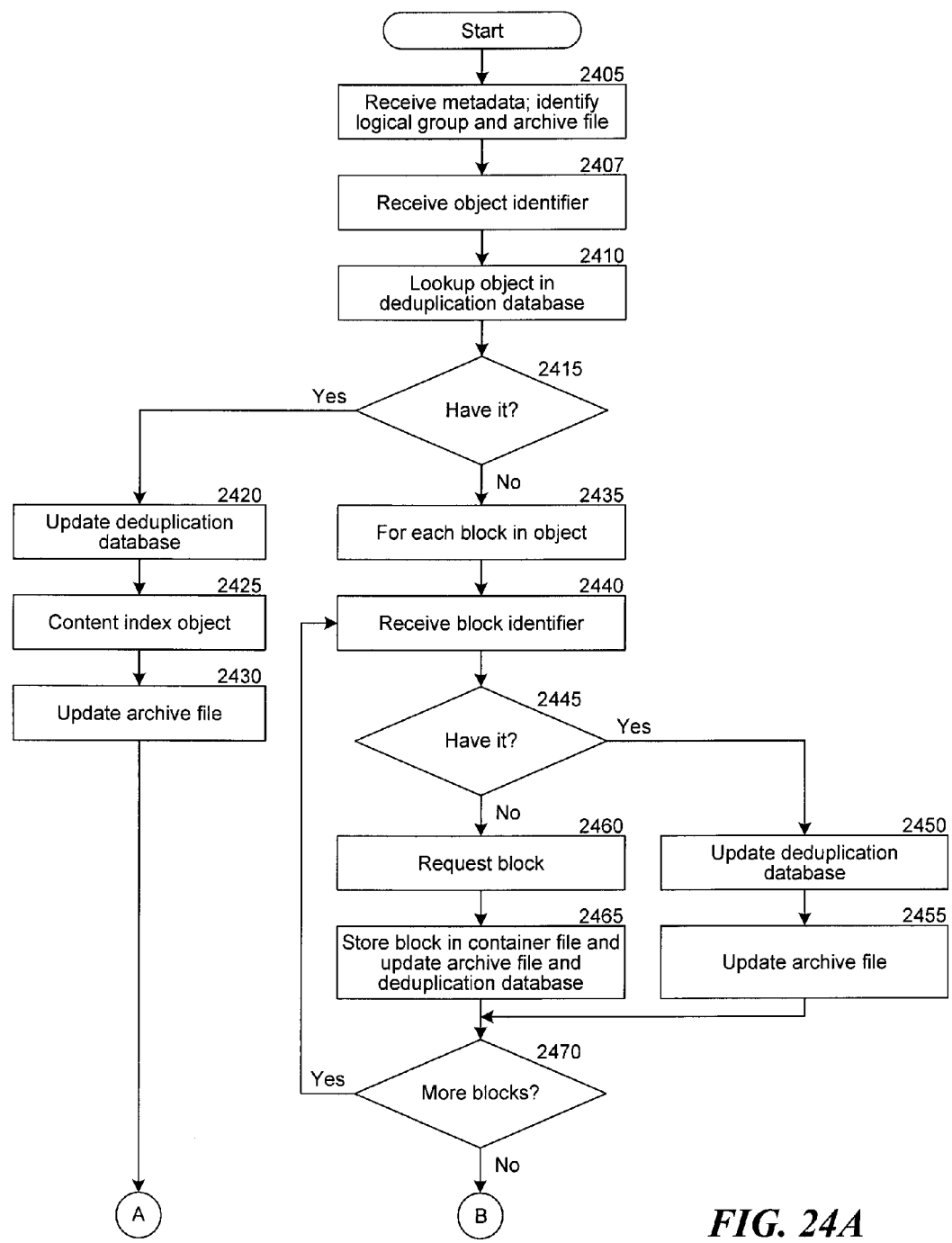
FIGS. 24A and 24B together show a flow diagram illustrating a second process that may be performed by an object store to process a request to store a data object.
Figure 24B:
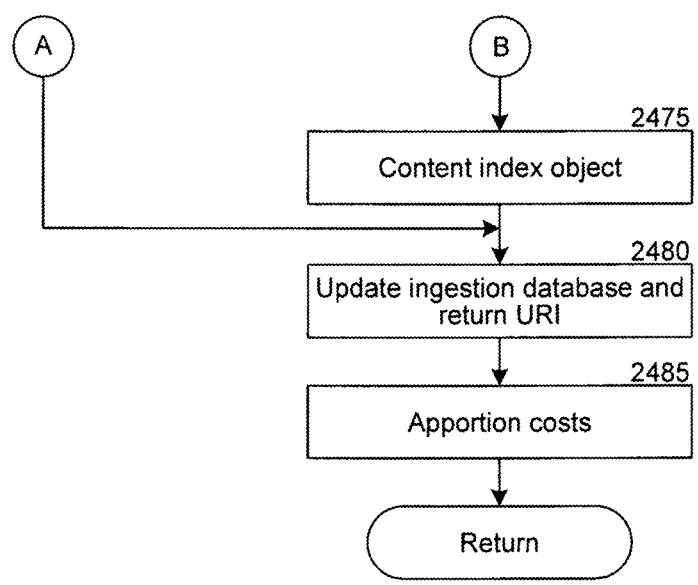

In a second implementation, an object store 2250 may avoid the system costs associated with uploading and storing unnecessary duplicate copies of data blocks when processing a data storage request by a client 2202. FIG. 24 shows a second process 2400 for managing a request to store an object within an object store 2250, including apportioning the storage cost of the object. The process 2400 of FIG. 24 is similar to process 2300 of FIG. 23, however, in process 2400, the system may avoid the costs associated with uploading redundant blocks, not just redundant objects, by performing block-level deduplication at substantially the same time as data ingestion. In this implementation, during process 2400 the system may cache or store a logical group of objects in an archive file stored in the primary data store 2214 that reflects a dehydrated form of the objects (i.e., an archive file that utilizes data structures similar to those shown in FIGS. 5 and 8). Later, during a scheduled ingestion process, the archive file may be transferred or copied to one or more secondary cloud storage sites 115.

Alternatively, during process 2400, the object store 2250 may write a dehydrated form of data objects directly to an archive file located in a secondary data store 115 by utilizing secondary storage computing device 165. As described previously, an archive file may comprise one or more volume folders 802 that further comprise one or more chunk files 804, 805. The chunk folders may further comprise one or more of each of the following: metadata files 806, metadata index files 808, container files 810, 811, and container index files 812.

The process 2400 begins at block 2405, where the system receives object metadata, identifies a logical group, and identifies an archive file for storing a dehydrated form of the object. At block 2405, the system may identify a logical group for the object by using the received metadata (e.g., reflecting the type of object, the storage policy parameters, and/or security information), and/or other information (e.g., the identity of the client 2202 making the storage request) to identify a logical group of objects having similar storage policy parameters, similar object types, and/or other similarities. Once a logical group is identified, the system identifies an archive file utilized by the system to store the logical group in a dehydrated form. The archive file may be located in primary data store 2214 or on a secondary cloud storage site 115. If a suitable archive file does not already exist in primary data store 2214 (e.g., because archive files were recently migrated from primary data store 2214 to secondary cloud storage sites 115), the system may create a new archive file in primary data store 2214 for the logical group. Alternatively, the system may create a new archive file in a secondary cloud storage site 115 for the logical group.

At optional blocks 2407-2415, the system receives an object identifier and performs a lookup of the object in deduplication database(s) 297 to determine whether the object store 2250 already has a copy of the object appropriately stored within the object store. Blocks 2407-2415 are performed in the same manner as blocks 2305-2315 described previously with respect to FIG. 23. If optional blocks 2407-2415 are not performed, the process 2400 proceeds directly to block 2435.

If at decision block 2415 the system determines that object store 2250 does have a copy of the object appropriately stored therein, then at block 2420 the system updates one or more deduplication databases 297 to reflect how the identified archive file refers to previously stored blocks. For example, the system may increase reference counts in a primary block table. As another example, the system may add additional entries to a secondary block table within deduplication database 297. For example, if a cloud storage site already has a copy of an object stored therein, at step 2415, the object store may add in a deduplication database 297 and/or elsewhere, links or URLs to previously stored blocks. At block 2425, the system may content index the object. To do so, the system may associate the new storage request with content indexing information previously derived and/or associate the new storage request with metadata provided. Alternatively or additionally, the system may restore all or part of the data object using the processes described previously and content index a restored data object and/or a restored portion of the data object. The system may store some or all of the content index information in the SS index 261 and/or ingestion database 2212. The process then proceeds to block 2430.

At block 2430, the system updates the identified archive file to reflect the storage request. To do so, the system may (1) add the received metadata to a metadata file (2) add links, references, or pointers within the metadata file that point or refer to previously stored blocks, and (3) update a metadata index file. If all of the blocks in the object were previously stored in an appropriate manner, the system may not need to add any additional blocks to a container file. For example, if a cloud storage site already has a copy of an object stored therein, at step 2345, the object store may store in a metadata file, metadata index file, or another container file, links or URLs to previously stored blocks.

If optional blocks 2407-2415 are not performed or if, at decision block 2415, the object store does not have a copy of the object appropriately stored therein, the process proceeds to the loop shown at block 2450, where the system performs blocks 2440-2470 for each block within the object. At block 2440, the system receives a block identifier. At decision block 2445 the system determines if the system already has an appropriately stored copy of the block by querying one or more deduplication databases 297. During block 2445, the system may perform lookups on or otherwise examine one, several, or all deduplication databases 297 within object store 2250 to determine the number of instances of the block that are appropriately stored. Alternatively or additionally, the system sends the received block identifier to one or more cloud storage sites to see if a copy of the block has already been stored therein. Thus, the scope of block-level deduplication within an object store 2250 may be limited or broadened.

If the system does have a copy of the block appropriately stored, then the system at block 2450 updates deduplication databases 297 to associate the current storage request with that block. For example, the system may increment a reference count in a primary block table and add an additional entry to a secondary block table. The process then continues to block 2455, where the system updates the identified archive file by (1) adding received metadata to a metadata file and/or (2) adding a link, reference, or pointer within the metadata file that points or refers to a previously stored copy of the block. For example, if a cloud storage site already has a copy of a block stored therein, at step 2325, the object store may add in a metadata file or another container file, a link or URL to a previously stored copy. The process then proceeds to decision block 2470.

If the system does not have a copy of the block appropriately stored therein, then the system proceeds to block 2460, where the system requests a copy of the block from the client 2202. Once the block is received, at block 2465, the system stores the block in a container file within the identified archive file and otherwise updates the archive file. For example, the system may update a metadata file 806 with a link to the newly stored block and with received metadata. The system may further update deduplication databases 297 by adding a new entry to a primary block table and/or adding an additional entry to a secondary block table.

As shown at decision block 2470, the sub-process of blocks 2440-2465 repeats so long as there are additional blocks within the object that require processing by the system.

The process 2400 then proceeds to block 2475, where the system content indexes the object. During content indexing, the system may simply index the object using received metadata (e.g., using content tags provided as metadata by a user). Alternatively or additionally, the system may restore all or part of the data object using the processes described previously and content index a restored data object and/or a restored portion of the data object. The system may store some or all of the index information in the SS index 261 and/or ingestion database 2212 before proceeding to block 2480.

At block 2480, the system updates ingestion database 2212 to reflect the processed storage request and received metadata, and returns a URI to the requesting client 2202.

At optional block 2485, the system may apportion costs among clients or their related entities in a manner similar to that described previously with respect to FIG. 23. When apportioning costs, the system may utilize a sliding ratio that is selected using criteria such as the size of a shared data object/block, the quantity and/or quality of total data stored on the object store by a particular company or client, the terms of a service contract or agreement between a particular company and an operator of an object store, storage policy requirements, and/or any other suitable criteria. In one example, a first client 2202A associated with a first company uploads a first object that is new to the object store 2250, and later a second client 2202C associated with a second company sends an identifier (e.g., a hash) of a similar second object and requests storage of the object. The second object is similar to a first object because it shares a set of blocks in common with the first object. In this example, via the process 2400 shown in FIG. 24, a second upload of the common blocks is avoided. Furthermore, block-level deduplication (e.g., at blocks 2440-2465) may reduce the amount of new data needed to store the second object. In this example, the system may initially charge the first company a non discounted first rate for both the upload of the object (e.g., based on its size) and a non discounted second rate for the storage of that object (e.g., based on the object's size and the duration and quality of storage used to store it). At a later time, the system may charge the second company a reduced third rate for its request to upload the object to reflect cost savings realized by avoiding a second upload of common blocks. Additionally or alternatively, the first company may receive a credit or rebate to its account to reflect some or all of the cost savings realized from avoiding a second upload; this credit or rebate may be for an amount that is different from the second client's third rate or discount. After the second client requests storage of the second object, so long as both clients have effective access to the common blocks (e.g., their "virtual copy" of the common blocks has not been eliminated due to retention policies and the client has not requested deletion of an associated object), one or both of the two companies may receive a reduced storage rate for the common blocks.

Process for Cost-Balancing Cloud Storage

Figure 27:
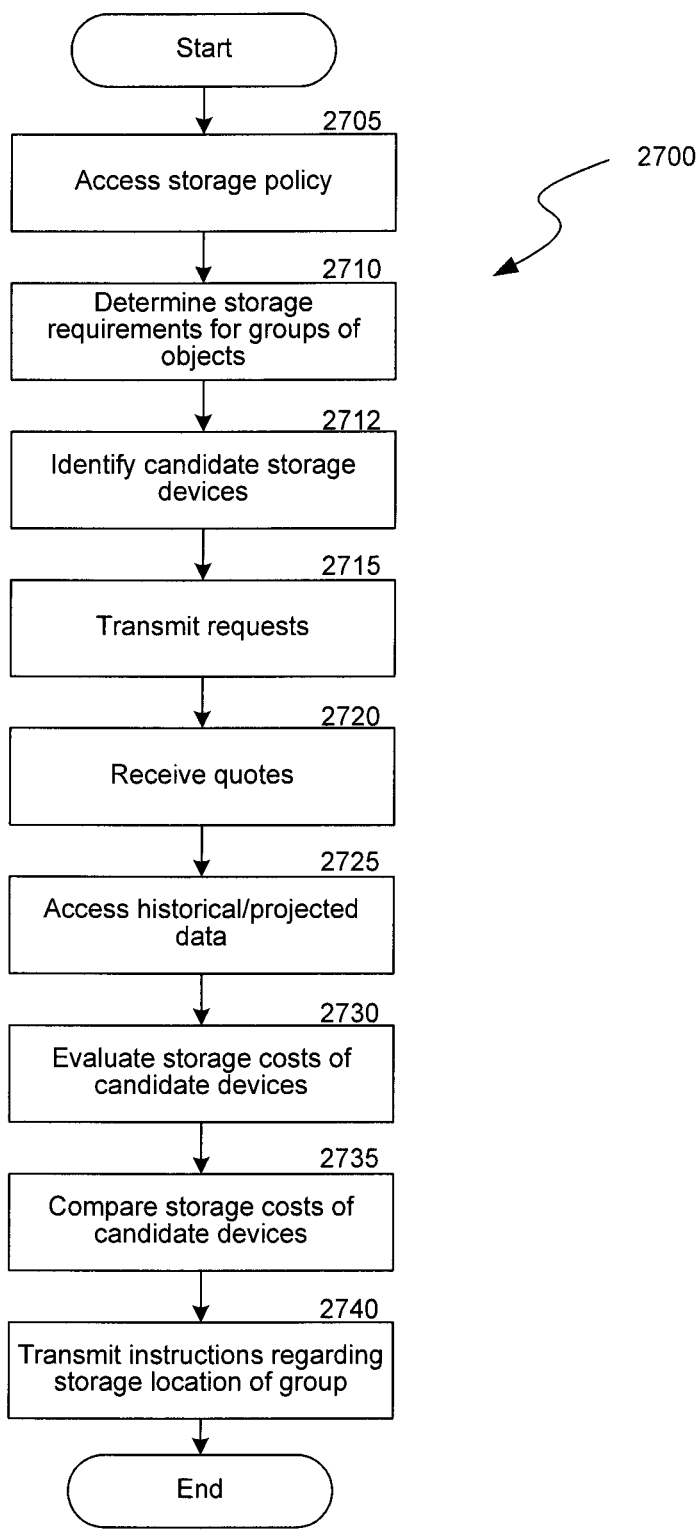
FIG. 27 is a flow diagram of a process for identifying suitable storage locations for various data objects subject to a storage policy.

FIG. 27 is a flow diagram illustrating a process 2700 for identifying suitable storage locations for a set of data objects subject to a storage policy. Process 2700 may be performed by the systems of FIGS. 1, 2, 15, 16, 21, and 22 and/or other suitable systems. The process 2700 begins at block 2705 when the system accesses the storage policy applicable to the set of data objects. This storage policy may define different classes of storage devices 115. For example, the storage policy might define "first-class storage" as any local storage device having magnetic disk or otherwise faster-access storage media and a first cloud storage site that satisfies certain criteria (e.g., has high bandwidth for faster uploads and/or downloads and/or utilizes RAID or similar methods that improve the fault-tolerance of the site), and "second-class storage" as a second cloud storage site that may have greater latencies or lower fault-tolerance and any local storage device having magnetic tape or otherwise slower data storage. Additionally, the storage policy may also define different categories of data objects (e.g. functional categories such as email objects, audio objects, video objects, database objects, document objects, etc.) and may require different classes of storage for each.

At block 2710, the system logically groups the various data objects and determines the storage requirements of each group. Typically the system groups the set of data objects so that each group requires a particular class of storage. However, the system may group the various data objects by any other logical grouping such as groups based around functional categories, or to improve the possibility of realizing deduplication benefits. The particular grouping used by the system will be chosen to conform to the storage policy. Logical groupings are described in greater detail herein.

The system may first utilize the storage policy and the management light index 245, the management index 211, the SS index 261, the SS light index 247, deduplication database 297 and/or metabase 270 to determine the number of bytes, kilobytes, gigabytes, terabytes or similar units required to store each individual data object, and any other requirements necessary to conform to the storage policy. For example, the system might determine that a particular data object requires 25 megabytes of first-class storage. The system may next determine the aggregate storage requirements for each group of data objects. For example, the system may determine that a first group of data objects requires an aggregate 200 gigabytes of first-class storage and a second group of data objects requires an aggregate 450 gigabytes of second-class storage. The aggregate storage requirements determined by the system may reflect the effect of deduplication; for example, the system may utilize deduplication database 297 to determine the size of an archive file created in part by block-level deduplication.

The system then performs blocks 2712-2740 for each group of data objects to determine the appropriate storage location of the various data objects in the group. At block 2712, the system identifies the storage devices 115 (including cloud storage sites 115A-N) that may be suitably employed to store the group of data objects. To determine the list of potential storage devices 115 (referred to as "candidates"), the system may access storage device class definitions in the storage policy. The system may also access data regarding storage devices 115 stored in the management index 211, secondary storage computing devices 265 and/or storage devices 115. For example, if the group of data objects requires first-class storage, the system may query the management index 211 to determine which local magnetic storage devices 115 have sufficient storage capacity to accommodate the group of data objects.

At block 2715, the system may transmit a request for quotes to candidate cloud storage sites (which may be operated by independent organizations) identified at block 2712 (or other appropriate types of data storage service providers accessible via the network). To do so, the system may initiate communications via the network agent 235. For example, the system will request a quote from each cloud storage site by initiating an HTTP connection with the cloud storage site and sending the request via one or more HTTP messages. This request for quotes may include information such as: the amount of storage space required, a unique identifier associated with the request, an identifier associated with a prior request made or a quote received from the site (e.g., in the case of a counter offer), information that identifies the system making the request (or identifies a related entity, such as a billing party), how the data will be accessed once stored or how often (i.e., accessibility of data, including desired data transfer rates), a suggested or required upload time window or deadline, estimated storage lifetime of the objects, suggested pricing rate(s), the type of storage medium desired (e.g., tape or optical or magnetic media), maximum pricing rate(s), suggested download, upload, and/or storage pricing rates (and/or a promotional code or similar indicator of a pricing rate package), and/or any other information suitable for requesting a storage quote.

Alternatively, or additionally, the system may obtain estimated storage costs for one or more cloud storage sites by sending similar requests for quotes to one or more third-party sites that provide binding, non-binding and/or informational storage quotes (e.g., a website operated by a data storage dealer-broker or a site that aggregates information regarding cloud storage costs). The format and content of the request may be customized to each site and may be dictated by an API set utilized by a particular cloud storage or third-party site. Alternatively or additionally, the system may estimate the storage costs for a candidate cloud storage site by accessing historical, projected or other cost information stored within the storage manager 105 or elsewhere in the storage operation cell 150.

At block 2720, the system may receive one or more quotes from one or more cloud storage and/or third-party sites. For each cloud storage site, the system may receive no quote, a single quote, or several quotes covering various storage options. Each quote may include information such as: one or more pricing rates, the accessibility of stored data, identifiers or tokens associated with the quote, time windows during which data may be transmitted or retrieved, an acceptance window during which the quote would be honored by the site, etc. The quote may provide various pricing rates for different types of data operations. For example, the quote may specify a first rate for an initial upload to the site, a second rate for downloads from the site, and a third rate for searching or accessing the data, a fourth rate for continued storage and maintenance of the data on the site (e.g., a rate charged for each gigabyte stored per month), maximum storage space allotted, maximum or minimum storage lifetime; and so forth. The format and content of the quote may be different for each cloud storage or third-party site and may be dictated by an API set (or similar) utilized by a particular cloud storage or third-party site. The system may perform additional blocks, such as data extraction, to create a uniform set of data for all of the received quotes.

At optional block 2725, the system may access other historical or projected data pertaining to storage device candidates, including optical, tape or magnetic disk storage device candidates located locally within the storage operation cell 150. In some embodiments, the system may access historical or projected operating costs of each candidate that may be stored in management index 211, secondary storage computing devices 265, or elsewhere in the storage operation cell 150. In still other embodiments, the system may access data relating to: current or projected power consumption, current or projected power rates, acquisition cost of the storage devices, mean operating time, mean repair time, mean data access rates, or similar performance and cost metrics that may be stored in the management index 211, secondary storage computing devices 265 or elsewhere.

At block 2730, the system may evaluate the cost of storing the group of data objects on some or all of the storage device candidates (the "storage cost"). The storage cost associated with a particular storage device may refer simply to the estimated monetary expense associated with uploading the group of data objects to the storage device and/or maintaining it there for its estimated lifetime (or other time period).

Alternatively or additionally, the "storage cost" of a certain storage device candidate may refer more generally to the value of a numerical cost function that may take into account several variables. Non-exclusive examples of cost function variables include: historical or projected information pertaining to storage device candidates; any quoted pricing rates; the amount of storage required; the network load associated with uploading and/or downloading the data to a site; projected data access costs; other accessibility metrics; site reliability, quality or reputation; geographical location of a candidate; mean operating time; mean repair time; mean data access rates; or similar performance and cost metrics. Some of these variables may be a single value variable, still others may be set or matrix variables. In some embodiments, the system may evaluate or calculate one or more storage related metrics as described in the commonly assigned U.S. patent application Ser. No. 11/120,662, now U.S. Pat. No. 7,346,751, entitled "SYSTEMS AND METHODS FOR GENERATING A STORAGE-RELATED METRIC", U.S. application Ser. No. 11/639,830, filed Dec. 15, 2006, entitled "System and method for allocation of organizational resources", U.S. application Ser. No. 11/825,283, filed Jul. 5, 2007, entitled "System and method for allocation of organizational resources", which are hereby incorporated herein in their entirety. which is hereby incorporated by reference in its entirety. Such storage metrics may also be utilized as variables within a cost function.

The system may evaluate a cost function as follows. First, the system may mathematically transform the cost function variables to create a second set of intermediate variables (e.g., to normalize the variables). Each variable may be subjected to a different transformation. The transformations may be a linear transformation (including an identity transformation) or non-linear transformation. The transformations may also be invertible or non-invertible transformations. Non-exhaustive examples of transformations include:

scaling the variable (by a constant);
raising the variable to a power;
taking a logarithm of the variable;
applying a ceiling or floor mapping to the variable (i.e., quantization);
reducing a set variable to its mean value, variance or other moment.

The transformation applied to a cost function variable may also merge a number of these suitable transformations. Second, the system may evaluate the cost function by mathematically combining the various intermediate variables. The combination may be a linear combination or a non-linear combination. Non-exclusive examples of combinations include any polynomial of the intermediate variables, including a simple summation of the various intermediate variables. Often, a cost function is a weighted summation of various cost function variables.

The system evaluates the same cost function for each storage device candidate and each group of data objects. However in other embodiments, the system may utilize different cost functions for different groups of data objects. In still other embodiments, the system may utilize different cost functions for different types of storage devices (e.g., there may be one cost function for optical media devices, another for tape media devices, and yet another for cloud storage sites). The cost function(s) and their associations with particular groups or storage media types may be defined in the storage policy or elsewhere.

At block 2735, the system compares the costs associated with the various candidate storage devices. For example, the system compares these various costs to identify one or more candidates ("identified devices" or "sites") having an associated cost that is lower than the other candidates. If more than one storage site is identified, the system may divide the group of data into one or more subgroups, and associate each with an identified site. However, in some embodiments, the system may also compare these costs to make other types of determinations. For example, the system may select identified sites using criteria other than minimizing associated cost. As another example, the system may compare the costs to ensure that at least one candidate satisfies a particular criteria, such having an associated cost that falls below a specified maximum value (that may be defined in the storage policy). Depending on the results of these determinations, the system may repeat some or all of blocks 2710-2735 using different quote parameters, different groupings, and/or different cost functions and/or may take other actions such as notifying an administrator. For example, in some embodiments, the system may repeat block 2715 by making another round of quote requests to some cloud storage sites that includes lower suggested or maximum rates (counteroffers to the first set of quotes).

At block 2740, the system may transmit instructions to the jobs agent 220 (or other component) regarding the identified storage location of the group of data objects (or if the group has been subdivided, the identified storage location of each subgroup of data objects). For example, the system transmits instructions to the jobs agent 220 to migrate or transfer the data objects of the group or subgroup to its identified storage location. In some embodiments, the system may also transmit other information to the jobs agent 220 regarding the migration/transfer of the data objects. For example, the system may transmit a token or other identifier associated with a winning quote and/or may transmit information regarding the schedule of data migration/transfer. In some embodiments, the system may instead instruct a secondary storage computing device 265 or other system component regarding the identified storage location of a group or subgroup of data objects.

Process for Scheduling Cloud Storage Requests

Figure 28:
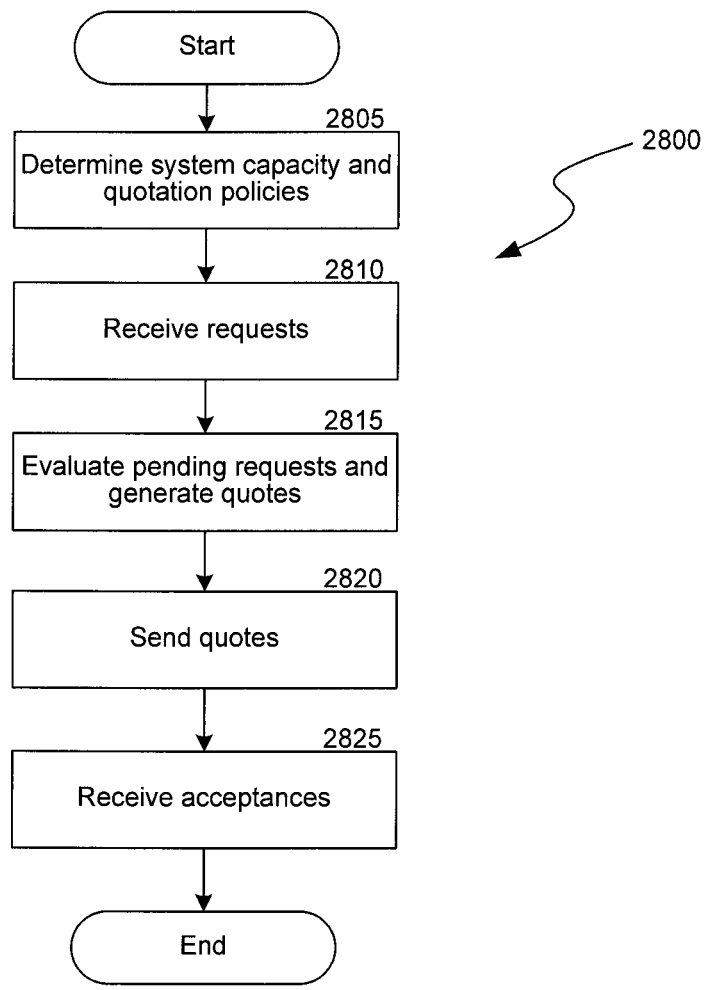
FIG. 28 is a flow diagram of a process for scheduling cloud storage requests.

FIG. 28 is a flow diagram illustrating a process 2800 for scheduling cloud storage requests received from auction clients; the process 2800 may be performed by an auction service component (not shown) forming part of a cloud storage site 115A-N or any other suitable system (e.g., a component of a cloud storage brokerage site). An auction client may be a component of a storage manager 105, a secondary storage computing device 165, or any other device seeking cloud storage. For simplicity, the process refers to requests for an upload of data from an auction client (or related device) to a cloud storage site 115A-N; however, auction clients may make requests for any type of cloud storage operation that requires system resources from a cloud storage site (e.g., downloading data or searching the contents of stored data).

In this process 2800, the auction service evaluates requests from auction clients to upload data to the cloud storage site. The auction service may respond to some or all auction clients with a quote for their requested upload ("a quoted job"). Those requests that do not receive a quote in response may be queued for additional evaluation later ("queued requests"). If a quote is accepted by an auction client, the upload may be added to a list of "scheduled jobs." Once a job is scheduled, other components within the cloud storage site (e.g., file servers) may accept the associated upload during its scheduled upload window.

The process 2800 begins at block 2805, when the auction service determines the current system capacity and applicable quotation policies. In particular, auction service may access capacity policies, scheduled or quoted jobs, queued requests, quotation policies, and/or other information about system capacity and pricing. A "capacity policy" is generally a data structure or other information source that includes a set of preferences and other criteria associated with allocating system resources. The preferences and criteria may include, the system resources (e.g., data transfer volume or bandwidth) available for auction during specified periods, scheduled maintenance windows, and the current storage capacity available on particular servers or devices. The auction service may also determine the system resources required for jobs already scheduled or quoted. Using this information, the auction service may determine the available system resources available for providing new quotations.

The auction service may also access a quotation policy. A "quotation policy" is generally a data structure or other information source that includes a set of preferences and other criteria associated with generating a quote in response to auction client requests. The preferences and criteria may include, but are not limited to: a revenue function; a pricing function; pricing rate tables; codes and schedules associated with marketing promotions; a list of preferred and/or disfavored auction clients; current system capacity; classes or quality of storage; retention policies; upload time periods; data characteristics; compression or encryption requirements; the estimated or historic cost of storage, including the cost of power. A "revenue function" is generally a description of how the auction service may numerically evaluate the projected revenue (and/or other benefits) that would be generated by one or more auction client requests. A "pricing function" is generally a description of how the auction service may generate the various values (e.g., pricing rates) associated with a responsive quote.

At block 2810, the auction service may receive one or more new requests from auction clients seeking cloud storage. The request may include various information such as: a unique identifier that the auction client has associated with the request; an identifier associated with a prior request made or a quote received from the site (e.g., in the case of a counter offer); information that identifies the auction client making the request (or identifies a related entity, such as a billing party); the amount of storage space desired; how the data will be accessed once stored (e.g., accessibility of data, including desired data transfer rates); suggested or required upload window; estimated storage lifetime of data; the type of storage medium desired (e.g., tape or optical or magnetic media); suggested download, upload, and/or storage pricing rates (and/or a promotional code or similar indicator of a pricing rate package); and/or any other information suitable for requesting cloud storage. The format and content of the request will typically conform to a specified API or similar convention employed by the auction service.

Although not shown, during block 2810, the auction service may authenticate each of the requests and/or auction clients to ensure that each request is from a valid auction client. This authentication may happen via any acceptable method, including the use of passwords or security certificates. Those requests that cannot be authenticated may be discarded by the auction service without further consideration.

At block 2815, the auction service evaluates queued and new requests (collectively the "pending requests") and generates responsive quotes. To do so, the auction service may first identify those requests that either (1) do not satisfy minimum requirements specified by the quotation policy, or (2) cannot be accommodated due to a lack of system resources. Typically, the auction service will reject such requests by removing them from the list of pending requests. However, the auction service may also (1) send a quote with terms different from those requested (e.g., with higher rates or with a different scheduled upload window) in order to conform to the quotation policy, (2) send an explicit rejection of the request to the auction client, (3) queue the request for later evaluation, and/or (4) take another appropriate action.

At 2815, the auction service may next identify which remaining pending requests should receive quotes and generate quotes. The auction service will apply the preferences and criteria specified in the quotation policy described previously to determine which "winning" requests should receive responsive quotes. In some embodiments, the auction service will choose the set of requests that results in a maximum combined value of a revenue function. Those pending requests that do not receive quotes will typically be queued by the auction service for later evaluation, but the auction service may also (1) send an explicit rejection of a request to the auction client, (2) remove it from the list of pending requests, and/or (3) take another appropriate action.

For each winning request, the auction service will generate a responsive quote. Quotes generated may specify: the unique identifier that the auction client has associated with the request; various pricing rates for different types of data operations (e.g., a first rate for an initial upload to the site, a second rate for downloads from the site, and a third rate for searching or accessing the data, a fourth rate for continued storage and maintenance of the data on the site (e.g., a rate charged for each gigabyte stored per month)); maximum storage space allotted; maximum or minimum storage lifetime; the accessibility of stored data; time windows during which data may be transmitted to the site or retrieved; etc. Each quote will typically include a token or other identifier associated with the quote and may specify an acceptance window during which the quotation will be honored by the site. The auction service generally applies the preferences and criteria specified in the quotation policy described previously (including a pricing function) to determine the values given in the quotes. For example, the pricing function may require the auction service to specify upload and storage rates associated with a marketing promotion, even if the client request proposed higher pricing rates. However, in some embodiments, the auction service may simply utilize in its quote some or all of the values proposed in the request.

At block 2820, the auction service sends a copy of the generated quotes to auction clients. In response, each auction client may send another request (e.g. a "counteroffer"), may send an indication of acceptance of the quote and/or may take no action in response.

At block 2825, the auction service may receive an indication of acceptance of one or more quotes. For each accepted quote, the auction service may add the associated upload to the list of scheduled jobs so that other system components will accept the upload. For example, the auction service only adds an upload to the list of scheduled jobs if the acceptance is received within the specified acceptance window. If the acceptance is received outside of this window, the auction service may treat the acceptance as it would a new request and repeat some or all of the previous blocks.

Process for Encrypting Files within Cloud Storage

As described previously with respect to FIG. 3B, when a system migrates or copies data to secondary storage, including secondary cloud storage, the system may encrypt the data before or after a secondary copy or archival copy is created. When data is encrypted prior to migrating or copying data to secondary storage, the encryption enhances the "at-rest" security of files stored within a cloud storage site 115A-N, by reducing the risk of unauthorized access to the files' content. In such implementations, it may be desirable to store encryption keys (and/or other information necessary to decrypt files) within the storage operation cell 150, not within the cloud storage site 115A-N used to store the encrypted files. In this way, even an operator of a cloud storage site may not breach the security of an encrypted file. If local encryption occurs within the storage operation cell 150 prior to copying or migrating data to a cloud storage site 115A-N, the encryption keys or similar encryption information may easily be stored within storage operation cell (e.g., within a local index or database of the storage operation cell or a different storage device 115). Alternatively, if local encryption is performed within a storage operation cell 150, the storage operation cell 150 may "scramble" encryption keys and store the scrambled keys with the encrypted files. This method provides some level of protection against intrusions, even intrusions by the operator of a cloud storage site. Further details may be found in U.S. Patent Publication No. US2008-0320319A1 referenced above.

In some circumstances, however, decrypted files may be stored within a cloud storage site 115A-N without first encrypting the files within the storage operation cell 150. In such circumstances, it may be desirable to later encrypt the files stored on the cloud storage site to protect those files thereafter.

Figure 29:
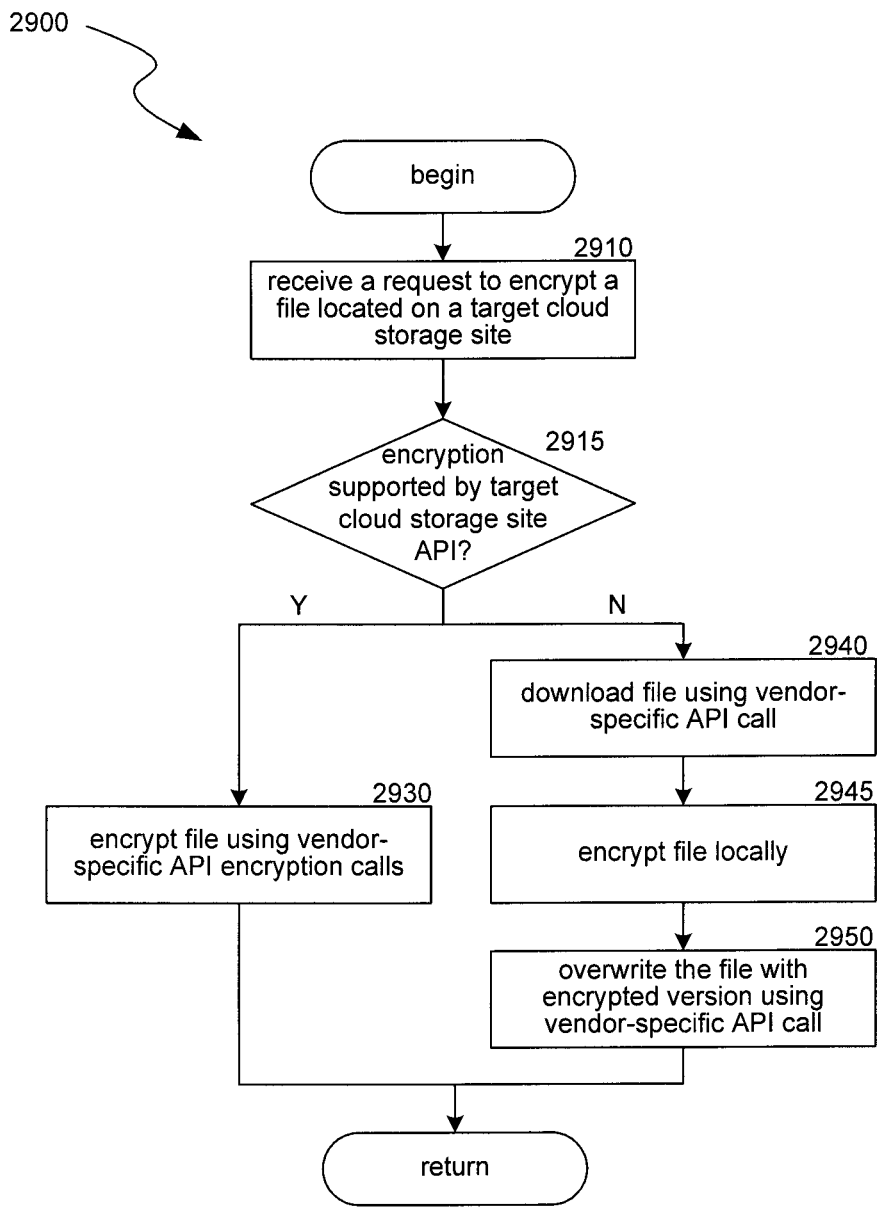
FIG. 29 illustrates a process for encrypting files stored within a cloud storage site.

FIG. 29 illustrates a process 2900 for encrypting files stored within a cloud storage site 115A-N. The process may be performed by cloud storage submodule 236, or any other suitable system component. The process begins at block 2910, when cloud storage submodule 236 receives a request to encrypt a file located on a target cloud storage site. For example, cloud storage submodule 236 may receive an indication of which target files within a target cloud storage site should be encrypted. Cloud storage submodule 236 may also receive an indication of which encryption method should be utilized, one or more encryption keys and/or additional information.

At block 2915, cloud storage submodule 236 determines if the type of encryption method requested is supported by the API provided by the operator of the target cloud storage site 115A-N. If it is not, the process proceeds to block 2940. Otherwise, the process 2900 proceeds to block 2930, where cloud storage submodule utilizes the mapping described herein to generate vendor-specific API calls to encrypt the original file. The process then returns.

If the target cloud storage site API does not support the desired type of encryption, the process 2900 proceeds instead to block 2940. At block 2940, cloud storage submodule 236 utilizes its mapping described herein to generate and send a vendor-specific API call to download the file to the cloud storage submodule, or another component of the storage operation cell 150. At block 2945, the downloaded file is encrypted locally (e.g., by a component of storage operation cell 150 configured to perform encryption, such as a secondary storage computing device 165). At block 2950 cloud storage submodule utilizes its mapping described herein to generate and send vendor-specific API calls to overwrite the original file with an encrypted version. For example, cloud storage submodule may utilize vendor-specific API calls that open the original file for writing, write the contents of the encrypted version of the file to the original file, and close the original file. Alternatively, cloud storage submodule 236 may utilize vendor-specific API calls to create a new file on the target cloud storage site 115A-N, write the contents of the encrypted version of the original file to the new file, close the new file, and delete the original file.

Protecting Remote Office and Branch Office (ROBO) Data

In one example, the systems described herein may be utilized to protect remote office and branch office (ROBO) data. In some implementations, a subset of clients 130 may be "remote clients" who are geographically separated from other components of an associated storage operation cell 150. Remote clients 130 may only be connected to other components of an associated storage operation cell 150 via a WAN such as the Internet due to a physical separation between the remote client 130 and other system components. One intuitive example of a remote client 130 is a laptop computer utilized by a traveling employee: when the employee is traveling, she will be geographically separated from their company's main storage operation cell 150.

In such implementations, a remote client 130 may include a media file system agent 240, including a cloud storage submodule 236, to permit data agents 195 on the remote client to directly write data to a cloud storage site 115A-N (e.g., over a network connection established by an HTTP client sub-agent). For example, in this manner a remote client 130 may directly mirror data to cloud-based storage for disaster recovery purposes and/or to comply with other system-level data retention policies. In accordance with system-wide storage and scheduling policies, other system components (e.g., jobs agent 220) may instruct a remote client 130 regarding when and how to perform a remote storage operation. Additionally, a remote client 130 may provide information regarding a storage operation made in this manner to other system components, so that those system components may update the various system-wide indices and databases to reflect the storage operation. For example, client 130 may provide storage manager 105 with information that is sufficient for storage manager 105 to update management index 211, management light index 245, SS index 261, SS light index 247, and deduplication database 297.

In such implementations, the system may avoid routing data slated for cloud storage through a secondary storage computing device 165, thereby conserving system resources (e.g., the bandwidth of a secondary storage computing device). Such implementations preserve the ability of the storage cell 150 to perform upon all data, including data generated by remote clients 130: policy-driven storage, ILM, content indexing, data restoration, and searching.

In some implementations, a group of clients 130 may be geographically separated from most of the system components of an associated storage operation cell 150 but may not be geographically separated from one or more locally accessible secondary storage computing devices 165. For example, a group of clients (e.g. a group of clients associated with a particular branch office of a company) may be connected to a locally accessible secondary storage computing device 165 over a LAN, but may be connected to other components (e.g. storage manager 105, storage devices 115, other secondary storage computing devices 165) only over a WAN like the Internet. In such implementations, the group of clients 130 may copy or migrate data to a locally accessible secondary storage computing device, which may in turn write this data to a cloud storage site 115A-N in accordance with applicable system-wide storage and scheduling policies.

Thus the locally accessible secondary storage computing device 165 may mirror data from a branch office directly to cloud-based storage for disaster recovery purposes and/or to comply with other data retention policies, without first routing that data over a WAN to other system components. Additionally, a locally accessible secondary storage computing device 165 may provide information regarding a storage operation made in this manner to other system components, so that those system components may update the various system-wide indices and databases to reflect the storage operation. For example, a locally accessible secondary storage computing device 165 may provide storage manager 105 with information that is sufficient for storage manager 105 to update management index 211, management light index 245, SS index 261, SS light index 247, and deduplication database 297. Such implementations preserve the ability of the storage cell 150 to perform upon all data, including data generated by remote clients 130: policy-driven storage, ILM, content indexing, data restoration, and searching.

Alternatively or additionally, a group of clients may be connected to a locally accessible cloud gateway 1540 over a LAN, but may be connected to other system components only over a WAN. In such implementations, the locally accessible cloud gateway 1540 may provide the same functionality of a locally accessible secondary storage computing device 165 described in this section, in addition to other cloud gateway functionality described herein.

CONCLUSION

IT organizations continue to deal with massive unstructured data growth, stronger regulatory requirements and reduced budgets. To meet the needs of more stringent data retention requirements and faster RTO's, many users have over provisioned low-cost disk storage which, combined with non-integrated data management products, creates inefficient storage infrastructures resulting in high operating costs. In fact, many data centers have reached a limit where there is no power or real estate left to continue expanding.

Today's IT organizations are struggling to keep pace with multiple factors that are starting to severely impact the ways that they protect, manage and recover their business-critical data, data that is increasingly located in remote offices and on user laptops/desktops, outside of core IT facilities. Relentless, ongoing data growth across the enterprise, often growing at 30-50% per year ensures that some storage teams are looking at a doubling of capacity requirements every 18 months. Increased government regulation around data retention policies adds to the burden, often requiring that critical data be kept for years or even decades. Further, many IT organizations worldwide are being forced to justify not only incremental spending, but also justify their existing expenses and/or headcount in the face of potential budget cuts.

Cloud storage sites represent an increasingly viable option to manage the growing bodies of data. They promise lower costs through better utilization and management of the underlying storage infrastructure. Cloud-based storage also eliminates the need to buy lots of spare capacity in anticipation of future storage growth, enabling companies to "pay as you grow". Further cloud-based storage enables IT organizations to minimize investment in new Data Center capacity, and extends the life of their existing investment in both building and computing infrastructure.

However leveraging cloud-based storage can be challenging for some organizations for a variety of reasons. First is the inherent complexity associated with managing two sets of infrastructure, one physical and on-premise and another online in the virtual storage cloud. This duplication of effort extends across a number of crucial aspects of data management including: Backup, Archive, Reporting and search/eDiscovery. There are challenges often associated with taking full-advantage of cloud-based storage. The first is complexity associated with moving data into and out of the cloud. Gateway appliances are often expensive, complex and represent a short-term fix that can aggravate infrastructure management challenges as the use of cloud-based storage grows. A related concern is the amount of data being moved to and managed within cloud storage. This not only impacts the ongoing service charges, which are often priced on a per-GB basis but also impacts the ability to meet backup windows over limited bandwidth. Data security and reliability are critical both from a data integrity perspective as well as to ensure that a company's critical data is not accessed by unauthorized parties, even including individuals working for a cloud-storage provider. Further, companies don't want to be locked in to a single vendor when it comes to data stored in the cloud. So data portability becomes critical, along with the ability to choose from among a variety of providers for specific performance and pricing requirements.

The systems herein permit policy-driven storage that defines what data stays on-premise and what moves to the cloud. Storage policies may consider "data value" determined from factors such as (a) access requirements, (b) latency requirements, and (c) corporate requirements including: how recently was the data accessed, how often was the data required over a given time period, such as the last 12 months, how many end-users/applications required access to the data in the last 12 months, how quickly will the data need to be restored, what downstream applications/processing are dependent on the data, whether the data needs to be identified and pulled in/put on Legal Hold for an eDiscovery request, whether the data contains corporate trade secrets or IP, whether the data might be considered highly sensitive (e.g., legal communication, or social security numbers).

The systems and methods described herein provide integrated data management platforms that address a wide variety of data management needs. The systems and methods herein may deliver unified data management from a single console. When combined with cloud storage, a seemingly unlimited storage pool, these systems and methods may offer users lower operating costs, ensure disaster recovery, while improving long-term compliance management.

The systems described herein provide a unified data management platform that may be built on a single codebase or as a unified application, with modules or agents for backup and recovery, archive, replication, reporting, and search/eDiscovery. These systems may provide automated, policy-based data movement from local, deduplicated copies into and out of cloud storage environments—all from the same centralized console. This incremental approach to data management may permit organizations to leverage the economics of cloud-based storage.

The systems and methods described herein may result in various other performance advantages. For example, these systems and methods may reduce administrative and storage overhead for infrequently-accessed data in a data center by automatically tiering older/infrequently-accessed data in a data center to more efficient, lower-cost cloud-based storage, freeing up existing capacity to accommodate ongoing data growth.

Integrated deduplication ensures that unique (or semi-unique) data segments are stored "in the cloud", minimizing costs associated with redundant data across backups and archive. Block-based data deduplication and replication reduce network bandwidth requirements to minimize network costs and backup windows. Deduplication also reduces ongoing storage costs up to 75%, minimizing operational expenses across the entire lifespan of the data being retained The systems described herein may permit a better data encryption approach to meet applicable requirements. A user may protect data starting from the source with in-stream encryption, and then extend encryption to data "at-rest". This ensures that not only is a user protected during data migration, but also from unwarranted access of data already on the cloud. Because the data encryptions are controlled by a company's IT team, data is safe even from unintentional access by a cloud storage providers' IT staff.

By providing encryption of data in-flight and at-rest data, the systems and methods help protect data, even from cloud storage site operators. Built-in data encryption and verification technology ensures data has been securely and safely written to the cloud without errors. Encryption of data at-rest helps ensures that only appropriate personnel have full access to readable data, no matter where it's stored.

The systems herein are designed to work with a wide variety of storage partners, both physical and a growing number of cloud-based storage providers. Today these include Amazon's S3, Microsoft Azure, Nirvanix SDN with upcoming support for Iron Mountain and Rackspace. This open approach ensures that additional cloud-storage vendors will continue to be added in the future to increase the choices available.

The systems described herein may deliver a seamless solution for data-aware movement into cloud storage to help reduce overall complexity and costs. Lack of a native cloud-storage connector often requires complex scripting, adding both time and risk to moving data into the cloud. Using gateway appliances can present an ongoing and growing management burden as cloud-storage use increases. An integrated approach such as that described herein eliminates the costs and risk associated with either approach. Integrated data management of both local storage and cloud storage from a single console minimizes administrative overhead and the need for specialized gateway appliances. The systems described may also be readily configured to support an expanding list of industry-leading cloud providers to provide flexibility and choice for how to host cloud-based data immediately and in the future. Native integration with REST/HTTP protocols seamlessly extends data management to the cloud without the need for scripting or specialized vendor-specific gateway appliances.

A highly efficient platform automates the movement of data across systems from a variety of storage vendors, and across different types of storage devices including disk, tape, CAS, VTL, optical—and now cloud storage. By integrating these functions together, users can leverage one interface to manage one data management suite across a virtual shared storage environment. Moving data into and out of the cloud using the systems herein is as easy as moving data between any 2 data storage tiers. For existing users, this can be done in as little as 3 steps: choosing one or more cloud-storage sites, setting up a storage service similar to what a user would do to add disk-based storage, and adding the new cloud-based storage to existing backup and/or archive policies and data paths.

As data management expands to beyond a physical infrastructure, and into the cloud, legal and reporting requirements continue to grow as well. The systems described herein may offer at least four key benefits for search/eDiscovery:

1. Indexes of all data retained can be kept on-premise. This enables a user to retain control of the most critical and sensitive aspects of information management, and ensures that content indexes are accessible only to designated personnel within an organization.

2. Since the indexes are searchable locally, there is no latency with regards to data that may be retained in the cloud over a number of years or even decades. This reduces the amount of time and data required by a company's legal and/or IT teams.

3. Only the specific data required for eDiscovery requests is restored back from the cloud. This saves on bandwidth, the time needed for data restore and minimizes the data retrieval costs charged by a cloud-storage vendor.

4. Global indexing of all relevant data, from the Data Center to remote sites, mobiles users and cloud-based data. This ensures that a company has a global view of all their data, so that a company can also avoid the legal and financial risks associated with incomplete responses to eDiscovery requests Integrated content indexing done prior to tiering to the cloud, ensures that administrators can do fast searches on a local index and retrieve only specific data that meets the search criteria.

A variety of data reduction techniques can also be used to minimize the amount of data sent to the cloud, and minimize the cloud-based capacity usage. Block-based deduplication reduces backup and archive times and data volumes by filtering out redundant data before it reaches the cloud. This can be done in a data center or even at remote sites, depending on the system configuration. Additional data management approaches such as incremental backups and data compression at the source can further reduce the amount of data in-transit and at-rest.

As data volumes continue to increase, many companies find themselves bumping up against the capacity, cooling or power limitations of their existing data centers. Meanwhile they're now required to keep every-growing amount of data as mandated by their corporate legal staff, acting under the aegis of governmental regulation. This 3-way balancing act between capacity, compliance and cost requires a flexible approach to data management that requires a multi-tier approach that extends to cloud-based storage. The systems described herein may be used for an end-to-end approach to tiering a combination of data from within the data center, from remote offices and from individual employees worldwide.

A second use case of the described systems centers around protecting data outside of the Data Center and storing it in the cloud. This enables the central IT team to control the movement and management of data along with defining the appropriate data retention and recovery policies.

Data from remote offices (and even end-users/employees if configured) can be backed up directly to cloud-based storage, eliminating the need to migrate the data to the data center first, and then migrating the data again to the cloud. In other cases, data may be mirrored to cloud-based storage for Disaster Recovery purposes as well for long-term data retention. As data ages past retention requirements it can be automatically deleted in the cloud, creating ongoing savings in capacity utilization charges.

Because data is managed just the same as if were stored in a core data center, Storage Reporting and Management (SRM) can be easily used to monitor, analyze and monitor data across the enterprise regardless of whether it stored in the cloud, in a core data center or in remote offices or other locations.

The systems and methods described herein may provide the following benefits and features, inter alia:

Ensuring data security when: data is in transit, both to and from the cloud and when data is at-rest (including security from service-provider personnel).

Portability, by permitting a user to easily move data back from the cloud if required, and to move data quickly between cloud-based storage providers, to improve price and performance.

Restoring data quickly and directly from any physical or cloud-based storage tier.

Configuring data management policies so that most frequently accessed data is more easily and quickly retrieved when required.

Matching network bandwidth capacities to data's RTO (recovery time objective) requirements.

Archiving data to the cloud, including setting up automated retention and deletion policies.

Easily configurable global reporting of all data (physical and in-the-cloud).

Easily and securely extending cloud-based data management to include search/eDiscovery.

Unless the context clearly requires otherwise, throughout the detailed description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having blocks or steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention. Some alternative implementations of the invention may include not only additional elements to those implementations noted above, but also may include fewer elements.

All patents and applications and other references noted above, including any that may be listed in accompanying filing papers, are incorporated herein by reference in their entireties. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

We claim:

1. A computer-implemented method for collaboratively searching for stored documents related to an organization, the method comprising:
   creating a collaborative document, wherein multiple users can add search criteria to the collaborative document;
   posting the collaborative document to a collaborative shared logical location accessible by multiple users;

receiving at least a first search criterion from a first user computer and adding and saving the first search criterion to the collaborative document;

receiving at least a second search criterion from a second user computer and adding and saving the second search criterion to the same collaborative document, wherein the first and second user computers are geographically separated;

generating a third search criterion based on dynamic changes made to at least one of the first search criterion and the second search criterion or based on heuristics-type information from at least one of the first search criterion and the second search criterion; and performing a search of the stored documents based on the collaborative document containing the first, second, and third search criteria to create one or more search results that identify stored documents, wherein the search of the stored documents includes a search of both online and offline documents, wherein some or all of the offline documents contain data that is no longer available on a local area network of the organization, wherein online documents include secondary copies of data stored at non-public locations on two or more cloud storage sites, wherein the two or more cloud storage sites are operated by different vendors, and wherein the search of the stored documents in the two or more cloud storage sites is performed by receiving and executing generic or vendor-agnostic file system calls.

2. The computer-implemented method of claim 1 wherein the collaborative shared logical location is Microsoft SharePoint Services.

3. The method of claim 1, further comprising imposing access restrictions, by restricting a first subset of the multiple users from reviewing a first search result reflecting a first offline data object based on a first set of access control information while permitting a second subset of the multiple users to review the same search result based on a second set of access control information, wherein the access control information comprises an access control list that further comprises a list of access control entries that reflect users or groups that are allowed to access the first offline data object.

4. The method of claim 1, further comprising imposing access restrictions, by restricting a first subset of the multiple users from reviewing a first search result reflecting a first offline data object based on a first set of access control information while permitting a second subset of the multiple users to review the same search result based on a second set of access control information.

5. The method of claim 1, further comprising:

receiving from a user a result indication related to a first search result, wherein the first search result is related to a first document, wherein the result indication is based on the user's evaluation of the first search result or the first document, wherein the result indication is either:
a flag to provide additional information relating to the first search result in the collaborative document or
a tag that modifies the first document with additional information; and associating a received flag or tag with the first document in an online index of the online documents to permit later searching of the online index based at least in part on the flag or tag.

6. The method of claim 5 wherein the result indication indicates a relevance of the search result to a purpose for the search.

7. The method of claim 5 wherein the result indication flags a search result for removal from the search results.

8. The method of claim 5 wherein the result indication indicates that the first document comprises legally privileged content.

9. The method of claim 1, wherein the collaborative document permits multiple collaborative participants to implement a workflow subsequent to the search process and to contribute to steps of the workflow subsequent to the search process.

10. The method of claim 1, further comprising utilizing one or more parsers to convert content created by one or more applications having an application-specific document format into a format viewable using a web browser.

11. The method of claim 1, further comprising utilizing one or more parsers to convert content created by one or more applications having an application-specific document format into a format viewable using a web browser, wherein the parsers are configured to convert one or more of the following types of content: spreadsheet content, database tables, instant messaging conversation logs, and email databases.

12. A system for collaboratively searching for stored documents related to an organization, the system comprising:

means for creating a collaborative document,
wherein multiple users can add search criteria to the collaborative document, and
wherein the collaborative document is accessible over a computer network by multiple users;

means for receiving at least a first search criterion from a first user computer and adding and saving the first search criterion to the collaborative document;

means for receiving at least a second search criterion from a second user computer and adding and saving the second search criterion to the same collaborative document,
wherein the first and second user computers are coupled via the computer network, and
wherein the first and second user computers are geographically separated;

means for generating a third search criterion based on dynamic changes made to at least one of the first search criterion and the second search criterion or based on heuristics-type information from at least one of the first search criterion and the second search criterion; and means for performing a search of the stored documents based on the collaborative document containing the first, second, and third search criteria to create one or more search results that identify stored documents,
wherein stored documents include secondary copies of data stored on two or more cloud storage sites,
wherein the two or more cloud storage sites are operated by different vendors, and
wherein means for performing the search of the stored documents in the two or more cloud storage sites includes means for receiving and executing generic or vendor-agnostic file system calls.

13. A system of claim 12, further comprising:
means for parsing stored documents to migrate data from multiple data types to a common data type.

14. A system of claim 12, further comprising:
means for integrating stored documents from at least two different file systems.

15. A non-transitory computer-readable medium having instructions for collaboratively searching for stored documents related to an organization which, if executed by a processor, cause the processor to:

create a collaborative document, wherein multiple users can add search criteria to the collaborative document;

post the collaborative document to a collaborative shared logical location accessible by multiple users;

receive at least a first search criterion from a first user computer and adding and saving the first search criterion to the collaborative document;

receive at least a second search criterion from a second user computer and adding and saving the second search criterion to the same collaborative document, wherein the first and second user computers are geographically separated;

generate a third search criterion based on dynamic changes made to at least one of the first search criterion and the second search criterion or based on heuristics-type information from at least one of the first search criterion and the second search criterion; and perform a search of the stored documents based on the collaborative document containing the first, second, and third search criteria to create one or more search results that identify stored documents, wherein the search of the stored documents includes a search of both online and offline documents, wherein some or all of the offline documents contain data that is no longer available on a local area network of the organization, wherein online documents include secondary copies of data stored at non-public locations on two or more cloud storage sites, wherein the two or more cloud storage sites are operated by different vendors, and wherein the search of the stored documents in the two or more cloud storage sites is performed by receiving and executing generic or vendor-agnostic file system calls.

16. The computer-readable medium of claim 15, wherein the instructions further cause the processor to impose access restrictions, by restricting a first subset of the multiple users from reviewing a first search result reflecting a first offline data object based on a first set of access control information while permitting a second subset of the multiple users to review the same search result based on a second set of access control information.

17. The computer-readable medium of claim 15, wherein the instruction further cause the processor to:

receive from a user a result indication related to a first search result, wherein the first search result is related to a first document, wherein the result indication is based on the user's evaluation of the first search result or the first document, wherein the result indication is either:

a flag to provide additional information relating to the first search result in the collaborative document or a tag that modifies the first document with additional information; and associate a received flag or tag with the first document in an online index of the online documents to permit later searching of the online index based at least in part on the flag or tag.

18. The computer-readable medium of claim 17, wherein the result indication indicates that the first document comprises legally privileged content.

19. The computer-readable medium of claim 17, wherein the collaborative document permits multiple collaborative participants to implement a workflow subsequent to the search process and to contribute to steps of the workflow subsequent to the search process.

\* \* \* \* \*

UNITED STATES PATENT AND TRADEMARK OFFICE
CERTIFICATE OF CORRECTION

Page 1 of 1

PATENT NO. : 8,612,439 B2
APPLICATION NO. : 12/751713
DATED : December 17, 2013
INVENTOR(S) : Anand Prahlad et al.

It is certified that error appears in the above-identified patent and that said Letters Patent is hereby corrected as shown below:

In the Specification

In column 4, line 6, delete "prior" and insert -- or prior --, therefor.

In column 8, line 12, delete "(ACLS)" and insert -- (ACLs) --, therefor.

In column 10, line 15, delete "1158," and insert -- 115B, --, therefor.

In column 13, line 24, delete "data" and insert -- data, --, therefor.

In column 31, line 19, delete "could" and insert -- cloud --, therefor.

In column 47, line 30, delete "DATA" and insert -- DATA. --, therefor.

In column 72, line 34, delete "that" and insert -- than --, therefor.

In column 85, line 39, delete "retained" and insert -- retained. --, therefor.

In column 86, line 51, delete "request" and insert -- requests. --, therefor.

Signed and Sealed this
Eighth Day of April, 2014

Michelle K. Lee
*Deputy Director of the United States Patent and Trademark Office*